(12) United States Patent
Sun et al.

(10) Patent No.: US 12,129,132 B2
(45) Date of Patent: Oct. 29, 2024

(54) SINGULATION OF ARBITRARY MIXED ITEMS

(71) Applicant: Dexterity, Inc., Redwood City, CA (US)

(72) Inventors: Zhouwen Sun, Redwood City, CA (US); Harry Zhe Su, Union City, CA (US); Talbot Morris-Downing, Redwood City, CA (US); David Leo Tondreau, III, San Francisco, CA (US); Toby Leonard Baker, East Palo Alto, CA (US); Timothy Ryan, San Francisco, CA (US); Ayush Sharma, Santa Clara, CA (US); Raphael Georg Wirth, Breisach (DE); Cyril Nader, East Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 125 days.

(21) Appl. No.: 17/202,036

(22) Filed: Mar. 15, 2021

(65) Prior Publication Data

US 2022/0289501 A1 Sep. 15, 2022

(51) Int. Cl.
*B25J 9/16* (2006.01)
*B25J 9/00* (2006.01)
(Continued)

(52) U.S. Cl.
CPC .......... *B65G 47/917* (2013.01); *B25J 9/1612* (2013.01); *B25J 9/163* (2013.01); *B25J 9/1651* (2013.01);
(Continued)

(58) Field of Classification Search
CPC ................ B65G 47/917; B65G 47/918; B65G 2203/0216; B65G 2203/0233;
(Continued)

(56) References Cited

U.S. PATENT DOCUMENTS 6,135,268 A 10/2000 Couch
7,313,464 B1 12/2007 Perreault
(Continued)

FOREIGN PATENT DOCUMENTS

CN 108604091 9/2018
CN 108778636 11/2018
(Continued)

OTHER PUBLICATIONS

Y. Wang et al., "Transporting a heavy object on a frictional floor by a mobile manipulator based on adaptive MPC framework," 2021, IEEE (Year: 2021).*
(Continued)

*Primary Examiner* — Adam R Mott
*Assistant Examiner* — Byron Xavier Kasper
(74) *Attorney, Agent, or Firm* — Van Pelt, Yi & James LLP

(57) ABSTRACT

A robotic singulation system is disclosed. In various embodiments, sensor data image data associated with a plurality of items present in a workspace is received. The sensor data is used to determine and implement a plan to autonomously operate a robotic structure to pick one or more items from the workspace and place each item singly in a corresponding location in a singulation conveyance structure. The plan includes performing an active measure to change or adapt to a detected state or condition associated with one or more items in the workspace.

28 Claims, 23 Drawing Sheets

(51) Int. Cl.
  *B25J 13/08* (2006.01)
  *B25J 15/06* (2006.01)
  *B65G 47/91* (2006.01)
  *B65G 59/00* (2006.01)
  *G05B 19/418* (2006.01)

(52) U.S. Cl.
  CPC ........... *B25J 9/1653* (2013.01); *B25J 9/1664* (2013.01); *B25J 9/1697* (2013.01); *B25J 13/088* (2013.01); *B25J 15/0658* (2013.01); *B65G 47/918* (2013.01); *B65G 2203/0216* (2013.01); *B65G 2203/0233* (2013.01); *B65G 2203/025* (2013.01); *B65G 2203/0258* (2013.01); *B65G 2203/0291* (2013.01); *B65G 2203/041* (2013.01)

(58) Field of Classification Search
  CPC ...... B65G 2203/025; B65G 2203/0258; B65G 2203/0291; B65G 2203/041; B65G 59/00; B65G 2203/02; B65G 2203/04; B25J 9/1612; B25J 9/163; B25J 9/1651; B25J 9/1653; B25J 9/1664; B25J 9/1697; B25J 13/088; B25J 15/0658; B25J 9/1671; B25J 9/0093; B25J 9/00; B25J 9/0081; B25J 9/0087; B25J 9/1605; B25J 9/1684; G05B 19/4182; G05B 2219/39102; G05B 2219/40161; G05B 2219/40195; G05B 2219/40607; G05B 19/41815; G05B 2219/39106
  See application file for complete search history.

(56) References Cited

U.S. PATENT DOCUMENTS

| | | | |
|---|---|---|---|
| 8,489,229 | B2 | 7/2013 | Kuehnemann |
| 8,639,382 | B1 | 1/2014 | Clark |
| 9,457,477 | B1 | 10/2016 | Rublee |
| 10,086,510 | B1 | 10/2018 | McAninch |
| 10,552,750 | B1 | 2/2020 | Raghavan |
| 10,618,172 | B1 * | 4/2020 | Diankov ................ B25J 9/1664 |
| 10,906,188 | B1 | 2/2021 | Sun |
| 10,913,165 | B1 * | 2/2021 | Jonas ................... B25J 15/0052 |
| 11,478,942 | B1 * | 10/2022 | Lee ......................... B25J 18/025 |
| 11,511,417 | B1 * | 11/2022 | Meiswinkel ........... B25J 13/088 |
| 2002/0153654 | A1 | 10/2002 | Blackwell |
| 2003/0075416 | A1 | 4/2003 | Prutu |
| 2006/0079884 | A1 | 4/2006 | Manzo |
| 2006/0096896 | A1 | 5/2006 | Campagnolle |
| 2011/0076128 | A1 | 3/2011 | Johnsen |
| 2013/0083021 | A1 | 4/2013 | Cohen |
| 2013/0345875 | A1 | 12/2013 | Brooks |
| 2013/0346348 | A1 | 12/2013 | Buehler |
| 2014/0081452 | A1 | 3/2014 | Toshiki |
| 2014/0257556 | A1 | 9/2014 | Pandit |
| 2015/0168207 | A1 | 6/2015 | Pollock |
| 2015/0225178 | A1 | 8/2015 | Wargo |
| 2016/0090248 | A1 * | 3/2016 | Worsley ................. B65G 61/00 414/398 |
| 2016/0093053 | A1 | 3/2016 | Watanabe |
| 2016/0167227 | A1 | 6/2016 | Wellman |
| 2016/0221187 | A1 | 8/2016 | Bradski |
| 2016/0354809 | A1 | 12/2016 | Gruna |
| 2017/0080566 | A1 * | 3/2017 | Stubbs ...................... B25J 9/163 |
| 2017/0320210 | A1 | 11/2017 | Ding |
| 2017/0355078 | A1 * | 12/2017 | Ur .............................. G06T 7/12 |
| 2017/0356730 | A1 * | 12/2017 | Wang ....................... F42D 1/22 |
| 2017/0369244 | A1 * | 12/2017 | Battles ................... B65G 27/04 |
| 2018/0065156 | A1 | 3/2018 | Winkle |
| 2018/0148272 | A1 | 5/2018 | Wagner |
| 2018/0170674 | A1 | 6/2018 | Luckay |
| 2018/0250823 | A1 | 9/2018 | Shimodaira |
| 2018/0281200 | A1 | 10/2018 | Rosenstein |
| 2018/0362270 | A1 * | 12/2018 | Clucas ............... G05B 19/4182 |
| 2019/0071261 | A1 | 3/2019 | Wertenberger |
| 2019/0176348 | A1 | 6/2019 | Bingham |
| 2019/0185267 | A1 | 6/2019 | Mattern |
| 2019/0250627 | A1 | 8/2019 | Witt |
| 2019/0291277 | A1 | 9/2019 | Oleynik |
| 2019/0315570 | A1 * | 10/2019 | Nemati ................. G07F 11/165 |
| 2019/0337723 | A1 * | 11/2019 | Wagner ................. B65G 47/962 |
| 2020/0017317 | A1 | 1/2020 | Yap |
| 2020/0039676 | A1 | 2/2020 | Shamiss |
| 2020/0086483 | A1 | 3/2020 | Li |
| 2020/0094288 | A1 * | 3/2020 | Coupar ..................... B07C 3/12 |
| 2020/0130935 | A1 * | 4/2020 | Wagner ................. B65G 61/00 |
| 2020/0130961 | A1 | 4/2020 | Diankov |
| 2020/0130963 | A1 | 4/2020 | Diankov |
| 2020/0160011 | A1 * | 5/2020 | Wagner ................. B65G 25/04 |
| 2020/0206783 | A1 | 7/2020 | Hogervorst |
| 2020/0311965 | A1 | 10/2020 | Mizukami |
| 2021/0069903 | A1 | 3/2021 | Duan |
| 2021/0179356 | A1 * | 6/2021 | Chen ......................... G06T 7/70 |
| 2021/0394364 | A1 | 12/2021 | Ogawa |
| 2022/0016764 | A1 * | 1/2022 | Yoshida ................. B25J 9/1653 |

FOREIGN PATENT DOCUMENTS

| | | | | |
|---|---|---|---|---|
| EP | 1897663 | | 3/2008 | |
| JP | 2017036113 | | 2/2017 | |
| JP | 2018179859 | | 11/2018 | |
| JP | 2018203480 | | 12/2018 | |
| JP | 6611297 | B1 * | 11/2019 | .............. B25J 13/02 |
| JP | 2020534168 | A * | 11/2020 | .......... B25J 15/0675 |
| TW | 2021107232 | A * | 2/2021 | ............ B25J 9/1682 |
| WO | WO-2016119829 | A1 * | 8/2016 | |
| WO | WO-2019215384 | A1 * | 11/2019 | ............... B07C 5/36 |

OTHER PUBLICATIONS

Rasoul Mojtahedzadeh. "Safe Robotic Manipulation to Extract Objects from Piles: From 3D Perception to Object Selection." Diss. Orebro University, 2016. Sep. 23, 2016 (Sep. 23, 2016) Retrieved on Apr. 25, 2022 (Apr. 25, 2022) from <https://www.diva-portal.org/smash/get/diva2:949839/FULLTEXT01.pdf> entire document.

* cited by examiner

SINGULATION OF ARBITRARY MIXED ITEMS

BACKGROUND OF THE INVENTION

Parcel and other distribution centers may receive an arbitrary mix of items of various sizes, dimensions, shape, weight, rigidity, and/or other attributes, often in a cluttered arbitrary mix. Each item may have machine readable information, such as text and/or optically or otherwise encoded information, which can be machine read and used to route the item, e.g., via an automated sorting/routing system and/or processing. To read the information for a given item, in a typical approach the items are separated from one another via a process known as "singulation."

Typically, singulation has been performed manually by human workers. A mix of items arrives at a workstation, e.g., via a chute or other conveyance, and each of a set of one or more human workers manually separates items and places them in a defined space for a single item on a conveyor belt or the like. For each item, its destination (or at least next leg of transport) is determined by machine-reading information on the item, and the item is routed to a destination associated with the next leg, such as a bag, bin, container, or other receptacle and/or a delivery vehicle or staging area associated with the next leg.

Manual singulation processes are labor-intensive and can be inefficient. For example, a downstream human worker may have few locations on which to place singulated items, e.g., as a result of upstream workers filling many of the single item spots. Collective throughput may be suboptimal.

Use of robots to perform singulation is challenging due to the arrival of a cluttered mix of items at a work station, the dynamic flow of items at each station and overall, and the result that it may be difficult to identify, grasp, and separate (singulate) items using a robotic arm and end effector in an automated manner.

BRIEF DESCRIPTION OF THE DRAWINGS

Various embodiments of the invention are disclosed in the following detailed description and the accompanying drawings.

DETAILED DESCRIPTION

Figure 1:
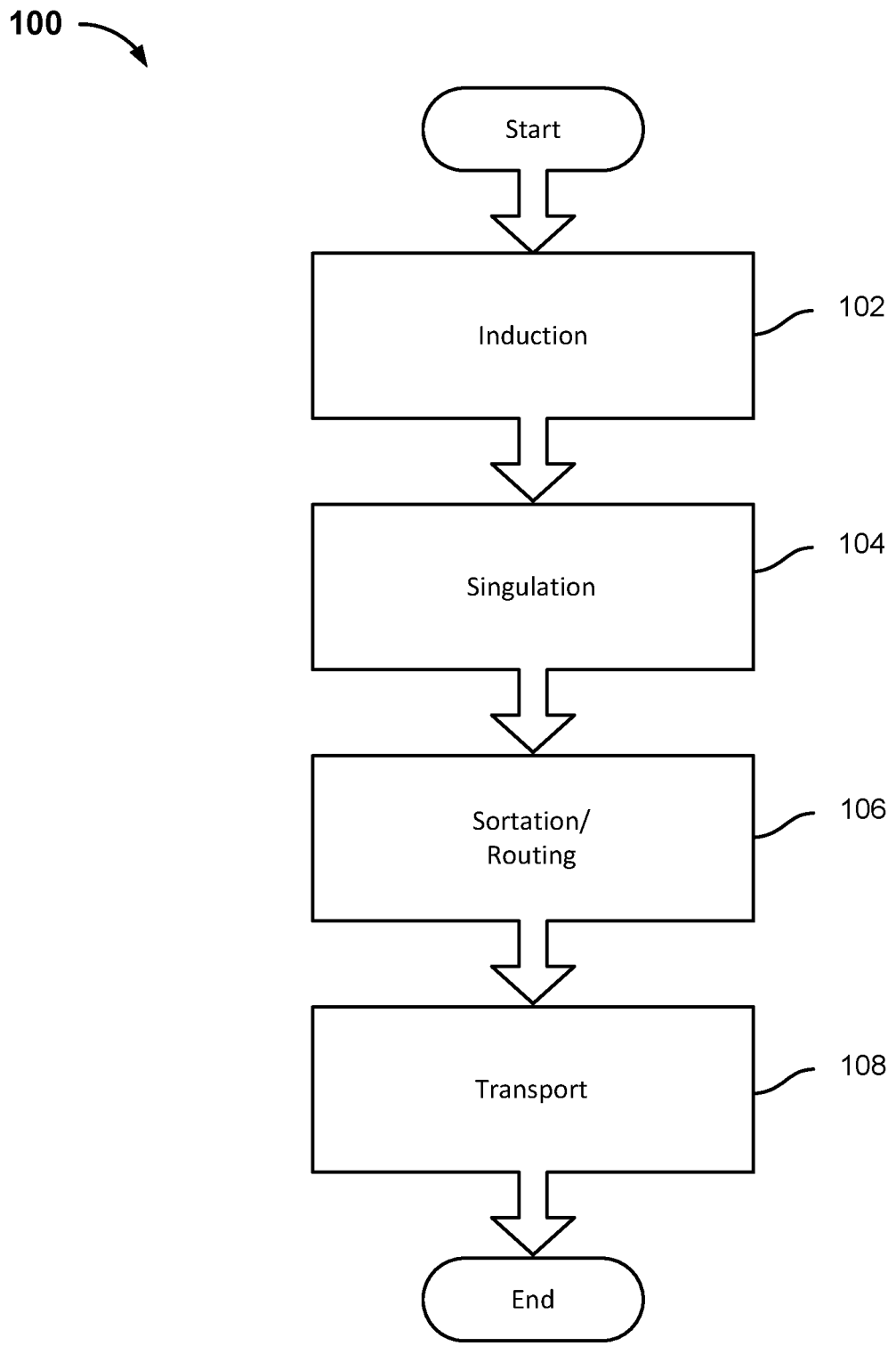
FIG. 1 is a flow diagram illustrating a process to receive, sort, and transport items for distribution and delivery according to the related art.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system to perform singulation is disclosed. As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. In various embodiments, singulation and/or sortation is disclosed. In various embodiments, singulation and/or sortation is performed based at least in part on detecting a state or condition associated with one or more items in the workspace and performing an active measure to adapt to the state or condition in connection with picking an item from a source pile/flow (e.g., a workspace) and placing the item on a segmented conveyor or similar conveyance to be sorted and routed for transport to a downstream (e.g., ultimate addressed/physical) destination. In some embodiments, the robotic system determines a plan to singulate an item (e.g., to pick the item from the workspace and place the item on a singulation conveyance structure), and performs the active measure in response to determining the detected state or condition after the plan was initially determined. In some embodiments, multiple robots are coordinated to maximize collective throughput. For example, the robotic system includes a plurality of robotic arms at the same workspace and the plurality of robotic arms operate to pick a plurality of items from the source pile/flow and place the items on the singulation conveyance structure. The plurality of robotic arms may operate autonomously and independently.

A robotic system includes a robotic arm and end effector used to pick items from a source pile/flow and place them on a segmented conveyor or similar conveyance to be sorted and routed for transport to a downstream (e.g., ultimate addressed/physical) destination. In some embodiments, multiple robots are coordinated to implement a desired collective throughput. In various embodiments, one or more robots may be employed at a singulation station. A system may include multiple stations. As an example, each station can correspond to a distinct workspace. Human workers may be employed at one or more stations. The robotic system in various embodiments may be configured to invoke (request) the assistance of a human worker, e.g., by teleoperation of a robotic arm, manual task completion, etc., for example to handle an item the robot cannot handle by fully automated processing and/or an item the robot has dropped, etc. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms.

According to various embodiments, a robotic singulation system performs an active measure in order to improve the singulation of an item (e.g., to successfully pick the item from a source pile/flow and place the item on the conveyor). For example, in response to determining that a detected state or condition impedes implementation of a current plan to autonomously operate the robotic structure to pick one or more items from the workspace and place each item singly in a corresponding location in a singulation conveyance structure, the robotic structure performs one or more active measures to improve the likelihood of successful singulation (e.g., the robotic structure can determine an active measure that is expected to improve the likelihood of successful singulation based at least in part on the detected state or condition). In some embodiments, the active measure includes using a robotic arm, an end effector of the robotic arm, a movement of a chute or other element of the workspace, or an air blower to reconfigure the source pile/flow or to reconfigure one or more items or debris on the workspace. The active measure can be performed to improve a scanning of a label or identifier on an item to be singulated, to improve the likelihood that an item can be picked up, to improve the grip on an item being singulated, to improve the release of an item from the robotic arm, or to improve operation of two robotic arms that are independently singulating items from the same workspace (e.g., the same source pile/flow).

Parcel carriers, postal services, delivery services, large retailers or distributors, and other enterprise and government entities that handle, transport, and deliver items to and from diverse locations typically receive large quantities of items from various source locations, each to be delivered to a corresponding one of a variety of destination locations.

Machines exist to handle, sort, and route items, but to use machine readers and sorting equipment items may need to be spaced from one another and/or in a certain orientation to be able to have a label or tag read by a machine. Such spacing and orientation may need to be achieved in the course of a process of "induction" of items into a sorting/routing facility, and may be performed in connection with a "sorting" or "sortation" process, for example, a process by which items to be delivered to diverse locations are sorted by general destination (e.g., region, state, city, zip code, street, street number order, etc.).

Machine readers, such as radio-frequency (RF) tag readers, optical code readers, etc., may need items to be spaced apart from one another, a process sometimes referred to as "singulation," to be able to reliably read a tag or code and for the system to associate the resulting information with a specific item, such as an item in a specific location on a conveyor or other structure or instrumentality.

In a typical induction/sortation process in a parcel sorting operation, for example, individual parcels may be picked from bulk piles and placed onto a moving conveyor or tilt tray sortation system. For most facilities, induction of this type is entirely manual.

A typical, manual parcel induction/sortation process may include one or more of the following:

A chute with unsorted parcels filters down onto a sorting table adjacent to a conveyor-based sortation system A worker's job is to "singulate" the items onto the conveyor or tray-based sortation system Workers ensure that every parcel which is inducted onto the sorter is oriented such that a shipping barcode (or other optical code, electronic tag, etc.) can be read for sortation purposes (this orientation typically is determined by the scanning infrastructure at the facility)

Wait for an empty tray or slot to pass, and ensure that only one parcel is placed on each slot or tray.

In a typical manual induction/sortation process, manually (or machine) fed chutes via which parcels of a variety of shapes and sizes arrive in bulk in various orientations; parcels may have different dimensions, shapes, rigidity, packaging, etc.; typically human workers take packages from a chute feeding a station at which each works and places them one by one on an open partitioned or otherwise defined segment of a conveyor; finally, many workers each at a station populate locations on one or more conveyors with singulated parcels, to facilitate downstream machine processing, such as reading the code or tag and taking automated sorting action based thereon, such as routing each parcel to a location within the facility that is associated with a destination to which the parcel is to be delivered. The location may involve further sorting (e.g., more destination-specific location within the facility) and/or packing/loading the parcel for further shipment (e.g., truck or aircraft to further destination where further sorting and delivery will occur, loading on a truck for local delivery, etc.).

FIG. 1 is a flow diagram illustrating a process to receive, sort, and transport items for distribution and delivery according to the related art.

In the example shown, process 100 begins with an induction process 102 by which items are provided to one or more workstations for singulation via singulation process 104. In various embodiments, the singulation process 104 is at least partly automated by a robotic singulation system as disclosed herein. The singulation process 104 receives piles or flows of dissimilar items via induction process 102 and provides a stream of singulated items to a sortation/routing process 106. For example, the singulation process 104 may place items one by one on a segmented conveyor or other structure that feeds items one by one into a sortation/routing machine. In some embodiments, items are placed with an orientation such that a label or tag is able to be read by a downstream reader configured to read routing (e.g., destination address) information and use the routing information to sort the item to a corresponding destination, such as a pile, bin, or other set of items destined for the same next intermediate and/or final destination. Once sorted, groups of items heading to a common next/final destination are processed by a transport process 108. For example, items may be placed in containers, loaded into delivery or transport trucks or other vehicles, etc., for delivery to the next/final destination.

A robotic system configured an active measure without human intervention in connection with picking an item from a source pile/flow (e.g., a workspace) and placing the item on a segmented conveyor or similar conveyance to be sorted and routed for transport to a downstream (e.g., ultimate addressed/physical) destination is disclosed. In various embodiments, a state or condition associated with one or more items in the workspace is detected and in response an active measure is performed to facilitate singulating the item. According to various embodiments, singulation of items from a source pile/flow is improved through use of a dynamic singulation method or system that implements an active measure in response to detected states or conditions (e.g., states or conditions that did not exist and/or were not detected when the robotic system determined an initial plan for singulating the items in the workspace).

Figure 2A:
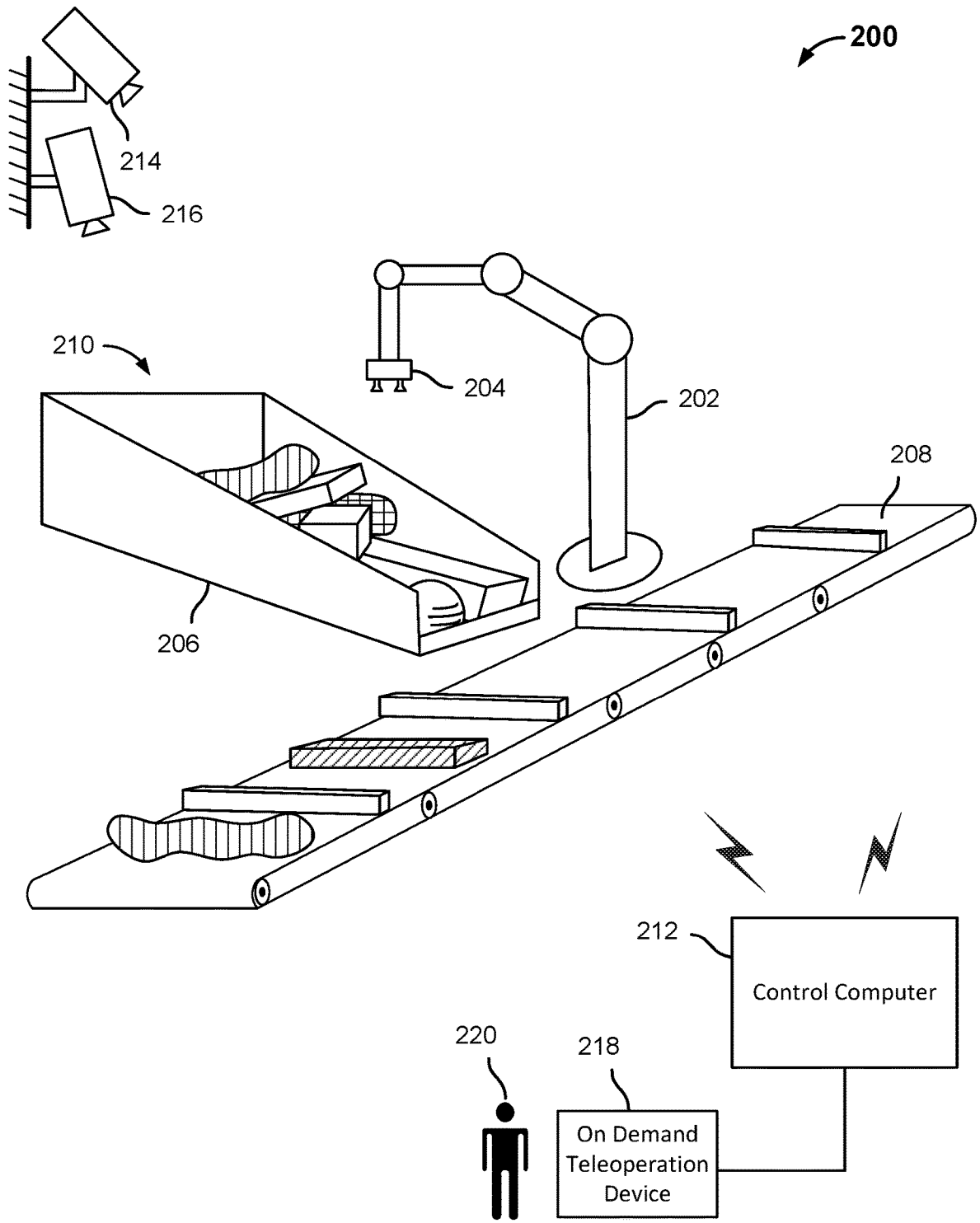
FIG. 2A is a diagram illustrating a robotic singulation system according to various embodiments.

FIG. 2A is a diagram illustrating a robotic singulation system according to various embodiments.

In the example shown, system 200 includes a robotic arm 202 equipped with a suction-based end effector 204. While in the example shown the end effector 204 is a suction-based end effector, in various embodiments, one or more other types of end effectors may be used in a singulation system as disclosed herein, including without limitation a pinch-based end effector or other types of actuated grippers. In some embodiments, end effector 204 comprises one or more suction-based ends (e.g., one or more suction cups). In various embodiments, the end effector may be actuated by one or more of suction, air pressure, pneumatics, hydraulics, or other actuation. The robotic arm 202 and end effector 204 are configured to be used to retrieve parcels or other items that arrive via chute or bin 206 and place each item in a corresponding location on segmented conveyor 208. In this example, items are fed into chute 206 from an intake end 210. For example, one or more human and/or robotic workers may feed items into intake end 210 of chute 206, either directly or via a conveyor or other electro-mechanical structure configured to feed items into chute 206.

In the example shown, one or more of robotic arm 202, end effector 204, and conveyor 208 are operated in coordination by control computer 212. In various embodiments, a robotic singulation as disclosed herein may include one or more sensors from which an environment of the workspace is modeled. In the example shown in FIG. 2A, system 200 includes image sensors, including in this example 3D cameras 214 and 216. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 212 includes a workspace environment state system such as a vision system used to discern individual items, debris on the workspace, and each item's orientation based on sensor data such as image data provided by image sensors, including in this example 3D cameras 214 and 216. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 208. In some embodiments, the workspace environment state system produces an output (e.g., sensor data or information otherwise characterizing the workspace and items within the workspace) used by the robotic system to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state or condition (e.g., implement a change on how an item is singulated, implement to reconfigure items within the source pile/flow to make grasping a selected item easier, etc.).

In various embodiments, a robotic system as disclosed herein includes and/or does one or more of the following, e.g., by operation of a control computer such as control computer 212:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system may determine characteristics of one or more items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system may coordinate operation of a plurality of robots operating within the same workspace to singulate a plurality of items. For example, the robotic system may coordinate operation of the plurality of robots to enable the plurality of robots to operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Two or multiple robotic system coordinate to pick up objects that are too heavy or too large for one robotic system to handle.

The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In the event two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed is controlled as needed to avoid empty locations and achieve a desired robot productivity (throughput).

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

In response to a determination that debris is in the workspace and/or interfering with singulation of one or more items, perform an active measure to move/remove the debris, or to reconfigure an item to be singulated (e.g., to improve the likelihood that the item is successfully picked from the source pile/flow and placed on the conveyance structure).

In response to a detected state or condition, perform an active measure to move/remove the debris, or to reconfigure an item to be singulated (e.g., to improve the likelihood that the item is successfully picked from the source pile/flow and placed on the conveyance structure). For example, a chute conveyor is operated (e.g., under robotic control) to bring an item selected for singulation closer to a front of the chute for quicker and easier access by the robotic arm.

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Determine a movement and speed of the robotic arm that singulates an item based at least in part on a speed of a conveyor belt.

Determine a trajectory of the item to be singulated based at least in part on one or more of a characteristic of the item, a characteristic of the workspace environment, and/or a characteristic of the conveyance structure (e.g., a speed of the conveyor belt or the size of the item).

In various embodiments, an arbitrary mix of items to be singulated may include parcels, packages, and/or letters of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a poly-bag, or in response to determining that tenting is being caused while grasping the item, the robotic structure performs an active measure to change or adapt to the "tenting" or to the determination of the packaging of the item (e.g., a determination of a type of packaging, a material of the packaging, etc.). As an example, the robotic structure performs an active measure to partially lift the package and drag the package from the chute to the corresponding slot in the conveyance structure.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc.

According to various embodiments, the one or more cameras serve various purposes. The one or more cameras may provide a richer full 3D view into the scene (e.g., the workspace). In addition, or alternatively, the one or more cameras may operate in cohesion to minimize the errors due to package shininess when light reflecting off a package and into a camera may disrupt operation of such camera; in this case another camera disposed at a different location provides a backup. In some embodiments, the one or more cameras may be selectively triggered by a predictive vision algorithm that determines which camera has the best viewing angle and/or lowest error rate for picking a particular package. Accordingly, the robotic system may operate using information pertaining to an item that is obtained from the one or more cameras that are optimal (e.g., among the plurality of cameras within the workspace) for looking at the item. In some embodiments, one or more cameras are mounted on an actuated base, of which the system can change the position and orientation to provide a more optimal perception (e.g., view) of a package.

In some embodiments, the robotic system may select a field of view of one or more cameras. The field of view of each camera may be selected (e.g., determined) to increase the object segmentation quality by intentionally filtering out parts of the field of view as well as increasing the segmentation speed by reducing computation on a larger field of view.

Another purpose served by cameras, in various embodiments, is to detect any sort of unforeseen error in robot operation or any disruption to the environment. Cameras placed on the robot and on the environment have different error and accuracy profiles. The cameras on the robot can be more accurate since they are rigidly fixed to the robot but slower to use since using them requires the robot to slow down or stall. Cameras in the environment have a stable view and are effectively faster since the robot can multi-task and do something else while a camera is taking a photo. But if someone moves or shakes the camera stand, they may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 200 may include one or more sensors other than or in addition to a plurality of cameras, such as one or more of an infrared sensor array, a laser array, a scale, a gyroscope, a current sensor, a voltage sensor, a power sensor, and the like. Referring to FIG. 2A, in various embodiments, robotic arm 202 is driven by one or more motors, e.g., one or more motors at each movable joint or mount location. In some embodiments, the work required to drive robotic arm 202 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 202 while the item is in its grasp. In various embodiments, the work required to drive the robotic arm 202 is measured using a current sensor, a voltage sensor, a power sensor, and/or the like, or some combination thereof. In response to determining the weight of the item during singulation, the robotic system may perform an active measure to adapt to the weight of the item. In some embodiments, in response to determining that the weight of the item is greater than a predefined threshold, robotic system 200 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces are between the item and end effector 204 as the robotic arm 202 is moved. Further, the shear forces can increase as the speed at which the robotic arm is operated increases (e.g., the speed at which the robotic arm moves the item). Accordingly, robotic system 200 can control the speed of the robotic arm 202 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 202 or the end effector 204

Referring further to FIG. 2A, in the example shown, system 200 further includes an on demand teleoperation device 218 usable by a human worker 220 to operate one or more of robotic arm 202, end effector 204, and conveyor 208 by teleoperation. In some embodiments, control computer 212 is configured to attempt to grasp and place items in a fully automated mode. However, if after attempting to operate in a fully automated mode control computer 212 determines it has no (further) strategies available to grasp one or more items, in various embodiments, control computer 212 sends an alert to obtain assistance from a human operator via teleoperation, e.g., by human operator 220 using teleoperation device 218. For example, in some embodiments, in response to detecting a state or condition affecting item flow through chute 206, control computer 212 may attempt to perform one or more actions to facilitate singulation. If fully automated attempts to respond to the detected state or condition are determined not to have resolved the state or condition, control computer may prompt human operator 220 to address the state or condition, e.g., via teleoperation using on-demand teleoperation device 218. In various embodiments, control computer 212 may display a user interface or other interface that identifies the state or condition and/or presents human selectable options to control the robotic arm 202, end effector 204, and/or other elements and instrumentalities as disclosed herein (e.g., blowers, shakers, chute conveyors, etc.) to alter the state or condition.

In various embodiments, control computer 212 uses image data from cameras such as cameras 214 and 216 to provide a visual display of the scene to human worker 220 to facilitate teleoperation. For example, control computer 212 may display a view of the pile of items in chute 206. In some embodiments, segmentation processing is performed by control computer 212 on image data generated by cameras 214 and 216 to discern item/object boundaries. Masking techniques may be used to highlight individual items, e.g., using different colors. The operator 220 may use the visual display of the scene to identify the item(s) to be grasped and use teleoperation device 218 to control the robotic arm 202 and end effector 204 to pick the item(s) from chute 206 and place each in a corresponding location on conveyor 208. In various embodiments, once the item(s) for which human intervention was prompted have been placed on the conveyor, the system 200 resumes fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in the future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 200 invokes assistance from human operator 220 in response to determining that an abnormality in the operation of system 200 exists. An example of an abnormality is a lack of a threshold pressure being attained between end effector 204 and the item during singulation of the item. In response to detecting that the pressure attained between end effector 204 and the item is less than a threshold pressure value, robot system 200 can perform a diagnostics process in connection with assessing whether robot system 200 is performing normally. For example, system 200 can perform a diagnostics of the ability of end effector 204 to engage an item and attain a predetermined threshold pressure value. In response to determining that system 200 is not performing normally (e.g., that the end effector 204 is not able to engage an item and attain a predetermined threshold pressure value), system 200 invokes assistance from human operator 220. In some embodiments, control computer 212 sends an alert to human operator 220. The alert can indicate the basis of the problem (e.g., an indication that the end effector is unable to engage the item and attain a predetermined threshold pressure value). For example, the alert can provide a recommended or requested remedial action to human operator 220.

Figure 2B:
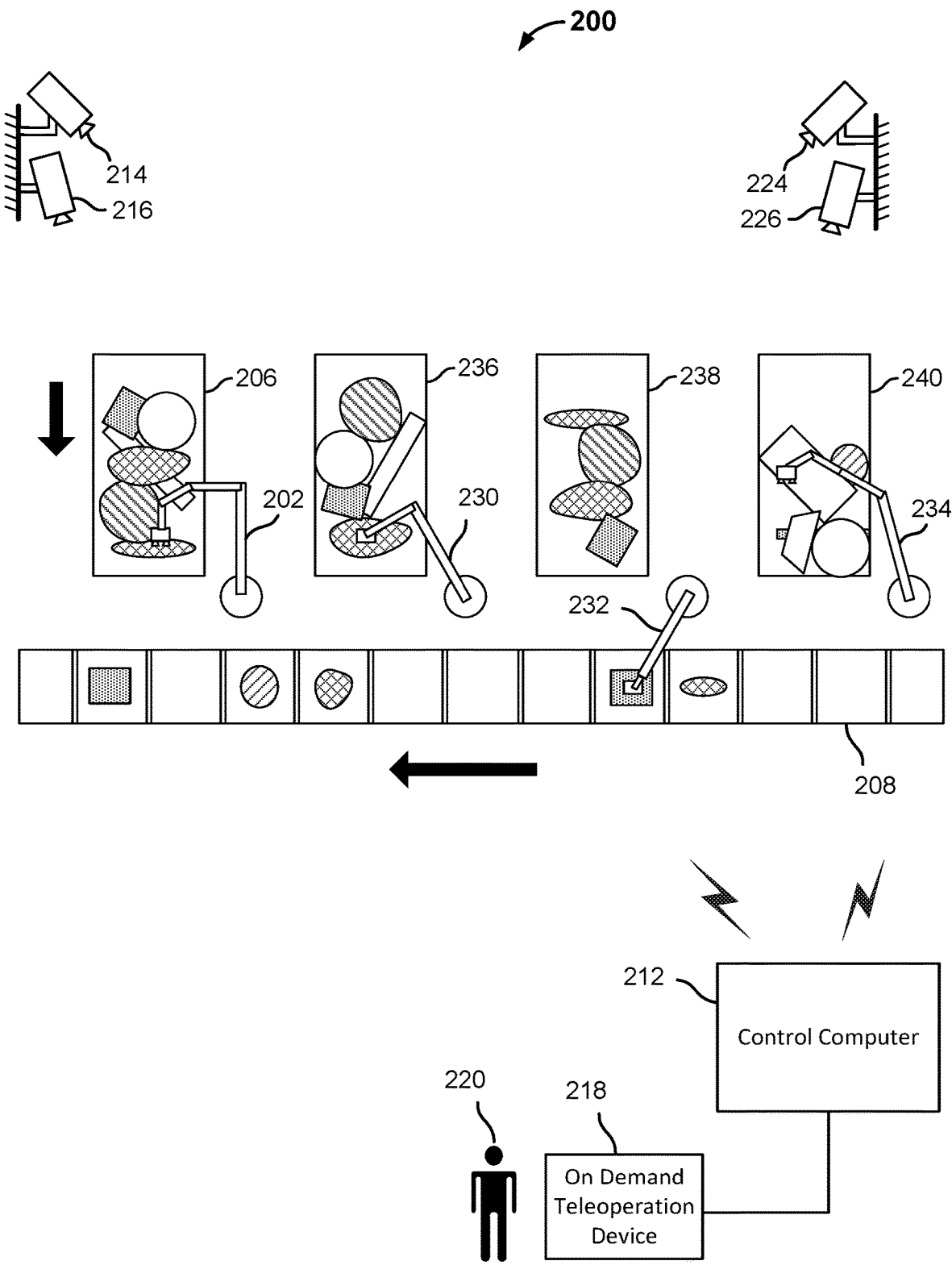
FIG. 2B is a diagram illustrating a robotic singulation system according to various embodiments.

FIG. 2B is a diagram illustrating a robotic singulation system according to various embodiments. In the example shown, the robotic singulation system of FIG. 2A has been expanded to include a plurality of singulation stations. Specifically, in addition to robotic arm 202 configured to pick items from chute 206 and place each item on a corresponding available and/or assigned location on segmented conveyor 208, the system shown in FIG. 2B includes three additional stations: robotic arms 230, 232, and 234 positioned and configured to pick/place items from chutes 236, 238, and 240, respectively. Additional cameras 224 and 226 are included, in addition to cameras 214 and 216, to provide a 3D view of the full scene, including each of the four stations/chutes 206, 236, 238, and 240, as well as conveyor 208.

In various embodiments, control computer 212 coordinates operation of the four robotic arms 202, 230, 232, and 234 and associated end effectors, along with conveyor 208, to pick/place items from the chutes 206, 236, 238, and 240 to conveyor 208 in a manner that achieves a desired collective throughput of the system (e.g., a collective throughput that satisfies a throughput threshold, etc.).

While in the example shown in FIG. 2B each station has one robotic arm, in various embodiments two or more robots may be deployed at a station, operated under control of an associated control computer, such as control computer 212 in the example shown in FIG. 2B, in a manner that avoids the robots interfering with each other's operation and movement and which maximizes their collective throughput, including by avoiding and/or managing contention to pick and place the same item. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms. For example, control computer 212 can coordinate operation of the plurality of robots to enable the plurality of robots to operate independently while ensuring that the plurality of robots and/or the items grasped by the plurality of robots do not collide with one another during singulation. In some embodiments, control computer 212 implements/enforces "force fields" between two or more robots in order to prevent collisions between the two or more robots. As an example, the robots (or control computer 212) access information from which their respective positions and the positions of one or more other robots are determined, and the robots are controlled to avoid an intersection between their respective positions and the positions of the one or more other robots at a certain time. In some embodiments, a first robot reserves an airspace (e.g., a certain position) that is to be used by the first robot during singulation of an item. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot.

In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subsets of the plurality of robots that picks after a first robot will select an item to singulate that is different from the item selected or picked by the first robot.

In various embodiments, a robotic system as disclosed herein coordinates operation of multiple robots to one by one pick items from a source bin or chute and place the items on an assigned location on a conveyor or other device to move items to the next stage of machine identification and/or sorting.

In some embodiments, multiple robots may pick from the same chute or other source receptacle. In the example shown in FIG. 2B, for example, robotic arm 202 may be configured to pick from either chute 206 or chute 236. Likewise, robotic arm 230 may pick from chute 236 or chute 238 and robotic arm 232 may pick from chute 238 or chute 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2B, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

According to various embodiments, system 200 manages a distributed data structure pertaining to the operation of a plurality of robots in system 200 and/or a state of the conveyance structure. For example, the distributed data structure may include one or more fields associated with each slot in the conveyance structure. According to various embodiments, the distributed data structure operates at a speed far in excess of the speed at which robots in system 200 operate. For example, the distributed data structure operates (e.g., is updated) on the order of 1 µs or 1 ms, and time at which the robots physically operate/move is on the order of 100 ms. Because the speed at which the robots operate is slower than the speed at which the distributed data structure operates, the distributed data structure is updated to reflect changes in the state of the workspace (e.g., the state of the conveyance structure) relatively quickly and the distributed data structure is likely to have been updated with the latest state by the time the robotic obtains and/or uses information from the distributed data structure in connection with determining a plan/strategy for singulating an item (e.g., selecting/claiming a slot in the conveyor). In some implementations, the relative speed of the distributed data structure reduces the likelihood that two robots would claim a slot on the conveyor at the same time and cause a fault in the distributed data structure. Accordingly, the distributed data structure can be updated based on operation of a robot or a plan for singulation associated with a robot. In various embodiments, each (mostly) independently operated singulation robot comprising a system associated with an output conveyor updates the distributed data structure with information pertaining to a plan or with information pertaining to one or more characteristics associated with the workspace (e.g., whether a slot in the conveyor is occupied or claimed for use by a robot in the system as a planned destination to place an item on the conveyor). In some embodiments, if the robot receives an error in connection with an attempt to write information to the distributed data structure, e.g., to claim a slot on the conveyor for its use, the robot waits a predetermined interval and re-attempt to write such information to the distributed data structure. If the data cannot be written because another robot has already written data to that location, e.g., already claimed an associated slot on the output conveyor, the robot chooses another slot determined to be available by reading another location in the data structure. According to various embodiments, in response to the data structure being updated by one robot, the data structure is automatically updated with respect to one or more other robots within system 200. For example, in response to determining that an update (e.g., a write or delete operation) is performed, the update is distributed to the other robots within system 200. The distributed data structure may be a shared structure that all robots read, or a robot (e.g., each robot) may store a local copy and disseminate updates across the system to other robots. For example, the robotics may synchronize modifications to the data structure (e.g., updates such as plans or reserved slots on the conveyor) to other robots within the system.

According to various embodiments, the distributed data structure comprises a field associated with a slot in the conveyance structure that is used to indicate whether the slot is occupied or reserved for an item in connection with singulation of the item by the robot. For example, a value in the field associated with a slot is indicative of whether the slot can be reserved or used by another robot for scheduling an item. In some embodiments, when a robot is determining (or updating) a plan to singulate an item, a slot on the conveyance structure is reserved. The slot in the conveyance structure is reserved based at least in part on the distributed data structure pertaining to the state of the conveyance structure. For example, a slot associated with a field indicating that the slot is empty or unreserved can be reserved for singulation of an item. Occasionally, a robot arm can erroneously release an item in a slot different from a slot that corresponded to the singulation plan, or in a manner that the item straddles two slots (e.g., adjacent slots). The corresponding robot (or a downstream robot) can detect that a slot has an item therein in contradiction to the corresponding field in the distributed data structure (e.g., such field indicating that the slot is empty or not reserved). In response to detecting that the slot has an item therein in contradiction to the corresponding field in the distributed data structure, the robot system updates the data structure to indicate that the slot is occupied or reserved.

According to various embodiments, the distributed data structure includes information pertaining to a timestamp, a speed of the conveyor, and one or more characteristics of a slot in the conveyor (e.g., an indication of whether the slot is occupied or reserved). The robot system can determine a plan for singulating an item from a source pile/flow to a slot in the conveyor based at least in part on the distributed data structure. For example, system 200 determines, based on the timestamp and the speed of the conveyor, a set of slots in which an item picked from the source pile/flow can be placed. System 200 can select a slot, from among the set of slots, that is empty or not reserved as a slot in which the item is to be singulated. The timestamp and the speed of the conveyor are used because system 200 can determine one or more slots with which the item being singulated can be caused to intersect based on operating the corresponding robot.

Figure 3A:
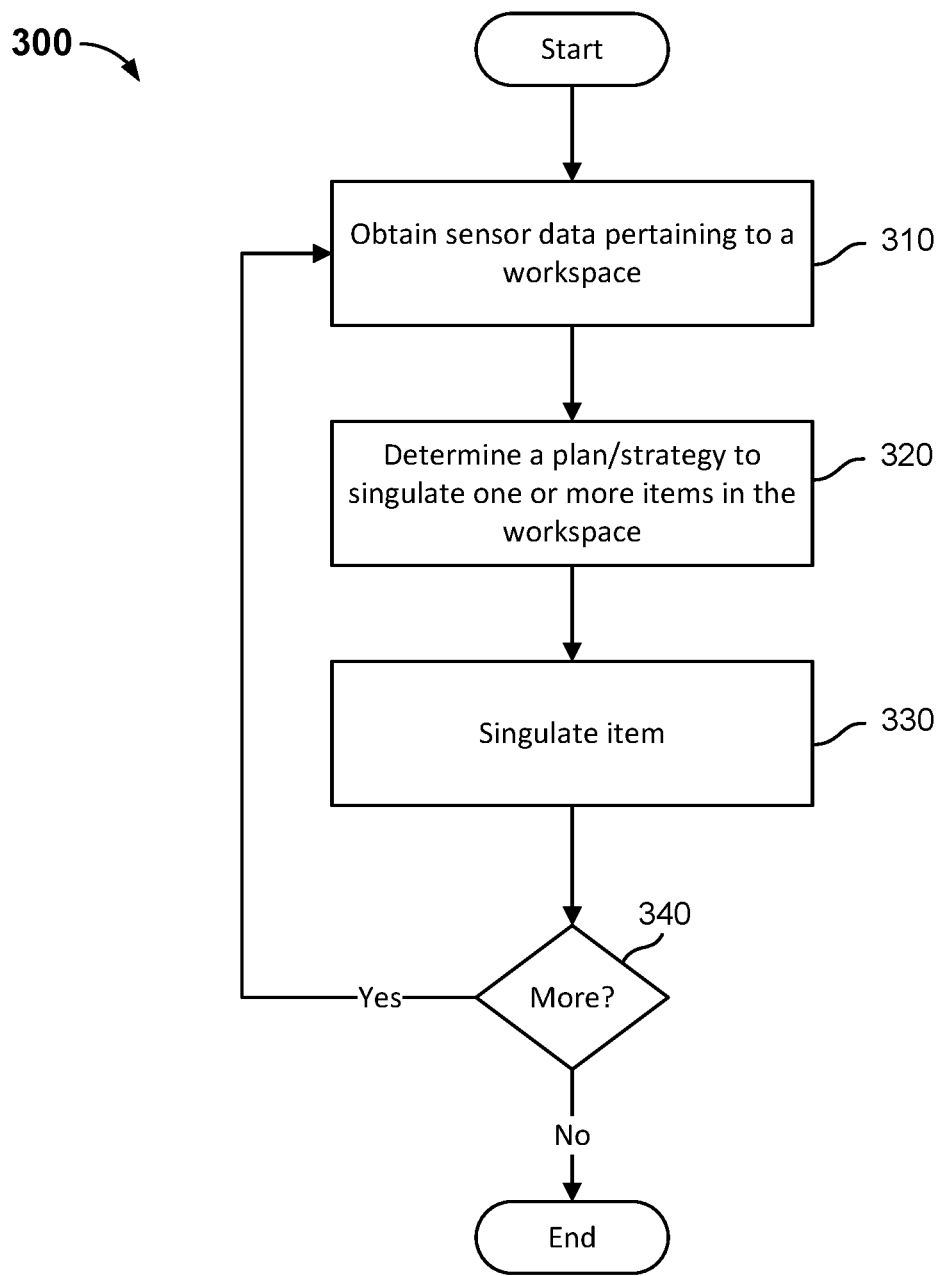
FIG. 3A is a diagram of a process to pick and place items for sorting according to various embodiments.

FIG. 3A is a diagram of a process to pick and place items for sorting according to various embodiments. In some embodiments, process 300 is implemented by a robot system operating to singulate one or more items within a workspace, such as system 200 of FIG. 2A and FIG. 2B. The robot system includes one or more processors (e.g., in control computer 212 in the examples shown in FIGS. 2A and 2B) which operate, including by performing the process 300, to cause a robotic structure (e.g., a robotic arm) to pick and place items for sorting.

At 310, sensor data pertaining to the workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items in the source pile/flow of the chute, or an item grasped by the robotic arm. In some embodiments, the sensor data is used in connection with determining one or more characteristics of the conveyance structure such as determining the slots on the conveyor that are empty or unreserved, determining a speed of the conveyor, and/or determining the characteristics of at least one slot or of at least one item already on the conveyor.

At 320, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot by robot basis such that if the robotic system includes a plurality of robots, each robot operates independent of the other robot(s).

According to various embodiments, the plan or strategy to singulate the one or more items in the workspace is determined based at least in part on the sensor data. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyance structure at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

At 330, the item is singulated. In some embodiments, the item is singulated in response to the plan or strategy for singulating the item being determined. For example, a robotic arm is operated to pick one or more items from the workspace and place each item singly in a corresponding location in a singulation conveyance structure. The singulation of the item comprises picking the item from the workspace (e.g., from the source pile/flow) and singly placing the item on the conveyance structure. The robot system singulates the item based at least in part on the plan or strategy for singulating the item.

At 340, a determination is made as to whether further items are to be singulated. If there are more items, a further iteration of steps 310, 320, and 330 is performed, and successive iterations are performed until it is determined at 340 that there are no more items in the chute (or other receptacle or source) to be picked and placed.

Figure 3B:
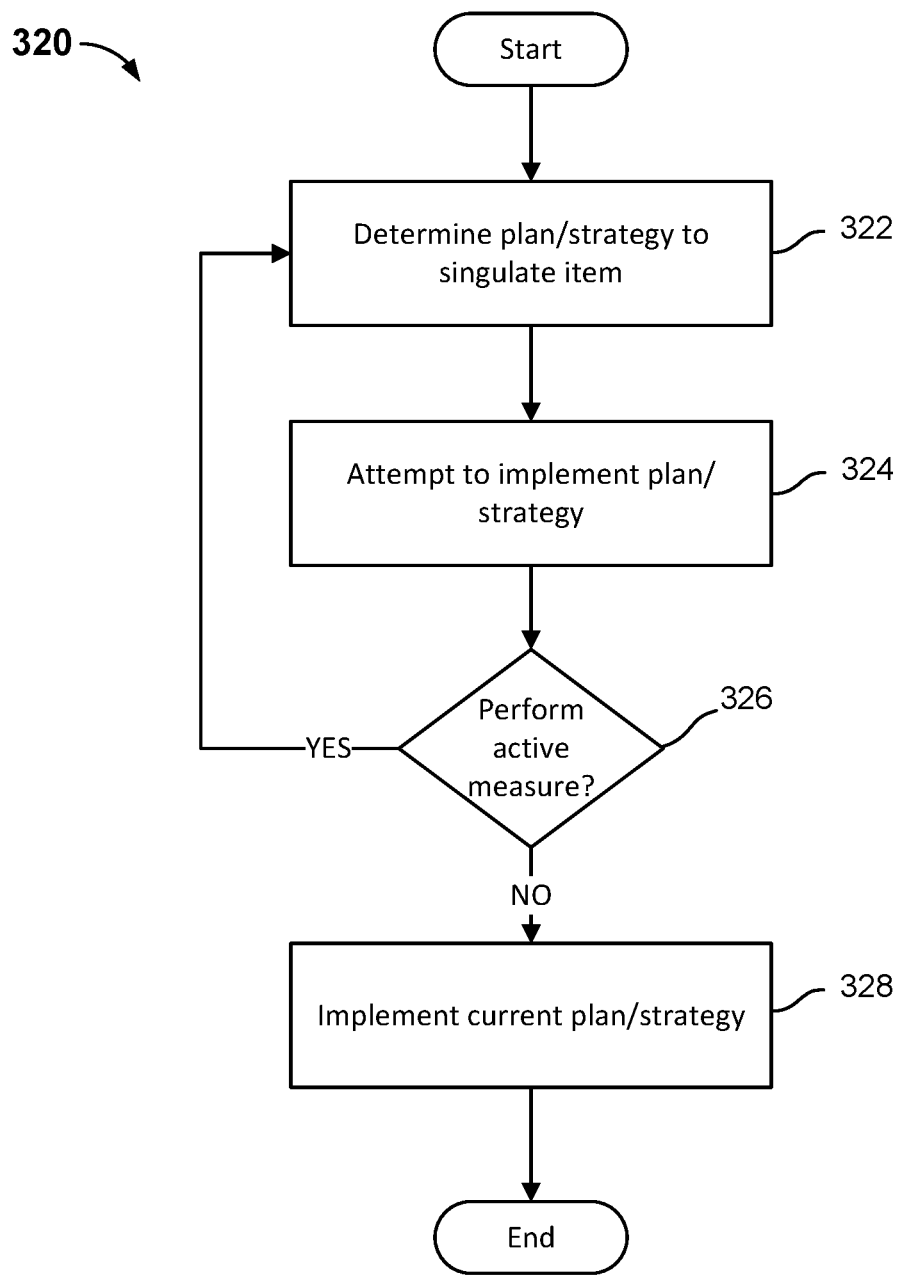
FIG. 3B is a diagram of a process to pick and place items for sorting according to various embodiments.

FIG. 3B is a diagram of a process to pick and place items for sorting according to various embodiments. In various embodiments, the process of FIG. 3B implements step 320 of the process 300 of FIG. 3A.

At 322, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items can be determined on a robot by robot basis such that if the robotic system includes a plurality of robots, each robot operates independent of the other robot(s).

At 324, implementation of the plan or strategy to singulate one or more items in the workspace is attempted. In some embodiments, the robotic system operates to cause a robotic structure (e.g., a robotic arm) to pick and place items for sorting according to the plan or strategy.

According to various embodiments, sensor data is received during the implementation of the plan or strategy to singulate one or more items in the workspace. For example, the robotic system continuously, or at a predefined interval, obtains sensor data from the one or more sensors. Continuously, or at a predefined interval, the obtained sensor data is processed. In some embodiments, the sensor data obtained during implementation of the plan or strategy is used to update a model of the workspace. The robotic system can process the sensor data obtained during implementation of the plan or the strategy to determine whether a state of the workspace environment has changed (e.g., since an initial plan or strategy was determined, or since the plan or strategy was last updated). For example, the sensor data obtained during implementation of the plan or strategy is used to detect a state or condition associated with one or more items in the workspace.

At 326, a determination as to whether to perform an active measure is made. In some embodiments, the robotic system determines whether to perform the active measure based at least in part on the sensor data obtained during implementation of the plan or strategy. The sensor data obtained during implementation of the plan or strategy can be used to update a model of the workspace. For example, the robotic system uses the state or condition associated with one or more items in the workspace in connection with determining whether to perform the active measure.

According to various embodiments, in response to detected states or conditions, the robotic system determines whether to perform the active measure. In some embodiments, the states or conditions are states or conditions that did not exist and/or were not detected when the robotic system determined an initial plan for singulating the items in the workspace or when the plan for singulation was last updated. The states or conditions are detected based at least in part on the sensor data obtained during implementation of the plan or strategy. In some embodiments, not all states or conditions give rise to the robotic system determining whether to perform the active measure. For example, the robotic system determines to perform the active measure based at least in part on a determination of a type of state or condition, and/or based on a determination of whether the detected states or conditions would impede successful singulation of the item associated with the plan. The robotic system can determine a probability or likelihood that certain detected states or conditions would impede successful singulation of the item associated with the plan and determine to perform the active measure if such probability or likelihood exceeds a predefined active measure threshold. Examples of a detected state or condition in response to which the robotic system determines to perform the active measure can include: an expected collision with another item or object if the item to be singulated is moved along the determined path; a location of an identifier or label on the item to be singulated (e.g., in relation to one or more scanners that are configured to read labels or identifiers); a state of the conveyor such as an item occupying the slot in which the item being singulated is to be placed, or an item larger than a threshold size occupying a slot adjacent to the slot in which the item being singulated is to be placed; a size or weight of the item to be singulated, etc.

In some embodiments, the robotic system performs the active measure in response to a detected state or condition that does not impede singulation of a currently selected item but that may impede singulation of items within the workspace. Examples of a state or condition that may not impede singulation of a currently selected item but that may impede singulation of items within the workspace include a clog (e.g., of items) within, or feeding to, the workspace, debris on the chute, an item or debris blocking one or more scanners (e.g., that may serve to prevent the one or more scanners from reading an identifier or label on an item), a position of one or more robotic arms within the workspace, a reservation of airspace for another element in the robotic system (e.g., another robotic arm), etc.

In response to determining to perform the active measure at 326, process 320 proceeds to 322 and a further iteration of steps 322, 324, and 326 is performed (e.g., using the detected state or condition in connection with determining the plan or strategy to singulate the item). In some embodiments, the active measure is performed in connection with performing an updated or new plan or strategy to singulate the item. For example, an updated plan or strategy to singulate the item is determined based at least in part on the active measure to perform (e.g., the plan or strategy incorporates at least part of the active measure). In response to determining not to perform an active measure, process 320 proceeds to 328 at which the current plan or strategy to singulate one or more items in the workspace is implemented. For example, a robotic arm is operated to pick one or more items from the workspace and place each item singly in a corresponding location in a singulation conveyance structure. The singulation of the item comprises picking the item from the workspace (e.g., from the source pile/flow) and singly placing the item on the conveyance structure. The robot system singulates the item based at least in part on the plan or strategy for singulating the item. In some embodiments, 328 corresponds to 330 of process 300 of FIG. 3A.

According to various embodiments, a determination to perform an active measure is performed during singulation of the item (e.g., as the plan or strategy is being implemented). For example, current sensor data can be obtained during implementation of a current plan or strategy to singulate the item, and the current sensor data is used in connection with determining whether to perform an active measure (e.g., whether to update the plan or strategy, or determine a new plan or strategy).

Figure 3C:
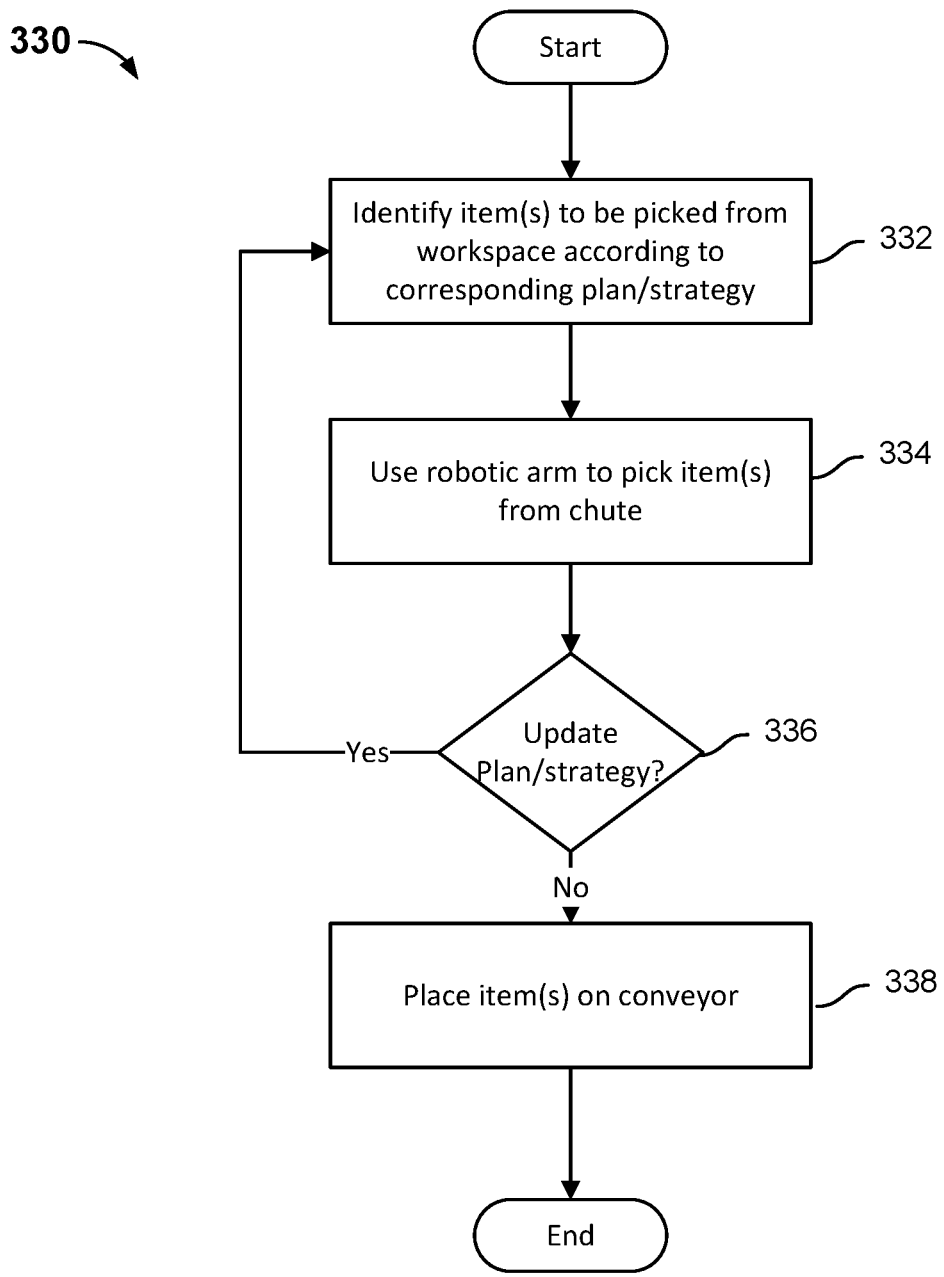
FIG. 3C is a diagram of a process to pick and place items for sorting according to various embodiments.

FIG. 3C is a diagram of a process to pick and place items for sorting according to various embodiments. In various embodiments, the process of FIG. 3C implements step 330 of the process 300 of FIG. 3A.

At 332, one or more items are identified to be picked from the workspace (e.g., from the chute) according to a corresponding plan or strategy to singulate. In some embodiments, a robotic system determines that the one or more items are identified to be picked from the workspace based at least in part on the plan or strategy, and the sensor data obtained from one or more sensors associated with the workspace.

At 334, a robotic arm is used to pick an item from the workspace. In some embodiments, the robotic arm comprises one or more end effectors. The robotic arm may be controlled by one or more processors of the robotic system. The robotic arm picks the item from the workspace based at least in part on the plan or strategy for singulating the item. For example, the manner by which one or more end effectors grasp the item (e.g., a type of end effector, a side of the item grasped, etc.) is determined based at least in part on the plan or strategy for singulating the item.

At 336, a determination as to whether to update the plan or strategy is made. In some embodiments, the robotic system determines whether to update the plan or strategy based at least in part on sensor data obtained while the item is grasped by the robotic arm (e.g., during implementation of the plan or strategy). The sensor data obtained while the item is grasped by the robotic arm can be used to update a model of the workspace. In some embodiments, the robotic system determines whether to update the plan or strategy based at least in part on an updated model of the workspace. As an example, the robotic system can use the updated model of the workspace in connection with detecting a detected state or condition associated with the workspace (e.g., associated with one or more items in the workspace). For example, the robotic system uses the state or condition associated with one or more items in the workspace in connection with determining whether to perform the active measure.

In response to determining to update the plan or strategy at 336, process 330 proceeds to 332 and a further iteration of steps 332, 334, and 336 is performed (e.g., using the detected state or condition in connection with updating the plan or strategy to singulate the item). According to various embodiments, an updated plan or strategy to singulate the item is determined based at least in part on the active measure to perform (e.g., the plan or strategy incorporates at least part of the active measure). In response to determining not to update the plan or strategy, process 330 proceeds to 338 at which the item is placed on the conveyance structure (e.g., in a corresponding slot on the conveyor). For example, a robotic arm is operated to singly place the item on the conveyance structure.

Figure 4:
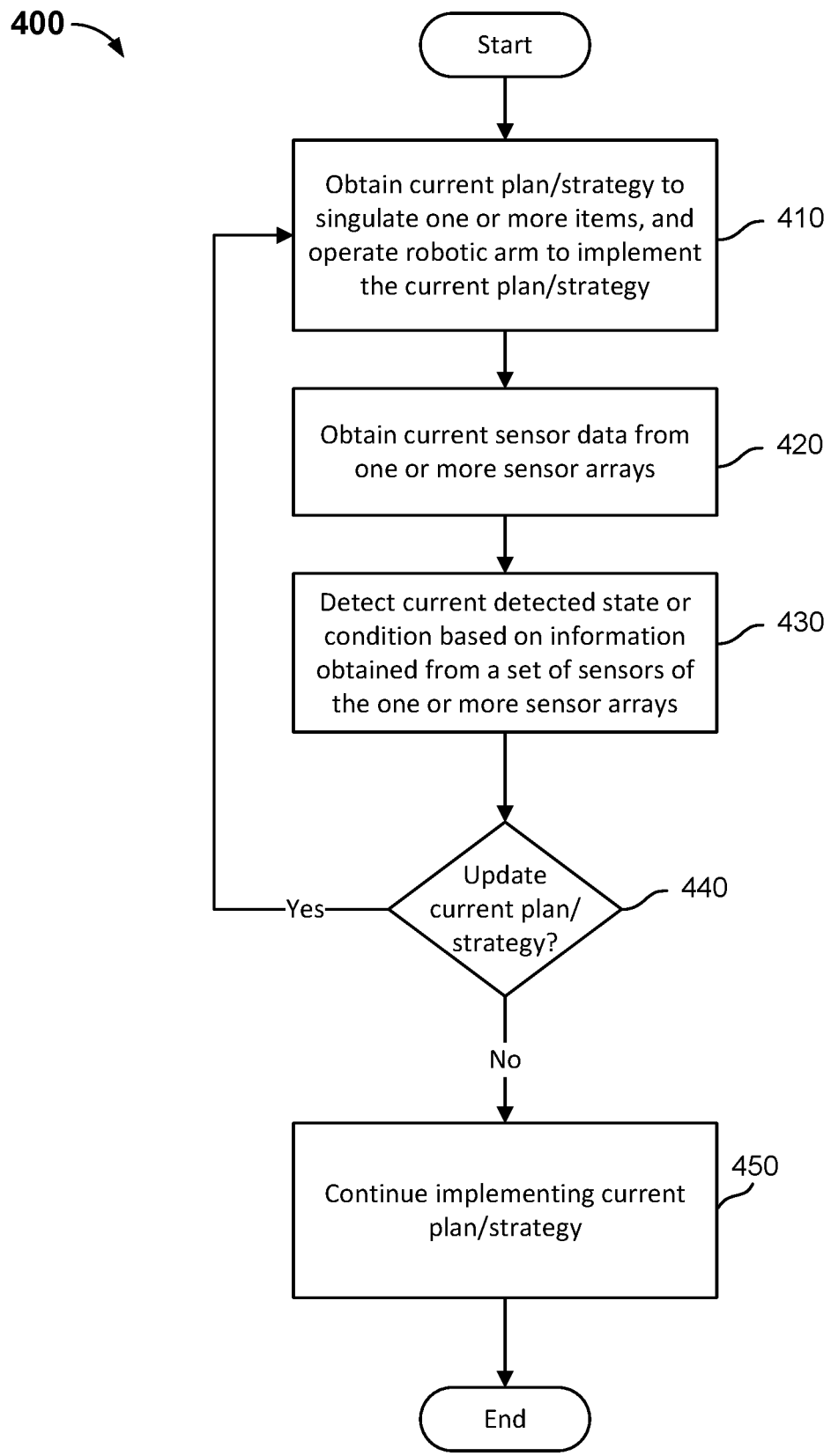
FIG. 4 is a diagram of a process to singulate one or more items using an active measure according to various embodiments.

FIG. 4 is a diagram of a process to singulate one or more items using an active measure according to various embodiments. Process 400 of FIG. 4 can be performed by system 200 of FIG. 2A and FIG. 2B. In some embodiments, process 400 is implemented by a robot system operating to singulate one or more items within a workspace. The robot system includes one or more processors that operate to cause a robotic structure (e.g., a robotic arm) to pick and place items for sorting.

At 410, a current plan or strategy to singulate one or more items is obtained, and a robotic structure is operated to implement the current plan or strategy. In some embodiments, the current plan or strategy to singulate the one or more items is determined using sensor data based on information obtained by one or more sensors associated with the workspace.

The sensor data can include image data associated with a plurality of items present in the workspace. According to various embodiments, the obtained sensor data pertaining to the workspace comprises information from which a model of the workspace may be generated. As an example, the model of the workspace is used in connection with determining the current plan or strategy. One or more characteristics associated with the workspace are determined using the sensor data. In some embodiments, the sensor data is used in connection with determining at least one characteristic of one or more items within the workspace such as items in the source pile/flow of the chute, or an item grasped by the robotic arm. In some embodiments, the sensor data is used in connection with determining one or more characteristics of the conveyance structure such as determining the slots on the conveyor that are empty or unreserved, determining a speed of the conveyor, and/or determining the characteristics of at least one slot or of at least one item already on the conveyor.

According to various embodiments, the sensor data is determined based at least in part on information output from one or more sensors. In some embodiments, the robotic system comprises one or more sensor arrays comprising at least a subset of the one or more sensors. The one or more sensor arrays can include an infrared sensor array, a laser array, etc. Various other sensors can be configured in a sensor array. According to various embodiments, a location of an item (e.g., an item on the workspace, an item grasped by a robotic arm, an item on the conveyor, etc.), a location of the robotic arm, the presence of a blockage or debris, a height of an item, etc. is detected using output from a sensor array. For example, if a sensor array is configured in a manner that a plurality of sensors are arranged vertically, a height of an item is determined based on determining a subset of the sensors in the sensor array that are "tripped" and/or determining a subset of the sensors in the sensor array that are not "tripped." As another example, if a sensor array is configured in a manner that a plurality of sensors are arranged horizontally, a depth or length of an item is determined based on determining a subset of the sensors in the sensor array that are "tripped" and/or determining a subset of the sensors in the sensor array that are not "tripped."

At 420, current sensor data is obtained based on an output from the one or more sensor arrays. According to various embodiments, the current sensor data is obtained while the robotic system is implementing a current plan or strategy. For example, the robotic system receives information from the one or more sensor arrays while the robotic arm is singulating an item from the workspace to the conveyance structure.

According to various embodiments, the one or more sensor arrays are disposed at various locations in or around the environment in which the robotic structure operates. As an example, the one or more sensor arrays are disposed in or around the chute, the conveyance structure (e.g., a part of the conveyance structure within proximity or range of the robotic arm), the workspace within which the robotic arm operates to singulate one or more items, etc. The locations at which one or more sensor arrays are disposed can be selected to provide the robotic system with data pertaining to an environment of the workspace.

In some embodiments, a sensor array has a corresponding emitter and receiver. The emitter emits a signal (e.g., an infrared beam, a laser beam, etc.) and the receiver receives the beam. If the signal is broken because an object blocks the signal from reaching the receiver, the change in the status of the receipt of the signal can be used to indicate the presence of an object. A mapping of the one or more sensor arrays to corresponding locations in or around the workspace is used to indicate the location of an object that blocks one or more of the signals emitted from one or more emitters.

At 430, a current detected state or condition is detected based at least in part on information associated with an output from a set of sensors of the one or more sensor arrays. The current detected state or condition corresponds to a state or condition of the robotic system, the workspace, or other environment in which the robotic system operates while the robotic system is implementing the current plan or strategy (e.g., while the robotic system is singulating one or more items).

In some embodiments, in response to an output from a set of sensors of the one or more sensor arrays, the robotic system can determine the current sensor data. For example, the robotic system uses the output from the set of sensors to generate a current model corresponding to the workspace or the environment in which the robotic system (or robotic arm) operates. The detected state or condition can be determined using the current model.

In some embodiments, a sensor or sensor array is mapped to a location in the workspace or an environment surrounding the workspace. Further, a particular sensor(s) can be respectively mapped to a location in the workspace or the environment. Accordingly, a determination that a set of sensors in a sensor array that are "tripped" (e.g., compared to a subset of sensors that are not "tripped") can be used to determine that an object (e.g., an item, the robotic arm, debris, or another element) is located between the corresponding emitter(s) and receiver(s) of the set of sensors. If the set of sensors in the sensor array is a subset of all sensors in the sensor array, then the robotic system can determine an edge of the object is located between a last "tripped" sensor in the sensor array and the subsequent sensor in the sensor array that is not "tripped." Such a determination can be used to determine the location of the object and/or a dimension of the object (such as height, length, depth, etc.). As a robotic arm grasps an item and moves the item from the workspace to the conveyor in connection with singulating the item, the robotic system can determine a current location of the item based at least in part on determining one or more sensors that are being "tripped" at that time.

In some embodiments, the robotic system can determine one or more other properties associated with the workspace based at least in part on a determination that one or more sensors are being "tripped." For example, in response to a determination that a sensor in a location different from a current location of the item being singulated is tripped, the robotic system can detect a state or condition of the robotic system or workspace. A tripping of a sensor array disposed at the conveyance structure can be used in connection with a determination that an item on the conveyor exceeds a predefined dimension(s) (e.g., the robotic system can determine that the slot adjacent to a slot in which the item is being singulated is occupied by an item exceeding the predefined size). A tripping of a sensor array disposed at the chute can be used in connection with a determination that a clog (e.g., of items) exists within, or feeding to, the workspace, or a determination that debris exists on the chute, and/or a determination that an item or debris is blocking one or more scanners (e.g., a scanner used to read a label or identifier on an item to be singulated thereby preventing reading of the label or identifier).

At 440, a determination whether to update the current plan or strategy is made. In some embodiments, the robotic system determines whether to update the current plan or strategy based at least in part on the current detected state or condition.

In response to determining to update the current plan or strategy at 440, process 400 proceeds to 410 and a further iteration of steps 410, 420, 430, and 440 is performed (e.g., using the detected state or condition in connection with determining the plan or strategy to singulate the item). In the next iteration of 410, the updating of the plan or strategy is performed in connection with obtaining the then-current plan or strategy. For example, the current plan or strategy is determined based at least in part on the current detected state or condition.

In contrast, in response to determining not to update the current plan/strategy, process 400 proceeds to 450 at which the robotic system continues to implement the current plan or strategy. For example, the robotic system continues to singulate one or more items according to the current plan or strategy.

According to various embodiments, the robotic system analyzes the current plan or strategy in view of the current detected state or condition, and robotic system determines whether to update the current plan or strategy. In some embodiments, the robotic system determines to update the current plan or strategy in response to a determination that the current detected state or condition is expected to impede singulation of one or more items.

According to various embodiments, the robotic system determines to update the current plan or strategy in response to a determination that singulation of an item currently being singulated is expected to be impeded. In response to determining that a detected state or condition impedes implementation of a current plan to autonomously operate the robotic structure to pick one or more items from the workspace and place each item singly in a corresponding location in a singulation conveyance structure, the robotic structure determines to update the current plan or strategy to a plan or strategy that improves the likelihood of successful singulation (e.g., the robotic structure can determine an active measure that is expected to improve the likelihood of successful singulation based at least in part on the detected state or condition).

In some embodiments, the robotic system determines a plurality of plans or strategies for singulating one or more items, and corresponding properties of the plurality of plans or strategies such as a measure of a likelihood of successful singulation of the one or more items, a measure of an efficiency of the plan or strategy, etc. The measure of the likelihood of successful singulation of the one or more items can correspond to an expected probability that the robotic structure will successfully singulate the one or more items (e.g., based on a current state or condition of the workspace). The measure of the efficiency of the plan or strategy can include a speed with which the one or more items will be singulated if the corresponding plan or strategy is implemented, a throughput of the robotic system (or robotic structure), etc. According to various embodiments, the robotic system can determine the plan or strategy to implement based on the corresponding properties of the plurality of plans or strategies. For example, the robotic system determines a composite score that represents the corresponding properties of a particular plan or strategy, and the robotic system selects the plan or strategy to be implemented based on the composite score corresponding to such plan or strategy. The robotic system can rank the composite scores respectively corresponding to at least a subset of the plurality of plans or strategies and select the plan or strategy to be implemented based at least in part on the ranking of the composite scores.

Figure 5A:
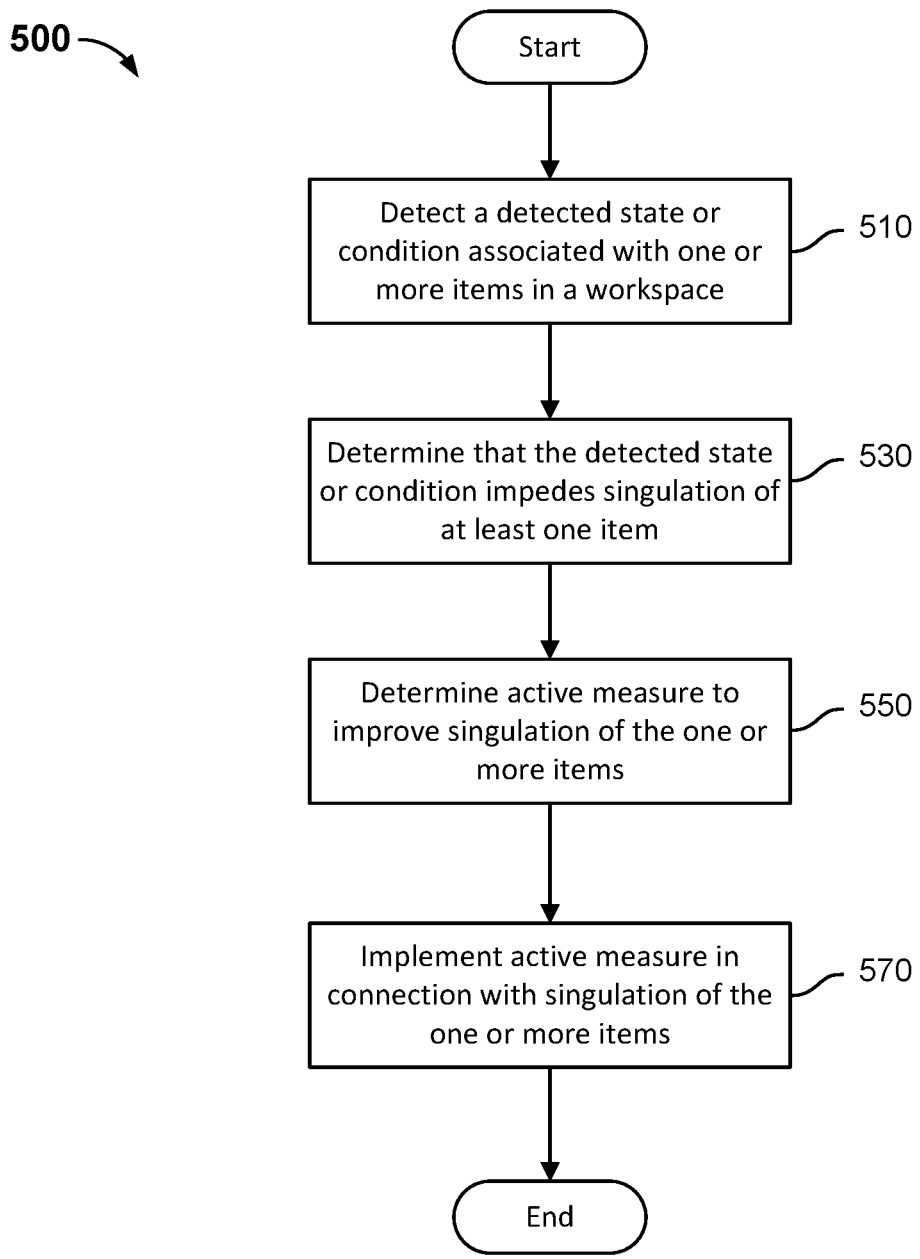
FIG. 5A is a diagram of a process to singulate one or more items using an active measure according to various embodiments.

FIG. 5A is a diagram of a process to singulate one or more items using an active measure according to various embodiments. Process 500 of FIG. 5A can be performed by system 200 of FIG. 2A and FIG. 2B. In some embodiments, process 500 is implemented by a robot system operating to singulate one or more items within a workspace. The robot system includes one or more processors that operate to cause a robotic structure (e.g., a robotic arm) to pick and place items for sorting.

At 510, a detected state or condition associated with one or more items in the workspace is detected. In some embodiments, the robotic system detects the state or condition using sensor data from the workspace environment state system. The sensor data can be obtained based at least in part on information output from one or more sensors that are disposed within or around the workspace, the robotic structure, and/or the conveyance structure. In some embodiments, the robotic system generates a model of the workspace using the information output from the one or more sensors, and the model of the workspace is used in detecting the state or condition.

Examples of the detected state or condition include a deviation from an expected chute flow (e.g., detect a clog or abnormality within the chute flow or workspace environment), a deviation from an expected grasping or releasing mechanism of an end effector of a robotic arm that is used in connection with singulating an item, a detection of debris within the workspace, an object along (or within a predefined proximity of) the planned path for the item during singulation thereof, a possible collision event between the robotic arm or item and another object (e.g., another robotic arm operating within the workspace) during singulation of the item, a state of the conveyance structure (e.g., a speed of the conveyor, an indication that a slot is occupied, a slot of the conveyor being occupied by an item exceeding a threshold size, etc.), a weight of an item currently grasped by the robotic arm, etc. Various other states or conditions are possible.

According to various embodiments, the robotic system detects a clog or abnormality within the chute flow or workspace environment by using the sensor data to model flow (of items) through the chute and determining that the modeled flow deviates from an expected flow (e.g., a model of flow in normal operation or within thresholds defining a flow according to normal operation). The robotic system can use the vision system to model the flow. For example, a 3D model of the flow is determined based at least in part on sensor data from the vision system.

In some embodiments, the robotic system detects a clog or abnormality within the chute flow or workspace environment based on a determination that a front of the chute (e.g., a position of the chute nearest the conveyance structure and/or a robotic structure of the workspace) is not populated with items or repopulated with items. For example, the chute comprises a conveyor that moves items from an intake of the chute to a front of the chute. In response to determining that the conveyor included in the chute is operated and that items are not repopulating the front of the chute, the system detects the clog or abnormality within the chute flow or workspace environment. The system can determine that the front of the chute does not comprise items and is not repopulated with items based on an output from one or more sensors disposed at the front of the chute. One or more infrared sensors can be disposed at the front of the chute and the determination that none of the one or more sensors are tripped can be deemed to be indicative that no items are located at the front of the chute.

At 530, the detected state or condition is determined to impede singulation of at least one item. In some embodiments, the robotic system determines that singulation of the at least one item is expected to be impeded by the detected state or condition.

The robotic system can determine that the detected state or condition is likely to impede singulation of the at least one item based on a comparison of a current plan or strategy to singulate the at least one item. As an example, if the detected state or condition corresponds to a location of an object within the workspace (e.g., the chute and/or the conveyance structure), the robotic structure determines that the location of the object intersects with a planned path or trajectory of an item to be singulated and correspondingly determines that the detected state or condition is likely to impede such singulation. As another example, if the detected state or condition corresponds to a determination that the slot in which at least one item to be singulated already includes another item (e.g., an item that was singulated by an upstream robotic structure), the robotic structure determines that the presence of the other item impedes singulation of the item to be singulated by the robotic structure. As a further example, if the detected state or condition corresponds to a detected weight of an item grasped by a robotic arm, the robotic system determines whether the weight of the item would impede singulation (e.g., if the weight of the item exceeds a weight that is movable by the robotic arm or for which an end effector can maintain a grasp). As a further example, if the detected state or condition corresponds to a pressure or other value indicative of a grasping strength by which the robotic arm has grasped an item to be singulated, the robotic system determines whether the pressure or grasping strength is consistent with normal operation of the robotic arm (e.g., whether an abnormal pressure or grasping strength is measured) and/or whether the pressure or grasping strength is sufficient in order to maintain grasp of the item to be singulated (e.g., based on a type of package, size, and/or weight of the item to be singulated, etc.).

According to various embodiments, a model of a likelihood of successful singulation of an item is generated. The robotic system can determine the model of the likelihood of successful singulation of an item based at least in part on one or more properties associated with one or more items to be singulated, one or more properties of the workspace (or other object within the workspace), etc. The model of the likelihood of successful singulation can comprise a probabilistic measure that an item to be singulated is successfully singulated by a corresponding robotic structure. According to various embodiments, in response to detecting a new state or condition (e.g., a state or condition that was not present when the current plan or strategy for singulation was determined, or a state or condition that was not taken into account in determining the current strategy), the model of the likelihood of successful singulation is updated to reflect a current likelihood that singulation of the current item is successful. A determination of whether to perform an active measure (e.g., to change or adapt the current plan to singulate the item to a detected state or condition associated with one or more items in the workspace) can be based at least in part on the updated model of the likelihood of successful singulation.

At 550, an active measure to improve the singulation of the one or more items is determined. In some embodiments, the active measure is a measure that adapts singulation of the one or more items to the state or condition in connection with picking an item from a source pile/flow (e.g., a workspace) and placing the item on a segmented conveyor or similar conveyance to be sorted and routed for transport to a downstream (e.g., ultimate address/physical) destination.

In some embodiments, the active measure includes using a robotic arm, an end effector of the robotic arm, a movement of a chute or other element of the workspace, or an air blower to reconfigure the source pile/flow or to reconfigure one or more items or debris within the workspace. The active measure can be performed to improve a scanning of a label or identifier on an item to be singulated, to improve the likelihood that an item can be picked up, to improve the grip on an item being singulated, to improve the release of an item from the robotic arm, to improve operation of two robotic arms that are independently singulating items from the same workspace (e.g., the same source pile/flow), and/or to improve the path or trajectory of the item to be singulated (e.g., by changing the path or trajectory or by removing a detected obstacle along the planned path or trajectory). Various other active measures are possible.

At 570, the active measure is implemented in connection with the singulation of the one or more items. In some embodiments, in response to a determination that an active measure is to be performed, the plan or strategy for singulating one or more items is updated (e.g., to include the active measure), and the active measure is implemented.

Various active measures are described in connection with the description of FIGS. 5B-5F. In various embodiments, a robotic system as disclosed herein may implement one or more of the active measures illustrated in FIGS. 5B-5E and/or one or more other measures.

Figure 5B:
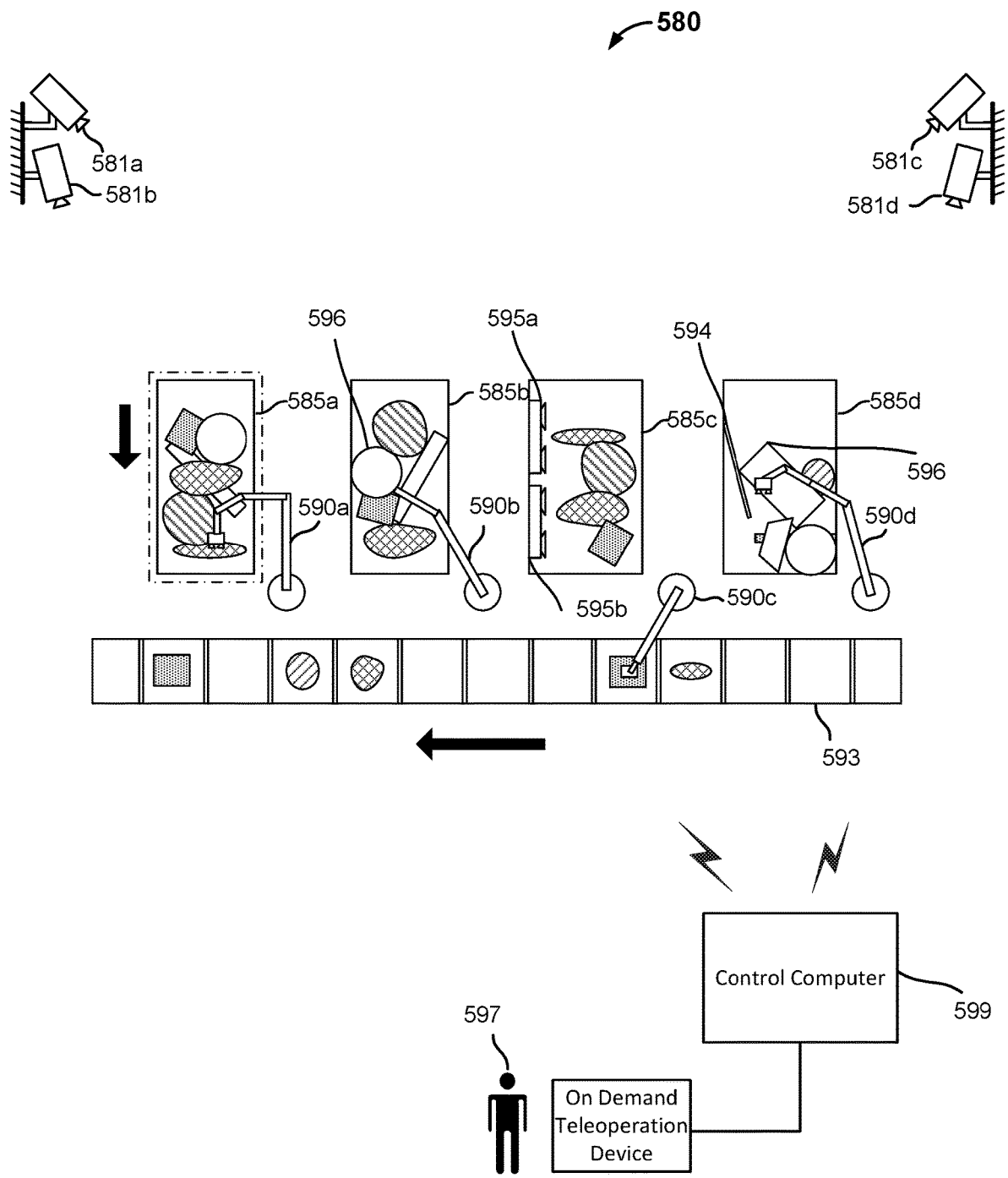
FIG. 5B is a diagram illustrating a robotic singulation system singulating one or more items using an active measure according to various embodiments.

FIG. 5B is a diagram illustrating a robotic singulation system singulating one or more items using an active measure according to various embodiments.

In various embodiments, a robotic system comprising one or more robotic arms performs singulation/induction that includes performing one or more active measures in response to a detected state or condition associated with one or more items in the workspace of the robotic system. The robotic system can include one or more robotic arms each having one or more end effectors. In the example shown in FIG. 5B, system 580 includes one or more of a plurality of robotic arms 590*a*, 590*b*, 590*c*, and 590*d*, each operating at a corresponding workspace 585*a*, 585*b*, 585*c*, and 585*d*. The plurality of robotic arms 590*a*, 590*b*, 590*c*, and 590*d* respectively operate to singulate items within workspace 585*a*, 585*b*, 585*c*, and 585*d* to conveyance structure 593. The plurality of robotic arms 590*a*, 590*b*, 590*c*, and 590*d* include one or more end effectors (not shown). The end effectors can be suction-based end effectors, a pinch-based end effector, or various other types of end effectors.

System 580 includes image sensors, including in this example 3D cameras 581*a*, 581*b*, 581*c*, and/or 581*d*. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. In various embodiments, control computer 599 includes a workspace environment state system such as a vision system used to discern individual items, debris on the workspace, and each item's orientation based on sensor data such as image data provided by image sensors, including in this example 3D cameras 581*a*, 581*b*, 581*c*, and/or 581*d*. The workspace environment state system can also include sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

The workspace environment state system produces output used by system 580 to determine and implement a plan to autonomously operate at least one of the plurality of robotic arms 590*a*, 590*b*, 590*c*, and 590*d* to pick one or more items from at least one workspace of the plurality of workspaces 585*a*, 585*b*, 585*c*, and 585*d*, and place each of the one or more items in a corresponding available defined location for machine identification and sorting, such as a partitioned section of segmented conveyor 593. In some embodiments, the workspace environment state system produces an output (e.g., sensor data or information otherwise characterizing the workspace and items within the workspace) used by system 580 to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state or condition (e.g., implement a change on how an item is singulated, implement to reconfigure items within the source pile/flow to make grasping a selected item easier, etc.).

As will be described more fully below, different active measures are implemented at workspaces 585*a*, 585*b*, 585*c*, and 585*d*.

At workspace 585*a*, the active measure comprises adjusting the chute. Examples of adjusting the chute comprise: adjusting a tilt of the chute, vibrating the chute (e.g., by activating one or more motors operatively connected to the chute), adjusting a height of the chute (e.g., by raising or lowering the chute), etc. Various adjustments to the chute are possible. In some embodiments, the chute is adjusted to disrupt one more items within the chute or workspace.

Figure 5C:
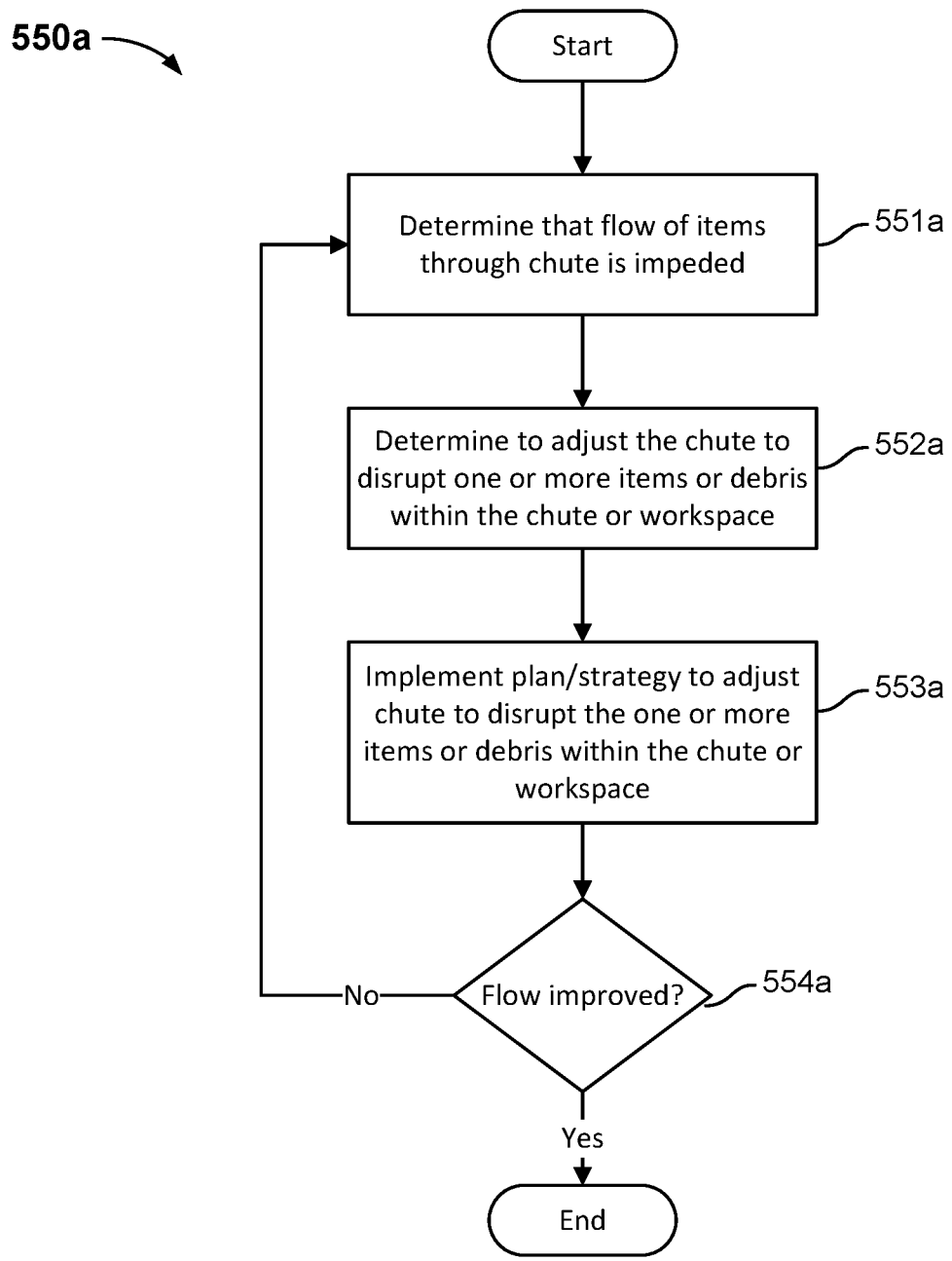
FIG. 5C is a diagram of a process to singulate one or more items using an active measure of adjusting a chute of a robotic singulation system according to various embodiments.

FIG. 5C is a diagram of a process to singulate one or more items using an active measure of adjusting a chute of a robotic singulation system according to various embodiments. Process 550*a* of FIG. 5C can be performed by system 580 of FIG. 5B. In various embodiments, the process of FIG. 5C implements steps 550 and/or 570 of process 500 of FIG. 5A. In some embodiments, process 550*a* is implemented by a robot system operating to singulate one or more items within a workspace such as workspace 585*a* of system 580 of FIG. 5B. System 580 includes one or more processors that operate to cause robot arm 590*a* to pick and place items for sorting.

At 551*a*, a flow of items through the chute is determined to be impeded. According to various embodiments, system 580 determines that the flow of items through the chute is impeded based at least in part on sensor data obtained based on information output from one or more sensors within system 580. For example, system 580 determines that the flow of items through the chute is impeded based at least in part on a detected state or condition associated with one or more items in the workspace. In some embodiments, system 580 determines that the flow of items through the chute is impeded in response to determining that a model of a current flow of items through the chute deviates from a model of normal flow through the chute. The model of the flow of items through the chute can be generated based at least in part on sensor data pertaining to a workspace and/or one or more items within the workspace.

At 552*a*, a determination to adjust the chute is made. In some embodiments, system 580 determines to adjust the chute to disrupt one or more items or debris within the chute or workspace 585*a*. The determination to adjust the chute can be based at least in part on a determination that impeded flow of items through the chute impedes singulation of one or more items.

According to various embodiments, in response to determining that the flow of items through the chute is determined to be impeded, system 580 determines whether an adjustment to the chute would change or adapt singulation of one or more items to the impeded flow of items through the chute. System 580 can determine whether an adjustment to the chute will improve or normalize the flow of items through the chute. In response to determining that an adjustment to the chute would improve or normalize the flow of items through the chute, system 580 determines to adjust the chute.

At 553*a*, a plan or strategy to adjust the chute (e.g., to disrupt the one or more items or debris) is implemented. In some embodiments, one or more processors cause system 580 to implement the plan or strategy to adjust the chute.

According to various embodiments, system 580 determines a manner by which the chute is to be adjusted based at least in part on a detected state or condition associated with one or more items in the workspace. For example, system 580 determines the cause (or a likely cause) of the flow of items through the chute being impeded, and system 580 determines an adjustment of the chute that is expected to (or likely to) improve the flow of items through the chute. System 580 can determine an adjustment to the chute that is expected to return the flow of items through the chute to a normal state. Adjustment of the chute in workspace 585*a* is denoted by the dotted line around the chute.

Adjusting the chute to disrupt the one or more items or debris within the chute or workspace can comprise adjusting a tilt of the chute. The tilt of the chute can be adjusted by operating one or more motors operatively connected to the chute to raise a part of the chute, to lower a part of the chute, or both. The tilt of the chute can be effected by various other mechanisms.

Adjusting the chute to disrupt the one or more items or debris within the chute or workspace can comprise vibrating the chute. The chute can be vibrated by operating one or more motors operatively connected to the chute to vibrate at least a part of the chute, to lower a part of the chute, or both. Vibration of the chute can be effected by various other mechanisms.

Adjusting the chute to disrupt the one or more items or debris within the chute or workspace can comprise adjusting a height of the chute. The chute can be raised or lowered by operating one or more motors operatively connected to the chute to raise the chute or to lower the chute. As an example, the chute can be configured with a rack and pinion mechanism, a screw jack mechanism, pneumatic and/or hydraulic mechanism, or such other mechanism to raise/lower the chute. In the case of the chute being configured with a rack and pinion mechanism, system 580 can operate a motor to drive (e.g., rotate) a pinion to traverse a rack, and the chute is correspondingly raised/lowered. Adjustment of the height of the chute can be effected by various other mechanisms.

At 554*a*, a determination is made of whether the flow of items through the chute is improved. In some embodiments, in response to implementing a plan or strategy to adjust the chute, system 580 obtains current sensor data and uses the current sensor data to determine whether the adjustment to the chute has improved the flow of items through the chute. In response to determining that the flow through the chute has improved, process 550*a* ends (e.g., the implementation of the active measure is complete). In contrast, in response to determining that the flow of items through the chute has not improved, process 550*a* proceeds to 551*a* and a further iteration of steps 551*a*, 552*a*, 553*a*, and 554*a* is performed. In subsequent iterations of process 550*a*, system 580 can determine to perform a different adjustment of the chute (e.g., because the current adjustment of the chute did not resolve the impeded flow of items through the chute).

A determination of whether the flow of items through the chute is improved can be based at least in part on a model of the flow of items through the chute. The model of the flow of items can be generated based at least in part on sensor data pertaining to the workspace (e.g., sensor data associated with one or more items within the workspace). System 580 can determine whether the flow of items is improved based on a measure of throughput of items through the chute and/or a comparison between the current flow through the chute and an expected normal flow through the chute.

Figure 5D:
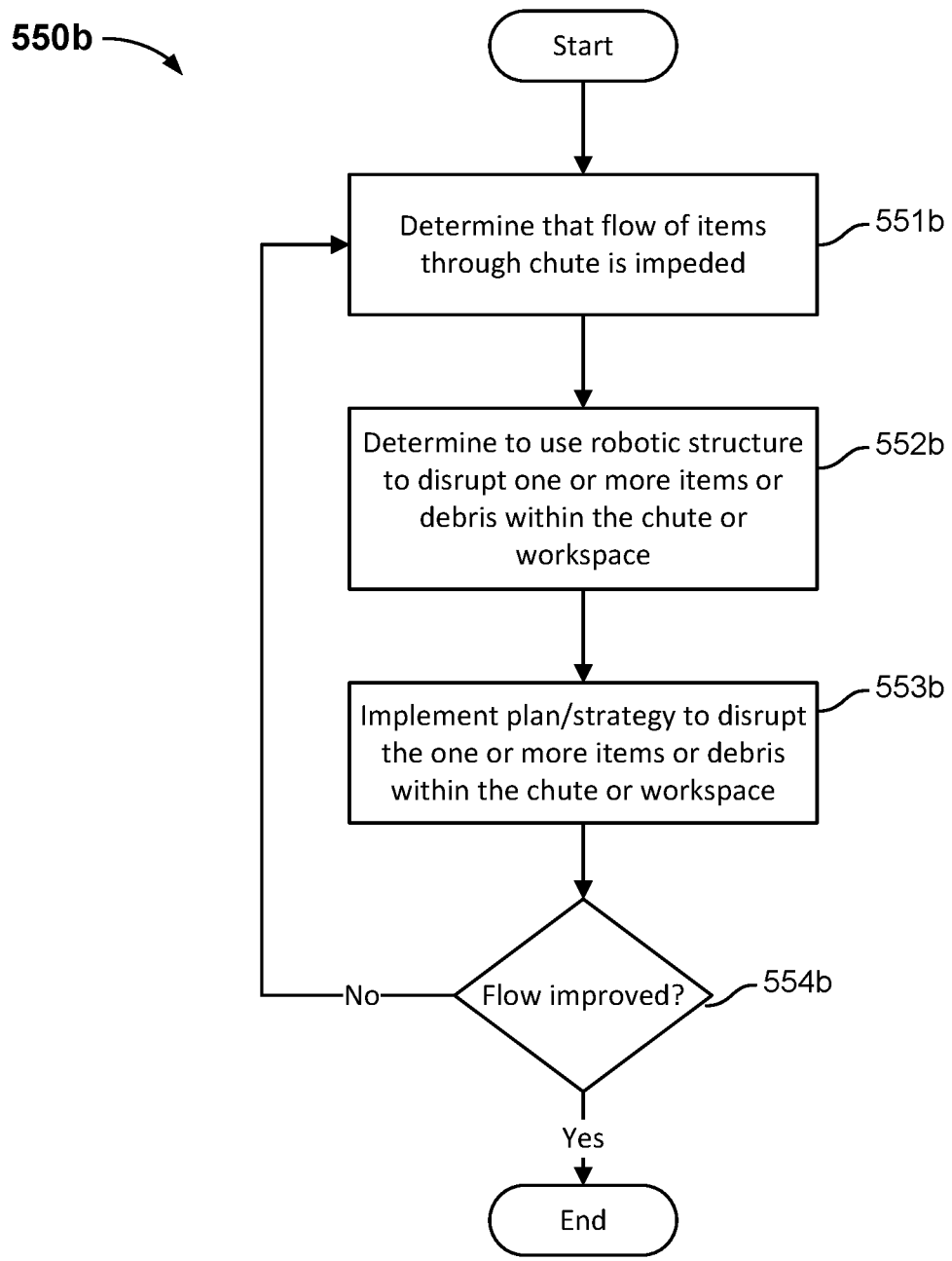
FIG. 5D is a diagram of a process to singulate one or more items using an active measure of using a robotic structure to disrupt an item on a chute of a robotic singulation system according to various embodiments.

FIG. 5D is a diagram of a process to singulate one or more items using an active measure of using a robotic structure to disrupt an item on a chute of a robotic singulation system according to various embodiments. Process 550*b* of FIG. 5D can be performed by system 580 of FIG. 5B. In various embodiments, the process of FIG. 5D implements steps 550 and/or 570 of process 500 of FIG. 5A. In some embodiments, process 550*b* is implemented by a robot system operating to singulate one or more items within a workspace such as workspace 585*b* of system 580 of FIG. 5B.

At 551*b*, a flow of items through the chute is determined to be impeded. According to various embodiments, 551*b* of process 550*b* of FIG. 5D can be similar to, or the same as, 551*a* of process 550*a* of FIG. 5C.

At 552*b*, a determination is made to use a robotic structure to disrupt one or more items or debris within the chute or workspace. According to various embodiments, the robotic structure used to disrupt the one or more items or debris within the chute or workspace corresponds to robotic arm 590*b* of FIG. 5B. The robotic arm 590*b* can be used to push or grasp and pull one or more items within the chute or workspace 585*b* in order to unclog the flow of items through the chute or to otherwise reconfigure the one or more items within the workspace. The use of the robotic structure to disrupt the one or more items or debris within the chute or workspace 585*b* can be implemented in order to improve the singulation of one or more items within workspace 585*b*.

According to various embodiments, in response to determining that the flow of items through the chute is determined to be impeded, system 580 determines whether use of the robotic structure to disrupt the one or more items or debris within the chute or workspace 585*b* would change or adapt singulation of one or more items to the impeded flow of items through the chute. System 580 can determine whether use of the robotic structure to disrupt the one or more items or debris will improve or normalize the flow of items through the chute, or otherwise increase the likelihood that singulation of one or more items will be successful. In response to determining that use of the robotic structure to disrupt the one or more items or debris improves or normalizes the flow of items through the chute, system 580 determines to use the robotic structure to disrupt the one or more items or debris.

At 553*b*, a plan or strategy to use the robotic structure to disrupt the one or more items or debris within the chute or workspace 585*b* is implemented. In some embodiments, one or more processors cause system 580 to implement the plan or strategy to use the robotic structure to disrupt the one or more items or debris within the chute or workspace 585*b*.

According to various embodiments, system 580 determines a manner by which the robotic arm 590*b* is used to disrupt the one or more items or debris within the chute or workspace 585*b* based at least in part on a detected state or condition associated with one or more items in the workspace. For example, system 580 determines the cause (or a likely cause) of the flow of items through the chute being impeded, and system 580 determines a use of the robotic arm that will improve the flow of items through the chute. System 580 can determine a use of the robotic arm that is expected to return the flow of items through the chute to a normal state. As illustrated in FIG. 5B, robotic arm 590*b* is used to engage item 596 in workspace 585*b*. Robotic arm 590*b* can be used to push item 596, or to grasp and pull item 596 (e.g., to dislodge item 596, or to move item 596 from impeding the use of sensors disposed within workspace 585*b*).

According to various embodiments, robotic arm 590*b* is operated to reach back into the chute (e.g., towards a part of the chute via which new items are introduced to the chute), and robotic arm 590*b* is used to engage with one or more items or debris within the chute or workspace 585*b* to disrupt the one or more items or debris.

At 554*b*, a determination is made of whether the flow of items through the chute is improved. In some embodiments, in response to implementing a plan or strategy to use robotic arm 590*b* to disrupt the one or more items or debris within the chute or workspace 585*b*, system 580 obtains current sensor data and uses the current sensor data to determine whether the flow of items through the chute has improved. In response to determining that the flow through the chute has improved, process 550*b* ends (e.g., the implementation of the active measure is complete). In contrast, in response to determining that the flow of items through the chute has not improved, process 550*b* proceeds to 551*b* and a further iteration of steps 551*b*, 552*b*, 553*b*, and 554*b* is performed. In subsequent iterations of process 550*b*, system 580 can determine to use robotic arm 590*b* to engage or disrupt a different item or debris within the chute or workspace, or to use a different strategy for engaging with the same item or debris.

Figure 5E:
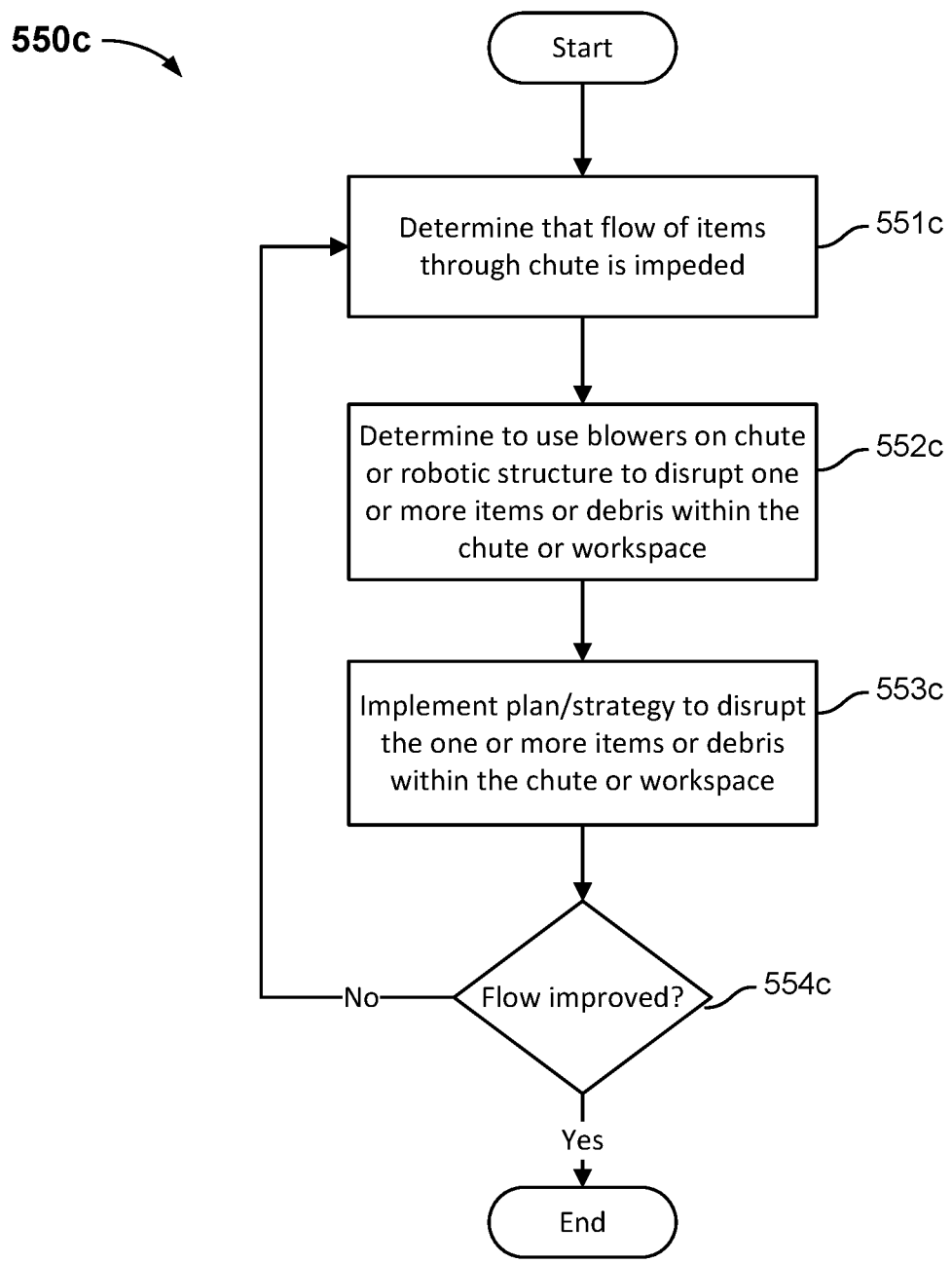
FIG. 5E is a diagram of a process to singulate one or more items using an active measure of blowing air to reposition an item or debris on a chute of a robotic singulation system according to various embodiments.

FIG. 5E is a diagram of a process to singulate one or more items using an active measure of blowing air to reposition an item or debris on a chute of a robotic singulation system according to various embodiments. Process 550*c* of FIG. 5E can be performed by system 580 of FIG. 5B. In various embodiments, the process of FIG. 5E implements steps 550 and/or 570 of process 500 of FIG. 5A. In some embodiments, process 550*c* is implemented by a robot system operating to singulate one or more items within a workspace such as workspace 585*c* of system 580 of FIG. 5B.

At 551*c*, a flow of items through the chute is determined to be impeded. According to various embodiments, 551*c* of process 550*c* of FIG. 5E can be similar to, or the same as, 551*a* of process 550*a* of FIG. 5C.

At 552*c*, a determination is made to use one or more blowers to disrupt one or more items or debris within the chute or workspace. According to various embodiments, one or more blowers are disposed within the workspace. As illustrated in FIG. 5B, workspace 585*c* comprises blowers 595*a* and 595*b* disposed at one or more sides of the chute or workspace 585*c*. In some embodiments, robotic arm 590*c* comprises one or more blowers. For example, if robotic arm 590*c* comprises a suction-based end effector, system 580 can use the suction-based end effector to blow air outwards from the suction-based end effector to the surrounding environment (e.g., by reversing the air flow in the corresponding pneumatic system). The use of one or more blowers to disrupt one or more items or debris within the chute or workspace 585*c* can be implemented in order to improve the singulation of one or more items within workspace 585*c*.

The one or more blowers can be pneumatic elements that blow air in order to remove (e.g., blow) debris from the chute or to reconfigure (e.g., change a position of) one or more items within workspace 585*c*. The pressure from the pneumatic elements can be adjusted. For example, if one or more items or debris to be disrupted are relatively large, system 580 can configure the blowers to more forcefully blow air directed at the one or more items or debris. In some embodiments, the one or more blowers disposed within the chute are "knife" blowers positioned along a side of the chute.

According to various embodiments, in response to determining that the flow of items through the chute is determined to be impeded, system 580 determines whether use of one or more blowers to disrupt the one or more items or debris within the chute or workspace 585*c* would change or adapt singulation of one or more items to the impeded flow of items through the chute. System 580 can determine whether use of the one or more blowers to disrupt the one or more items or debris will improve or normalize the flow of items through the chute, or otherwise increase the likelihood that singulation of one or more items will be successful. In response to determining that use of the one or more blowers to disrupt the one or more items or debris improves or normalizes the flow of items through the chute, system 580 determines to use the one or more blowers to disrupt the one or more items or debris.

At 553*c*, a plan or strategy to use the one or more blowers to disrupt the one or more items or debris within the chute or workspace 585*c* is implemented. In some embodiments, one or more processors cause system 580 to implement the plan or strategy to use the one or more blowers 595*a* and/or 595*b* to disrupt the one or more items or debris within the chute or workspace 585*c*.

According to various embodiments, system 580 determines a manner by which the one or more blowers are used to disrupt the one or more items or debris within the chute or workspace 585*c* based at least in part on a detected state or condition associated with one or more items in the workspace 585*c*. For example, system 580 determines the cause (or a likely cause) of the flow of items through the chute being impeded, and system 580 determines that the use of blowers 595*a* and/or 595*b* will improve the flow of items through the chute. As another example, system 580 determines whether to use pre-arranged blowers 595*a* and/or 595*b*, or whether to reverse the airflow in a suction-based end effector on robotic arm 590*c* (or to use another blower disposed on robotic arm 590*c*) to disrupt the one or more items or debris within the chute or workspace 585*c*. In some embodiments, blowers 595*a* and/or 595*b* comprise vents and system 580 can configure the vents to direct airflow in a particular direction. In some embodiments, robotic arm 590*c* is operated to move to a position from which a blower disposed on robotic arm 590*c* can direct airflow in a desired direction.

At 554*c*, a determination is made of whether the flow of items through the chute is improved. In some embodiments, in response to implementing a plan or strategy to use the one or more blowers to disrupt the one or more items or debris within the chute or workspace 585*c*, system 580 obtains current sensor data and uses the current sensor data to determine whether the flow of items through the chute has improved. In response to determining that the flow through the chute has improved, process 550*c* ends (e.g., the implementation of the active measure is complete). In contrast, in response to determining that the flow of items through the chute has not improved, process 550*c* proceeds to 551*c* and a further iteration of steps 551*c*, 552*c*, 553*c*, and 554*c* is performed. In subsequent iterations of process 550*c*, system 580 can determine to use a different blower or change a setting of a previously used blower (e.g., a direction of a vent, an amount of airflow, etc.) to engage or disrupt a different item or debris within the chute or workspace, or to use a different strategy for engaging with the same item or debris.

Figure 5F:
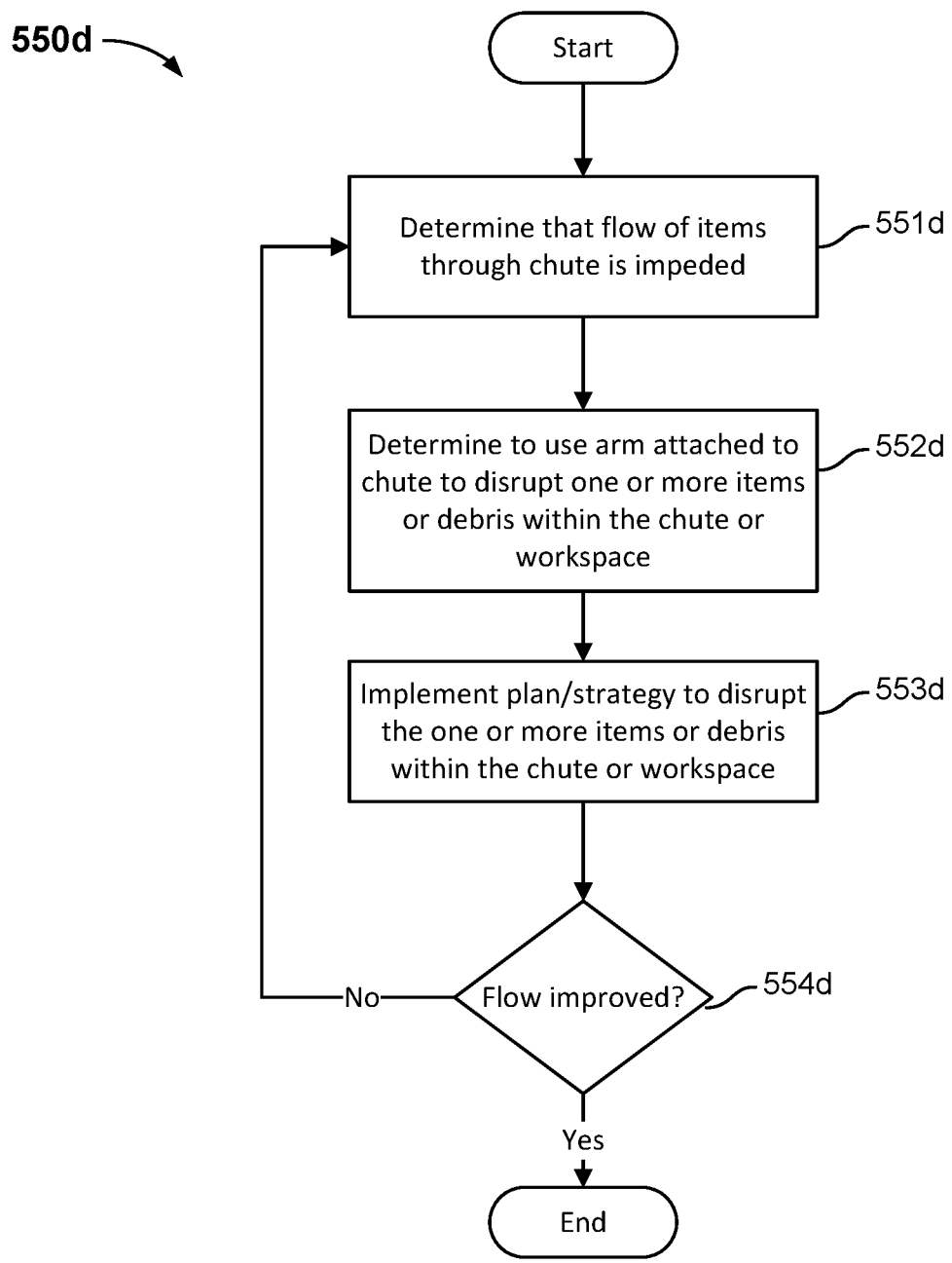
FIG. 5F is a diagram of a process to singulate one or more items using an active measure of using an arm attached to a chute of a robotic singulation system to reposition an item or debris on the chute according to various embodiments.

FIG. 5F is a diagram of a process to singulate one or more items using an active measure of using an arm attached to a chute of a robotic singulation system to reposition an item or debris on the chute according to various embodiments. Process 550*d* of FIG. 5F can be performed by system 580 of FIG. 5B. In various embodiments, the process of FIG. 5F implements steps 550 and/or 570 of process 500 of FIG. 5A. In some embodiments, process 550*d* is implemented by a robot system operating to singulate one or more items within a workspace such as workspace 585*d* of system 580 of FIG. 5B.

At 551*d*, a flow of items through the chute is determined to be impeded. According to various embodiments, 551*d* of process 550*d* of FIG. 5F can be similar to, or the same as, 551*a* of process 550*a* of FIG. 5C.

At 552*d*, a determination is made to use an arm or other element included in the chute to disrupt one or more items or debris within the chute or workspace. According to various embodiments, the arm or other element included in the chute used to disrupt the one or more items or debris within the chute or workspace is different from robotic arm 590*d*. The arm or other element included in the chute can be integrated into the workspace 585*d* or operatively connected to the chute. As illustrated in FIG. 5B, arm 594 is disposed on an inner side of the chute in workspace 585*d*. The arm can be extended to engage with items or debris within the chute. In some embodiments, arm 594 is operated to extend and push one or more items within the chute or workspace 585*d* in order to unclog the flow of items through the chute or to otherwise reconfigure the one or more items within the workspace. The use of the arm or other element included in the chute to disrupt the one or more items or debris within the chute or workspace 585*d* can be implemented in order to improve the singulation of one or more items within workspace 585*d*.

In some embodiments, the arm or other element included in the chute comprises a chute conveyor. The chute conveyor may be operated in a "jitter" mode to move forward and back in successive bursts to de-stack or shake items off one another or otherwise reposition the items to be picked from the workspace. In some embodiments, a chute conveyor as disclosed herein comprises a modular, movable hardware of a form factor suitable to be placed on a portion of the chute at an end nearest the robotic arm. The chute conveyor may have a low profile (height) to make it easier for items moving through the chute, e.g., by gravity, to flow onto a top surface of the chute conveyor. The chute conveyor may sit in a recess to make the top surface more closely flush with (i.e., on a same level as) a gravity fed portion of the chute that precedes the chute conveyor in the direction of item flow through the chute.

According to various embodiments, in response to determining that the flow of items through the chute is determined to be impeded, system 580 determines whether use of the arm or other element included in the chute to disrupt the one or more items or debris within the chute or workspace 585*d* would change or adapt singulation of one or more items to the impeded flow of items through the chute. System 580 can determine whether use of the arm or other element included in the chute to disrupt the one or more items or debris will improve or normalize the flow of items through the chute, or otherwise increase the likelihood that singulation of one or more items will be successful. In response to determining that use of the arm or other element included in the chute to disrupt the one or more items or debris improves or normalizes the flow of items through the chute, system 580 determines to use the arm or other element included in the chute to disrupt the one or more items or debris.

At 553d, a plan or strategy to use the arm or other element included in the chute to disrupt the one or more items or debris within the chute or workspace 585d is implemented. In some embodiments, one or more processors cause system 580 to implement the plan or strategy to use the robotic structure to disrupt the one or more items or debris within the chute or workspace 585d.

According to various embodiments, system 580 determines a manner by which the robotic arm 590d is used to disrupt the one or more items or debris within the chute or workspace 585d based at least in part on a detected state or condition associated with one or more items in the workspace. For example, system 580 determines the cause (or a likely cause) of the flow of items through the chute being impeded, and system 580 determines a use of the robotic arm that will improve the flow of items through the chute. System 580 can determine a use of the robotic arm that is expected to return the flow of items through the chute to a normal state. As illustrated in FIG. 5B, arm 594 is used to engage an item in workspace 585d. Arm 594 can be used to push an item (e.g., to dislodge item 596, or to move item 596 from impeding the use of sensors disposed within workspace 585d, to reconfigure an item, to knock the item onto its side, etc.).

According to various embodiments, arm 594 is operated to reach back into the chute (e.g., towards a part of the chute via which new items are introduced to the chute), and arm 594 is used to engage with one or more items or debris within the chute or workspace 585d to disrupt the one or more items or debris.

At 554d, a determination is made of whether the flow of items through the chute is improved. In some embodiments, in response to implementing a plan or strategy to use arm 594 to disrupt the one or more items or debris within the chute or workspace 585d, system 580 obtains current sensor data and uses the current sensor data to determine whether the flow of items through the chute has improved. In response to determining that the flow through the chute has improved, process 550d ends (e.g., the implementation of the active measure is complete). In contrast, in response to determining that the flow of items through the chute has not improved, process 550d proceeds to 551d and a further iteration of steps 551d, 552d, 553d, and 554d is performed. In some embodiments, in response to determining that the flow of the items has not improved, system 580 determines to use a different type of active measure to improve the flow or singulation of the items. In subsequent iterations of process 550d, system 580 can determine to use arm 594 to engage or disrupt a different item or debris within the chute or workspace 585d, or to use a different strategy for engaging with the same item or debris.

In some embodiments, the active measure comprises requesting human intervention from human operator 597 via manual intervention by human operator 597, or via a remote intervention using an on-demand teleportation device with which human operator 597 can control one or more of robotic arms 590a, 590b, 590c, and 590d, or can configure a setting of system 580 using control computer 599.

Although various embodiments described in connection with FIGS. 5A-5F included the use of one or more active measures in response to determining that the flow of items is impeded in the chute, an active measure such as those described in FIGS. 5A-5F can be performed in response to other detected states or conditions such as states or conditions associated with one or more items in the workspace. Active measures can be performed to reconfigure or rearrange items or debris within a workspace to improve singulation of one or more items. For example, an item can be rearranged to improve the scanning of an identifier or label on the item. As another example, an item can be rearranged to improve the grasping of the item. In the case of an item arranged such that its longest side is perpendicular to the surface of the chute, an active measure can be implemented to rearrange the item such that the longest side thereof is parallel with the surface of the chute (e.g., to knock the item over). Various active measures can be implemented in various contexts in response to detected states or conditions.

Figure 6A:
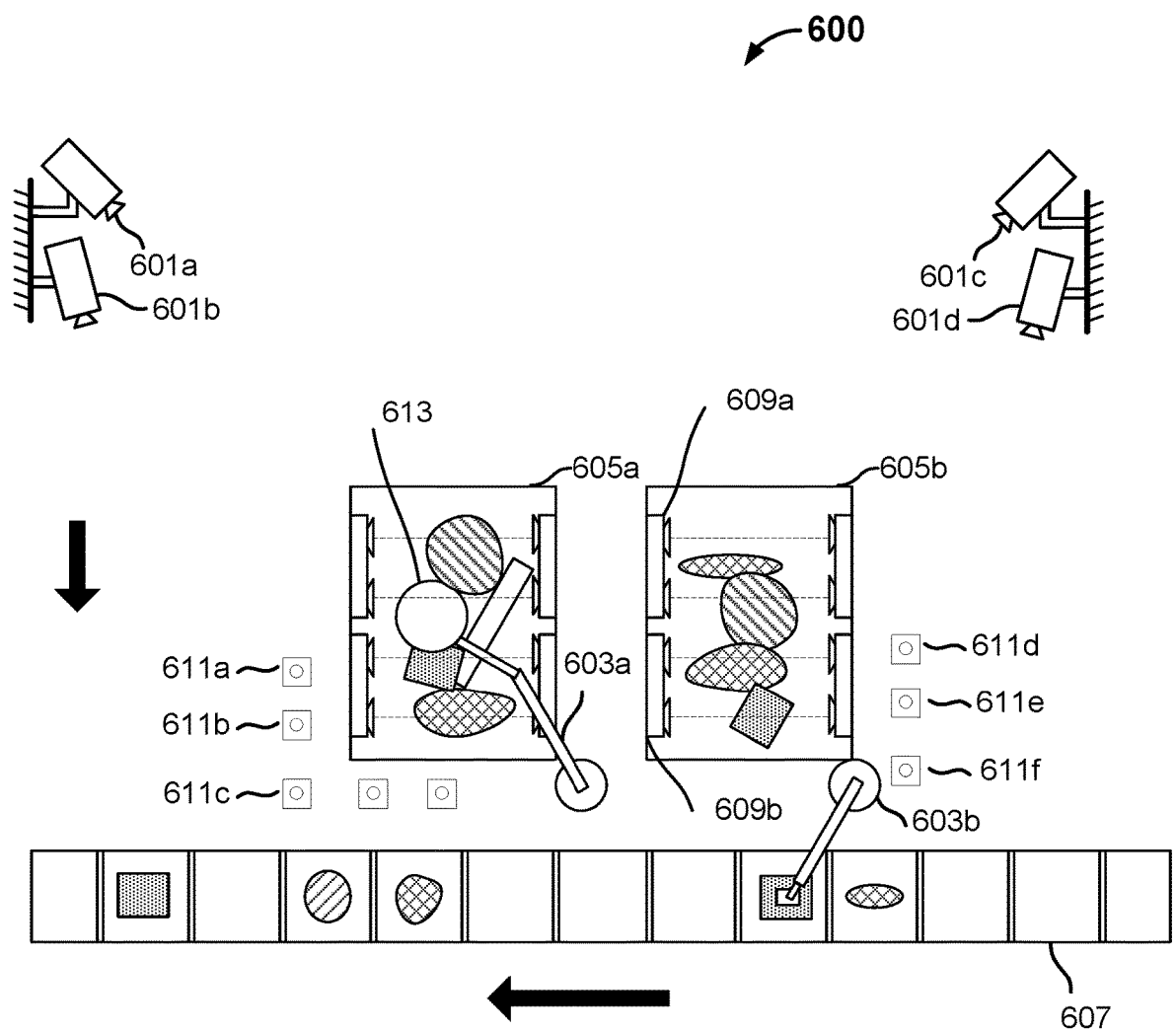
FIG. 6A is a diagram illustrating a robotic singulation system that uses one or more sensors to detect a detected state or condition of items in a workspace of a robotic singulation system in connection with singulation of one or more items according to various embodiments.

FIG. 6A is a diagram illustrating a robotic singulation system that uses one or more sensors to detect a detected state or condition of items in a workspace of a robotic singulation system in connection with singulation of one or more items according to various embodiments.

In various embodiments, a robotic system comprising one or more robotic arms performs singulation/induction that includes performing one or more active measures in response to a detected state or condition associated with one or more items in the workspace of the robotic system. The robotic system can include one or more robotic arms each having one or more end effectors.

In the example shown, system 600 includes a robotic arm 603a that is operated to singulate one or more items within workspace 605a to conveyance structure 607, and robotic arm 603b operates to singulate one or more items within workspace 605b to conveyance structure 607.

In various embodiments, a system such as system 600 includes one or more sensors from which an environment of the workspace is modeled. In the example shown in FIG. 6A, system 600 includes image sensors, including in this example 3D cameras 601a, 601b, 601c, and 601d. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. As illustrated in FIG. 6A, system 600 includes one or more sensor arrays disposed within or around the chute. For example, workspace 605b includes sensor arrays 609a and 609b. According to various embodiments, one or more of sensor arrays 609a and 609b include a vertical array of sensors. System 600 can include one or more sensors or sensor arrays disposed around the workspace. As illustrated, system 600 includes sensors 611a, 611b, and 611c disposed around workspace 605a, and sensors 611d, 611e, and 611f disposed around workspace 605b. According to various embodiments, system 600 includes one or more sensor arrays disposed at conveyance structure 607. For example, a sensor array can be disposed at the conveyance structure in a manner that a signal (e.g., an IR beam) is emitted across the conveyance structure.

In various embodiments, a control computer (not shown) includes a workspace environment state system such as a vision system used to discern individual items, debris on the workspace, and each item's orientation based on sensor data such as image data provided by image sensors, including in this example 3D cameras 601a, 601b, 601c, and 601d, and sensor arrays 609a and 609b. The workspace environment state system can also include sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, information pertaining to an output from one or more sensor arrays (e.g., sensor arrays 609a and 609b) can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

According to various embodiments, information output from sensor arrays 609a and/or 609b is used to determine a location and/or characteristic of one or more items within workspace 605b. The height of an item within a workspace such as workspace 605bb can be determined based at least in part on a determination of a set of sensors within sensor arrays 609a and/or 609b that are tripped by the item. In some embodiments, system 600 determines that an item within workspace 605b is arranged such that its longest side is perpendicular to the surface of the chute, and that singulation of the item would be improved if the item was grasped by a different side. Accordingly, system 600 determines and implements an active measure to rearrange the item such that the longest side thereof is parallel with the surface of the chute (e.g., to knock the item over using robotic arm 603b, a blowing mechanism, etc.). System 600 can be configured to implement an active measure to rearrange an item within workspace 605b if the height of the item is greater than a predefined height threshold.

According to various embodiments, the workspace environment state system produces output used by system 600 to determine and implement a plan to autonomously operate robotic arm 603a and/or robotic arm 603b to pick one or more items from workspace 605a and/or workspace 605b and place each in a corresponding available defined location for machine identification and sorting, such as a partitioned section of segmented conveyor 607. In some embodiments, the workspace environment state system produces an output (e.g., sensor data or information otherwise characterizing the workspace and items within the workspace) used by the robotic system to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan includes operating the robotic structure to change or adapt to the detected state or condition (e.g., implement a change with respect to a manner by which an item is singulated, implement to reconfigure items within the source pile/flow to make grasping a selected item easier, operate to reposition the robotic arm or end effector to increase the ability to grasp the item, etc.).

The output used by system 600 can correspond to sensor data including image data associated with a plurality of items present in a workspace. System 600 can use the sensor data to identify items within workspace 605a and/or workspace 605b that cannot be singulated. For example, system 600 can identify predefined items that are mapped to types of items that cannot be singulated. As another example, system 600 can identify items within workspace 605a and/or workspace 605b for which a plan or strategy to singulate from workspace 605a and/or workspace 605b to conveyance structure 607 cannot be determined. In response to determining an item that cannot be singulated, system 600 can operate to implement an active measure. The active measure implemented in response to determining that the item cannot be singulated can include removing the item from the corresponding workspace, invoking human intervention (e.g., alerting a human operator), etc. In some embodiments, in response to determining that an item within workspace 605a and/or workspace 605b cannot be singulated, system 600 operates robotic arm 603a and/or 603b to move the item to a designated location. The designated location can be a rejected items bin or other area at which items are stored for handling outside the singulation process. Examples of items that can be identified as not to be singulated include items having a particular shape (e.g., a poster tube), items for which system 600 cannot locate a label or other predefined identifier to be scanned, items having a predefined identifier on a side thereof (e.g., a label indicating that the item comprises a fragile object therein, a label indicating that the item is not to be stacked, a label indicating that the item comprises hazardous matter, etc.), etc.

In some embodiments, the chute in the corresponding workspace (e.g., workspace 605a or workspace 605b) comprises a weight sensor. System 600 can determine a weight of an item to be singulated based on determining a difference between a weight measured by the weight sensor in the chute before the item is grasped by the robotic arm and a weight measured by the weight sensor after the item is grasped (and moved completely off the chute). In response to determining the weight of the item, system 600 can use the item in connection with determining whether to implement an active measure in connection with singulating the item, and if so, to implement the active measure. For example, in response to determining the weight, system 600 can update the path or trajectory of the item according to the corresponding plan or strategy for singulating the item. If the weight of the item is greater than a predefined weight threshold, system 600 can update the plan to singulate the item based on the weight of the item. In some cases, if the weight of the item exceeds a weight threshold, the robotic arm is operated to partially lift the item from the chute and the robotic arm is operated to drag the item to conveyance structure 607.

Figure 6B:
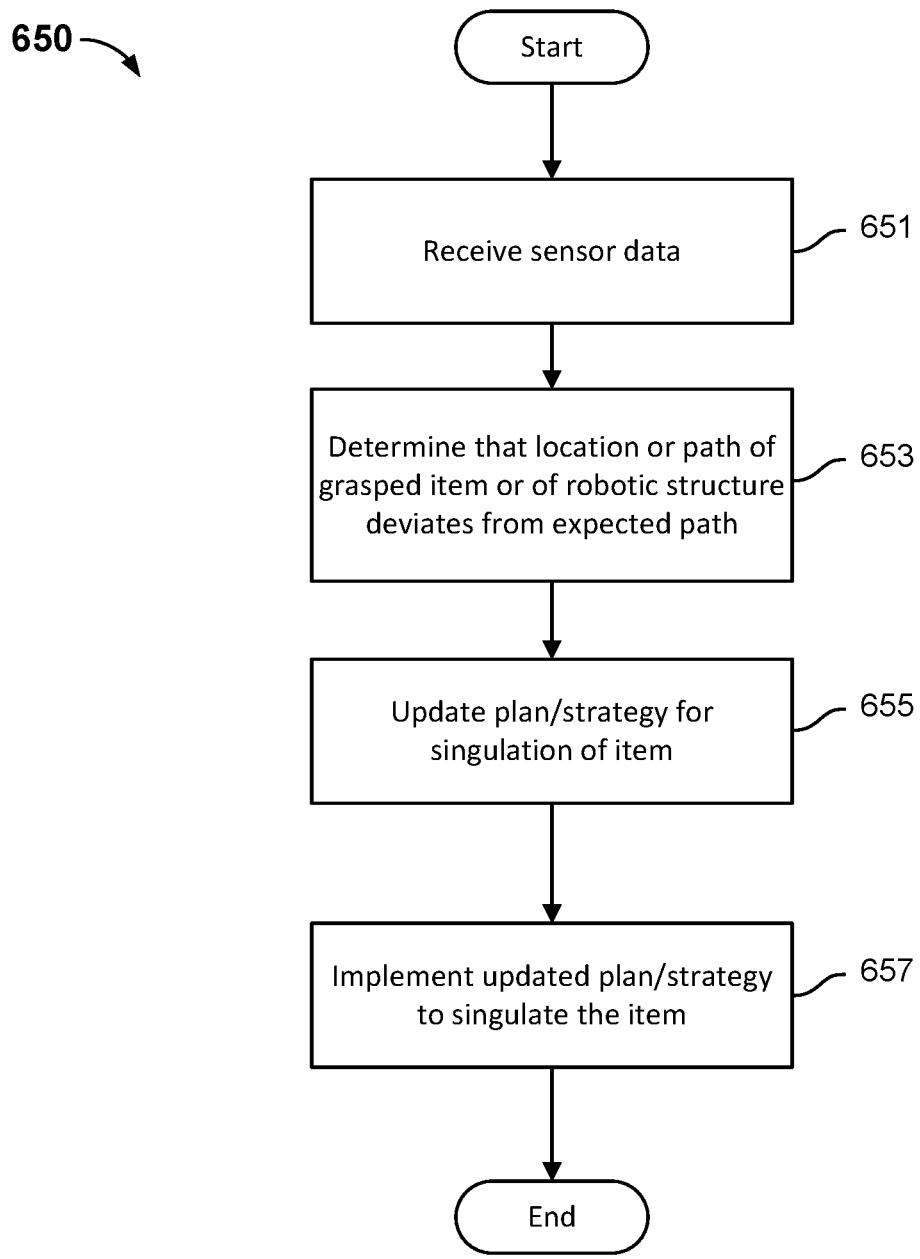
FIG. 6B is a diagram of a process to singulate an item using sensor data according to various embodiments.

FIG. 6B is a diagram of a process to singulate an item using sensor data according to various embodiments. Process 650 of FIG. 6B can be performed by system 600 of FIG. 6A. In some embodiments, process 650 is implemented by a robot system operating to singulate one or more items within a workspace such as workspace 605a or 605b of system 600 of FIG. 6A. System 600 includes one or more processors that operate to cause robot arm 603a or 603b to pick and place items for sorting.

At 651, sensor data is received. According to various embodiments, system 600 receives sensor data that is based at least in part on output from image sensors, including in this example 3D cameras 601a, 601b, 601c, and 601d, and/or sensor arrays disposed within the workspace (e.g., sensor arrays 609a and 609b). System 600 can obtain the sensor data from the workspace environment state system with which system 600 discerns the items and objects within the corresponding workspace. The workspace environment state system can further generate the sensor data using output from sensors disposed around, or within proximity of, the workspace (e.g., sensors 611a, 611b, 611c), and/or sensors (not shown) disposed at the conveyance structure 607.

At 653, a location of an item or a path of a grasped item or of the robotic structure deviates from an expected path. As illustrated in FIG. 6A, robotic arm 603a can operate to singulate item 613 from workspace 605a to conveyance structure 607. According to various embodiments, system 600 determines a plan or strategy according to which robotic arm 603a is to singulate item 613. In response to receiving the sensor data, system 600 determines whether a location of item 613 or a current path of item 613 during singulation by robotic arm 603a deviates from the expected path (e.g., the path specified in the corresponding plan or strategy for singulation).

In some embodiments, system 600 uses the sensor data to determine a current location or path of item 613 during singulation. For example, sensor arrays disposed within the chute can be tripped as the item is moved through the space above the chute. As the sensor arrays are tripped, corresponding outputs from the sensor arrays are used to generate the sensor data associated with the workspace. Accordingly, if sensor arrays within the chute are tripped by the item, the sensor data is reflective of a location of the item. As another example, as item 613 is moved from workspace 605a to conveyance structure 607, sensors 611a, 611b, and 611c disposed around workspace 605a detect movement of the item. Sensors 611a, 611b, and 611c can be infrared sensors or cameras.

System 600 uses the sensor data to compare a current location of item 613 or a current path of item 613 with an expected location of item 613 or an expected path of item 613 based on the plan or strategy for singulating item 613. Based on the comparison of the current location or the current path and the plan or strategy for singulating item 613, system 600 can determine whether a location or path of a grasped item (or of the robotic structure) deviates from the expected path.

At 655, the plan or strategy for singulation of the item is updated. According to various embodiments, in response to determining that the location or path of a grasped item (or of the robotic structure) deviates from the expected path, system 600 determines to perform an active measure to change or adapt to the deviation. System 600 updates the plan or strategy for singulation of item 613 based on the determination that the location or path of the item deviates from the expected location or path.

In some cases, the location or path of the item can deviate from the expected location or path if the weight of the item is greater than the robotic system expected when the robotic system determined the plan or strategy for singulating the item. The weight of the item can impact how quickly the robotic arm can move during singulation. In some cases, the weight of the item can exceed the weight the robotic arm (or end effectors thereof) can support. In some embodiments, an active measure in response to the weight of the item exceeding the expected weight thereof is to operate the robotic arm to partially lift the item from the chute and to drag the item across the workspace to the conveyance structure on which the item is to be singly placed. In connection with determining an updated plan or strategy, the robotic system can model a 3D view of a top surface of the chute or pile of items within the workspace and determine a path along or over which the robotic structure drags the item.

In some cases, the location or path of the item can deviate from the expected location or path if the item sways (e.g., oscillates) more than expected during movement of the robotic arm. In response to determining that the item is swaying more than expected during singulation, the robotic system can implement an active measure to dampen the swaying of the item. For example, in response to determining that the item is swaying during singulation, the robotic system can update the plan or strategy to singulate the item to include operating a torque controller to maintain sufficient suction across suction-based end effectors during oscillation. The suction level applied during singulation can be determined based at least in part on a weight of the item, a detected oscillation (e.g., a measure of the extent to which the item is swaying during movement), etc.

In other cases, the location or path of the item deviates from the expected location or path if the robotic arm grasps more items than expected. In some embodiments, the robotic system determines that the robotic arm has picked up a plurality of items based on using the vision system (e.g., sensor data from cameras) to detect the items grasped by the robotic arm. In some embodiments, the robotic system determines that the robotic arm has picked up a plurality of items based on sensor data from one or more sensors in the robotic arm. For example, a difference in pressure measured across a suction-based end effector (e.g., a difference in pressure across different suction cups) can indicate that the robotic arm is grasping different items. As another example, a difference in weight of item(s) grasped by the robotic arm compared to an expected weight of an item to be singulated can be indicative of the robotic arm having grasped more items than expected according to the plan or strategy for singulating the item(s). In some embodiments, a combination of information from various sensors within the robotic system (e.g., cameras, weight systems, pressure sensors, etc.) is used to determine that the robotic arm has grasped more items than expected.

In response to determining that the robotic arm has grasped more items than expected, the robotic system can determine an active measure for singulating the plurality of items. In some embodiments, the active measure for singulating the plurality of items includes operating the robotic arm to identify corresponding slots on the conveyance structure in which the plurality of items are to be placed, to move the plurality of items to the conveyance structure, and to singly place the plurality of items in the corresponding slots. In connection with singly placing the plurality of items in the corresponding slots, the robotic arm is operated to stagger release of the plurality of items. For example, in the case of the robotic arm having a suction-based end effector comprising a plurality of suction cups, the robotic arm is operated to release suction of at least a subset of the plurality of suction cups at different times in order to release the grasp of the plurality of items at different times. A difference in weight grasped by the robotic arm between before release of the subset of suction cups and after release of the at least the subset of the plurality of suction cups can be used to determine the weight of the item that was placed on the conveyance structure. In some embodiments, the weight of the item placed by the robotic arm in response to releasing suction in the subset of suction cups can be used to identify the item that was singly placed in the conveyance structure. In some embodiments, the robotic system identifies the item that was singly placed in the conveyance structure based on detecting an identifier associated with the item placed on the conveyance structure. In response to detecting the identifying of the item that was singly placed in the conveyance structure, the robotic system can update the distributed data structure pertaining to the state of the conveyance structure to associate the item with the slot of the conveyance structure in which the item was placed.

In some embodiments, the active measure for singulating the plurality of items includes operating the robotic arm to place one or more of the items back to the workspace and to operate the robotic arm to continue singulating the expected item in accordance with the plan or strategy. The robotic arm can place one or more of the items back by staggering release of the items such as using the staggered release of suction as discussed above.

At 657, the updated plan or strategy to singulate the item is implemented. In some embodiments, in response to updating the plan or strategy to singulate the item, the robotic system implements the updated plan or strategy. For example, the robotic system operates a robotic arm to singly place the item in a corresponding slot on the conveyance structure.

Figure 7A:
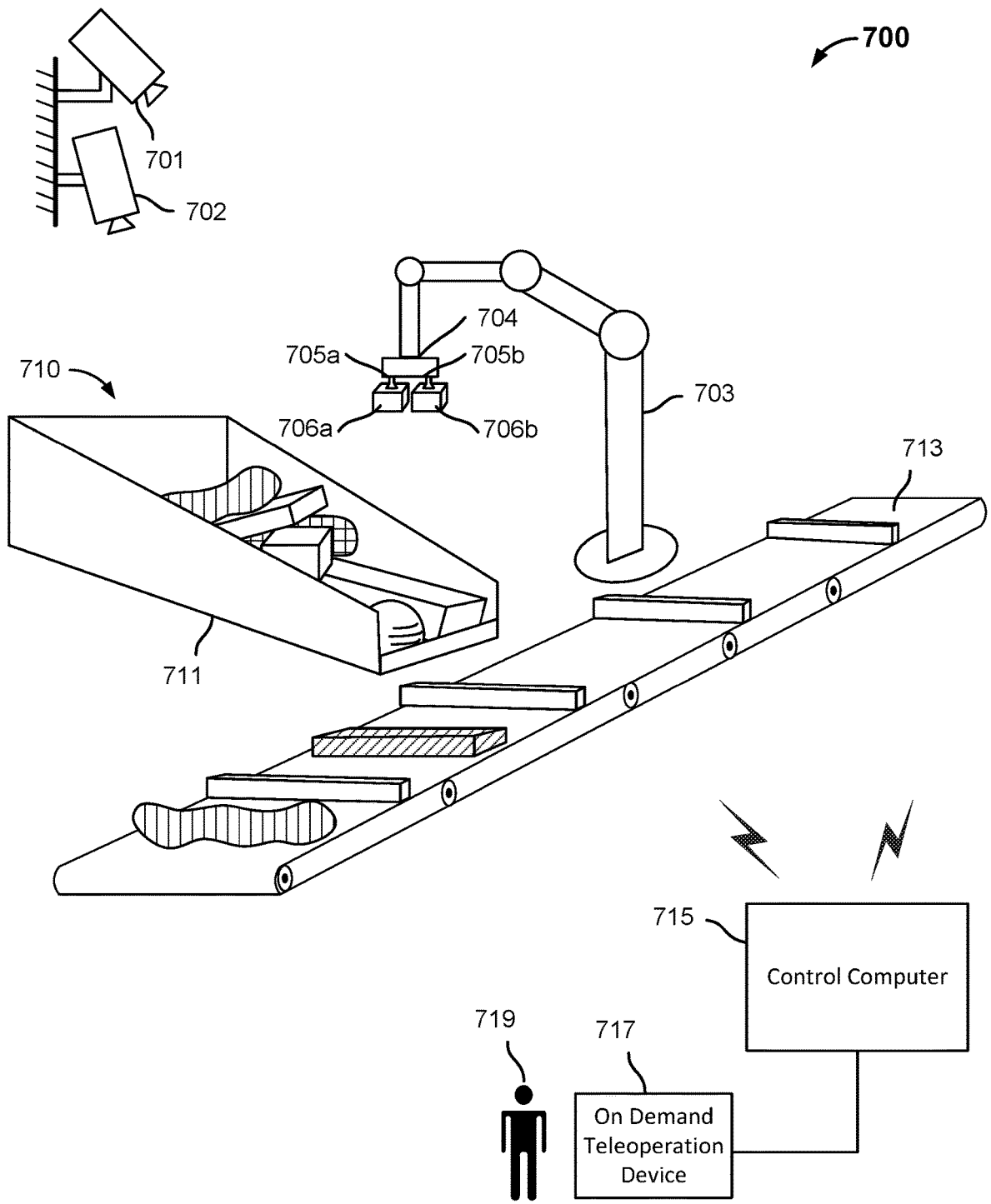
FIG. 7A is a diagram illustrating a robotic singulation system that singulates one or more items based at least in part on a controlling of one or more end effectors to release one of the one or more items according to various embodiments.

FIG. 7A is a diagram illustrating a robotic singulation system that singulates one or more items based at least in part on a controlling of one or more end effectors to release one of the one or more items according to various embodiments.

In various embodiments, a robotic system comprising one or more robotic arms performs singulation/induction that includes performing one or more active measures in response to a detected state or condition associated with one or more items in the workspace of the robotic system. The robotic system can include one or more robotic arms each having one or more end effectors. In the example shown in FIG. 7A, system 700 includes a robotic arm 703 that is operated to singulate one or more items within workspace 710 to conveyance structure 713.

System 700 can include one or more sensors from which an environment of the workspace is modeled. In the example shown in FIG. 7A, system 700 includes image sensors, including in this example 3D cameras 701 and 702. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. Robotic system 700 operates a robotic arm 703 to pick an item from chute 711 and to singly place the item on conveyance structure 713.

As illustrated in FIG. 7A, robotic arm 703 comprises an end effector 704 with which the item is grasped by robotic arm 703. End effector 704 can comprises a plurality of end effectors. In this example, end effector 704 includes suction-based end effector 705a and suction-based end effector 705b. While in the example shown the end effectors 705a and 705b are suction-based end effectors, in various embodiments one or more other types of end effectors may be used in a singulation system as disclosed herein, including without limitation a pinch-based end effector or other types of actuated grippers.

According to various embodiments, robotic arm 703 is operated to pick one or more items using the plurality of end effectors 705a and 705b. For example, robotic arm 703 can be operated to contemporaneously pick up a plurality of items 706a and 706b. In some embodiments, robotic arm 703 is operated to singly pick up items 706a and 706b according to a determined plan or strategy to singulate items 706a and 706b. In some embodiments, robotic arm 703 is operated to singly pick up one of item 706a and item 706b, and robotic arm unintentionally picks up both of item 706a and item 706b. In response to determining that robotic arm 703 has picked up both of item 706a and item 706b, system 700 can determine the manner by which the item 706a and item 706b are singly placed in conveyance structure 713.

If robotic arm 703 unintentionally picks up item 706a and item 706b at the same time (e.g., if so picking up the plurality of items was not included in the determined plan for singulation), then according to various embodiments system 700 determines to perform an active measure for singulating item 706a and item 706b. The active measure can include operating robotic arm 703 to stagger the release of item 706a and item 706b such as by staggering release of suction from end effector 706a and end effector 706b. For example, in the case of robotic arm 703 having a suction-based end effector comprising a plurality of suction cups, the robotic arm is operated to release suction of at least a subset of the plurality of suction cups at different times in order to release grasp of the plurality of items at different times.

In some embodiments, robotic arm 703 staggers release of the item 706a and item 706b in a manner that item 706a and item 706b are singly placed in different slots on conveyance structure 713. As an example, robotic system 700 can update the distributed data structure pertaining to the conveyance structure to associate item 706a and item 706b with the respective slots in which item 706a and item 706b were placed. As another example, robotic system 700 can send a fault to a robotic system or robotic arm downstream from robotic arm 703 indicating that item 706a and item 706b were placed in respective slots on conveyance structure 713 but that an association of respective identifiers for item 706a and item 706b to the respective slots in which item 706a and item 706b were placed was not stored. In response to receiving the fault, the downstream robotic system or robotic arm can determine one or more identifiers associated with item 706a and item 706b and store such identifiers in association with the respective slots on conveyance structure 713 (e.g., the downstream robotic system can update the distributed data structure with such association).

In some embodiments, the robotic arm releases one or more of the plurality of items it grasped back to the chute. For example, the active measure determined in response to picking up the plurality of items can be to return at least a subset of the plurality of items to the source pile/flow in the chute, and to operate the robotic arm to singulate the remaining items, if any, grasped by the robotic arm. As an example in the case of FIG. 7A, in response to determining that robotic arm 703 unintentionally grasped both item 706a and item 706b, robotic system 700 determines to return one of item 706a and item 706b to chute 711, and to singulate the item that is continued to be grasped by robotic arm 703 to a corresponding slot in the conveyance structure. An association between an identifier of the item singulated with the corresponding slot is stored. For example, robotic system 700 updates the distributed data structure and stores an identifier of the item that is singulated with the corresponding slot of the conveyance structure 713. As another example, robotic system 700 notifies a downstream robotic structure or robotic arm of a fault in response to which the downstream robotic structure or robotic arm determines an identifier corresponding to the item that is singulated and associates the identifier with the slot in which the item was singulated by robotic arm 703.

The staggered release of the grasp with respect to the plurality of end effectors on a robotic arm can be releasing the grasp at predetermined intervals, or in response to one or more conditions being satisfied. As an example, if robotic arm 703 has grasped item 706a and item 706b, suction from end effector 705a is released a preset time after suction from end effector 705b is released. As another example, suction from end effector 705a is released in response to a determination that robotic arm 703 has operated to move item 706a over a location at which item 706a is to be released (and at a time such that release of item 706a will be released into a particular slot of conveyance structure), and suction from end effector 705b is released in response to a determination that robotic arm 703 has operated to move item 706b over a location at which item 706b is to be released (and at a time such that release of item 706b will be released into another particular slot of conveyance structure 713).

In some embodiments, the active measure comprises requesting human intervention from human operator 719 via manual intervention by human operator 719, or via a remote intervention using an on-demand teleportation device 717 with which human operator 719 can control one or more of robotic arms 703, or can configure a setting of system 700 using control computer 715. The human operator 719 can intervene to ensure that both items 706a and 706b are properly singulated on conveyance structure 713, or that one or more of items 706a and 706b are returned to chute 711.

Figure 7B:
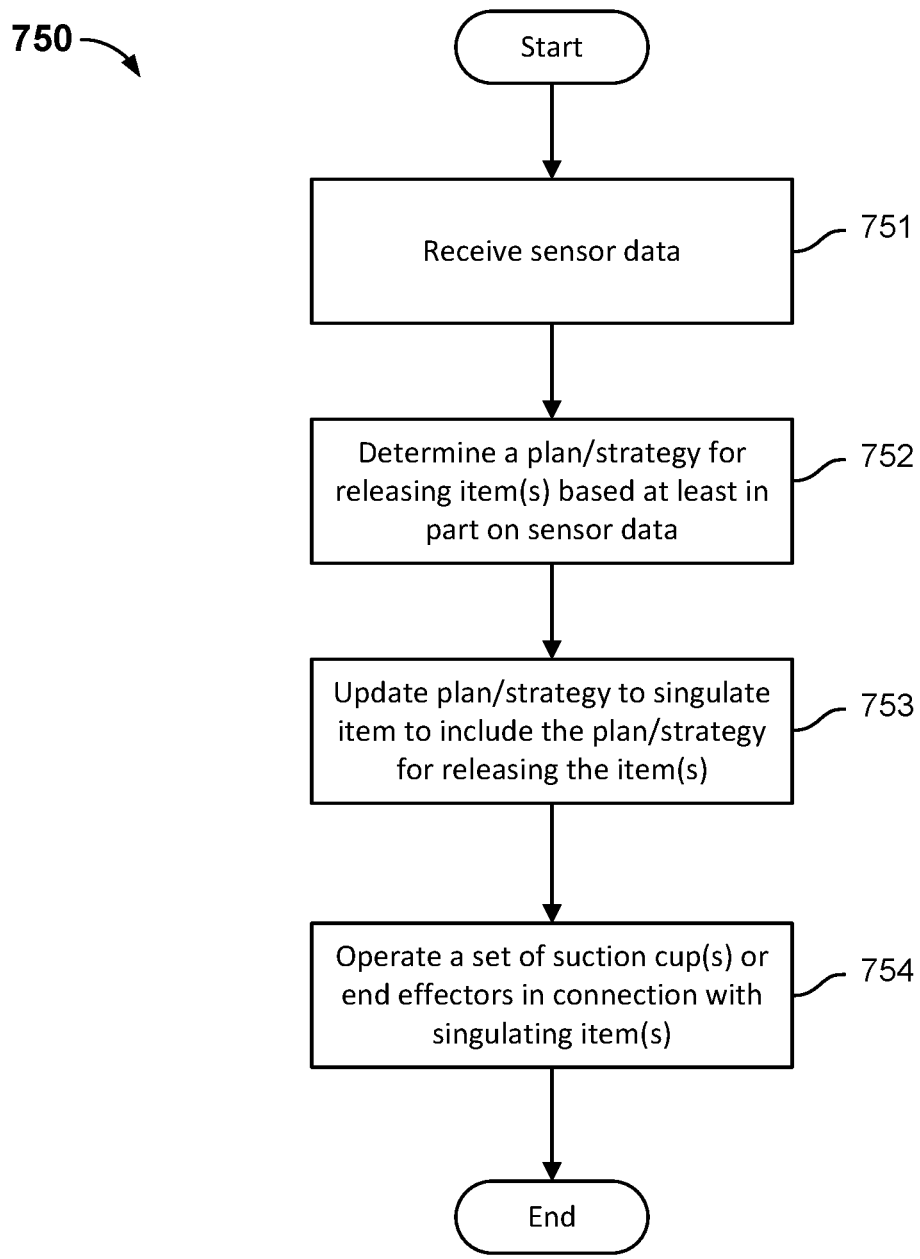
FIG. 7B is a diagram of a process to singulate an item based at least in part on a controlling of one or more end effectors to release one of the one or more items according to various embodiments.

FIG. 7B is a diagram of a process to singulate an item based at least in part on a controlling of one or more end effectors to release one of the one or more items according to various embodiments. Process 750 of FIG. 7B can be performed by system 700 of FIG. 7A. In some embodiments, process 750 is implemented by a robot system operating to singulate one or more items within a workspace such as workspace 710 of system 700 of FIG. 7A. System 700 includes one or more processors that operate to cause robot arm 703 to pick and place items for sorting.

At 751, sensor data is received. System 700 receives sensor data associated with workspace 710 (e.g., including sensor data pertaining to robotic arm 703 and conveyance structure 713). System 700 uses the sensor data in connection with determining that robotic arm 703 has picked up a plurality of items.

In some embodiments, system 700 uses the vision system (e.g., sensor data from cameras) to detect the items grasped by the robotic arm 703 and determines that robotic arm 703 deviated from the plan or strategy for singulating an item. In some embodiments, robotic system 700 determines that robotic arm 703 has picked up a plurality of items based on sensor data from one or more sensors in robotic arm 703. For example, a difference in pressure measured across a suction-based end effector 705a and suction-based end effector 706b can indicate that the robotic arm is grasping different items. As another example, a difference in weight of item(s) grasped by the robotic arm compared to an expected weight of an item to be singulated can be indicative of the robotic arm having grasped more items than expected according to the plan or strategy for singulating the item(s). In the case of FIG. 7A, before picking up items 706a and 706b, if the plan or strategy for singulating item 706a included singly picking up 706a and placing item 706a on the conveyance structure 713, system 700 can obtain an expected weight of item 706a and compare the expected weight to the information from the weight sensor(s) in connection with determining that robotic arm 703 additionally picked up item 706b. The expected weight of item 706a can be obtained based on a size of item 706a and/or an identifier on item 706a. As an example, the expected weight of item 706a can be obtained by obtaining a mapping of weights or ranges of weights to sizes of items (e.g., dimensions, volume, etc.), and the size of item 706a is used as a lookup to determine the expected weight.

In some embodiments, a combination of information from various sensors within the robotic system (e.g., cameras, weight systems, pressure sensors, etc.) is used to determine that the robotic arm has grasped more items than expected.

At 752, a plan or strategy for releasing one or more items is determined based at least in part on the sensor data. According to various embodiments, in response to determining that robotic arm 703 (unintentionally) picked up a plurality of items, system 700 determines a plan or strategy for releasing one or more of the plurality of items grasped by robotic arm 703. The plan or strategy for releasing the one or more items includes an indication of a location at which each item is to be released (e.g., back into the source pile/flow at chute 711, or singly placed in a slot on the conveyance structure 713), and a release strategy for operating the end effectors 705a and 705b. In some embodiments, the release strategy for operating the end effectors 705a and 705b includes an indication of a timing of releasing suction from end effectors 705a and 705b and/or one or more conditions that are to be satisfied in order for the suction to be released from end effectors 705a and 705b. In some embodiments, the release strategy for operating the end effectors 705a and 705b includes a strategy for staggering release of the suction in order to release the plurality of items at different times and/or at different locations.

At 753, the plan or strategy for singulating an item is updated to include the plan or strategy for releasing the one or more items. According to various embodiments, in response to determining the plan or strategy for releasing the one or more items, system 700 updates the plan or strategy for singulating an item based at least in part on the plan or strategy for releasing the one or more items. For example, if the initial plan for singulation of item 706a included a plan or strategy for singly picking up item 706a, operating robotic arm 703 to move item 706a to conveyance structure 713, and to singly place item 706a on conveyance structure 713, and if robotic arm 703 unintentionally picks up 706b contemporaneous with picking up item 706a, the update to the plan or strategy for singulating item 706a includes a plan or strategy for releasing item 706b (e.g., releasing item 706b back in chute 711 or singly placing item 706b in a corresponding slot on conveyance structure 713).

At 754, a set of suction cups or end effectors are operated in connection with singulating the one or more items. In some embodiments, system 700 implements the updated plan or strategy for singulating the one or more items, including operating the robotic arm 703 to move the one or more items to a planned location, and to release the one or more items in accordance with the plan or strategy. System 700 controls the robotic arm 703 to release the one or more items at different times (e.g., a staggered release) or simultaneously based on the updated plan or strategy for singulating the one or more items.

Figure 8A:
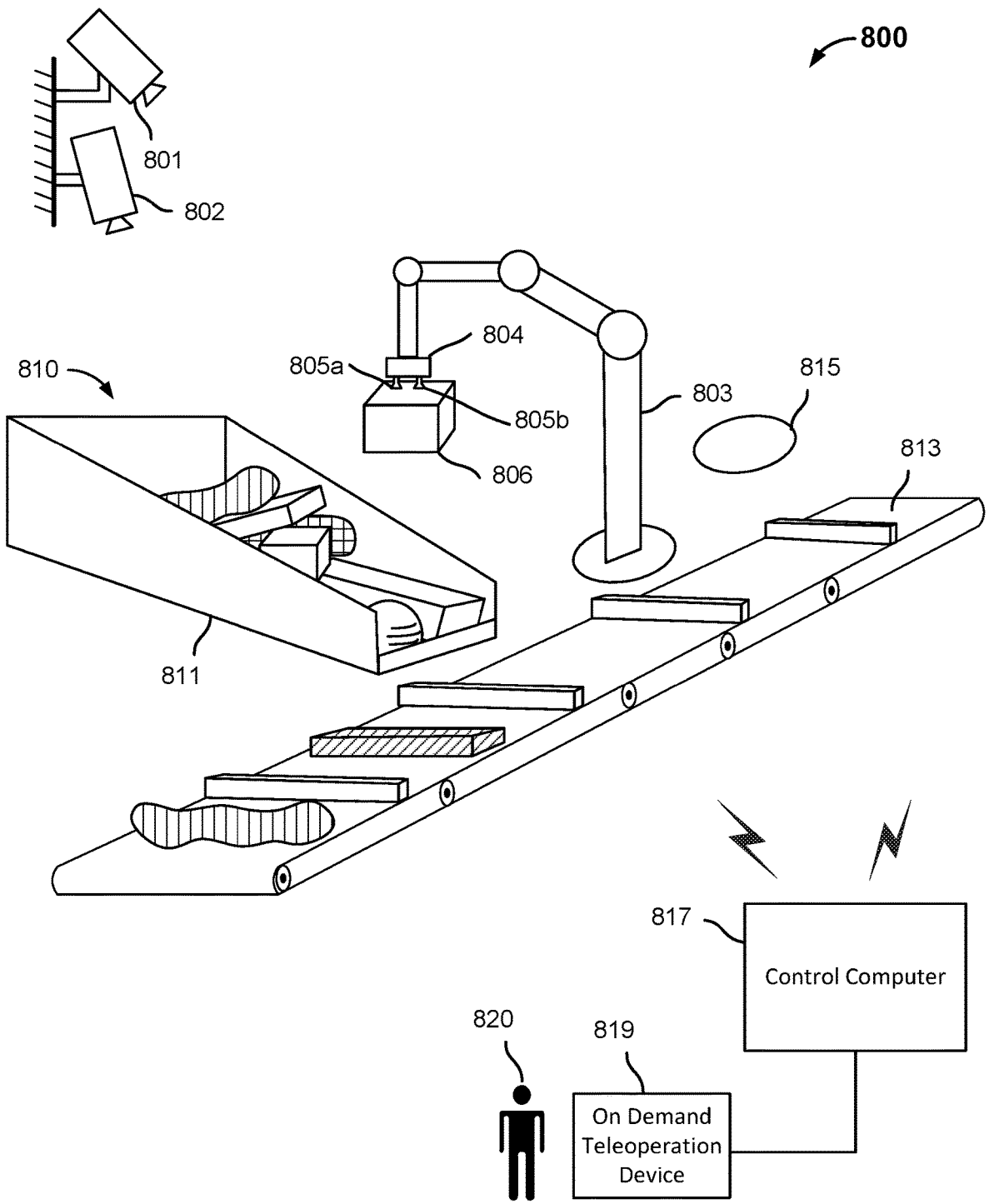
FIG. 8A is a diagram illustrating a robotic singulation system that performs a diagnostic to detect a deviation from normal operation according to various embodiments.

FIG. 8A is a diagram illustrating a robotic singulation system that performs a diagnostic to detect a deviation from normal operation according to various embodiments.

In various embodiments, a robotic system comprising one or more robotic arms performs singulation/induction that includes performing one or more active measures in response to a detected state or condition associated with one or more items in the workspace of the robotic system. The detected state or condition can correspond to a deviation with respect to normal operation of a robotic arm or a part thereof. For example, the robotic system can use sensor data to determine that an end effector on the robotic arm is not operating normally, and in response to such a determination, the robotic system can perform a diagnostic process to determine whether the end effector is to be replaced or repaired.

The robotic system can include one or more robotic arms each having one or more end effectors. In the example shown in FIG. 8A, system 800 includes a robotic arm 803 that is operated to singulate one or more items within workspace 810 to conveyance structure 813. System 800 can include one or more sensors from which an environment of the workspace is modeled. In the example shown in FIG. 8A, system 800 includes image sensors, including in this example 3D cameras 801 and 802. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like.

In various embodiments, control computer 817 includes a workspace environment state system such as a vision system used to discern individual items, debris on the workspace, and each item's orientation based on sensor data such as image data provided by image sensors, including in this example 3D cameras 801 and 802. The workspace environment state system can include sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). The workspace environment state system can include sensors to detect an amount of pressure created between an item (e.g., a grasped item) and a suction-based end effector, a force by which the item is grasped, or other information pertaining to the quality of a grasp by which the item is grasped by robotic arm 803.

According to various embodiments, the workspace environment state system produces output used by system 800 to determine and implement a plan to autonomously operate robotic arm 803 and to pick one or more items from workspace 810 (e.g., from chute 811) and place each item in a corresponding available defined location for machine identification and sorting, such as a partitioned section of segmented conveyor 813. In some embodiments, the workspace environment state system produces an output (e.g., sensor data or information otherwise characterizing the workspace and items within the workspace) used by the robotic system to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate robotic system 800 to perform a diagnostic on robotic arm 803 or a portion thereof such as end effector 804. In some embodiments, the active measure or the updating the plan includes operating the robotic structure to change or adapt to the detected state or condition (e.g., implement a process to diagnose a detected deviation from normal operation).

According to various embodiments, during singulation of one or more items from chute 811 to conveyance structure 813, system 800 uses sensor data pertaining to workspace 810 (including sensor data pertaining to operation of robotic arm 803) to determine whether system 800 is operating in accordance with normal operation. Normal operation of system 800 can be defined with predetermined ranges of various states or measurements. As an example, a mapping of normal operation of end effector 804 and/or suction-based end effectors 805*a* and 805*b* disposed on the distal end of end effector 804 includes a range of pressure values or one or more pressure thresholds corresponding to a normal operation (or satisfactory operation) of the corresponding end effector when the end effector is engaged with an item or a surface of an object. In some embodiments, system 800 compares obtained sensor data pertaining to operation of system 800 (including operation of robotic arm 803 and/or end effectors disposed thereon) with obtained values pertaining to normal operation (e.g., predetermined ranges or threshold values). In response to determining that the sensor data pertaining to operation of system 800 falls outside the values indicating normal operation of system 800, system 800 determines that system 800 is deviating from normal operation or that a diagnostic process is to be performed to assess whether a remedial active measure is to be implemented.

An example of system 800 determining that system 800 is deviating from normal operation or that a diagnostic process is to be performed in connection with assessing whether a remedial active measure is to be implemented includes system 800 obtaining sensor data pertaining to one or more pressure values corresponding to pressure attained by end effector 805*a* and/or end effector 805*b* while the robotic arm has picked up item 806, and system 800 determining whether a comparison between the sensor data and values pertaining to normal operation (e.g., predetermined ranges or threshold values) is indicative that current operation of system 800 deviates from the normal operation. The values pertaining to normal operation can include values for pressure that are expected to be attained by end effector 805*a* and/or end effector 805*b* while the robotic arm has picked up item 806 in normal operation. In response to determining that sensor data corresponding to current operation of system 800 falls outside (or is otherwise inconsistent with) predetermined ranges or threshold values corresponding to normal operation of system 800, system 800 determines that system 800 is deviating from normal operation or that a diagnostic process is to be performed in connection with assessing whether a remedial active measure is to be implemented. If the pressure attained by end effector 805*a* and/or end effector 805*b* is less than a threshold pressure value corresponding to normal operation, system 800 determines that the end effector for which pressure attained is unsatisfactory is deviating from normal operation. System 800 can deem the end effector for which pressure attained is unsatisfactory as broken or in need of repair (e.g., by human intervention by human operator 820).

According to various embodiments, in response to determining that current operation of system 800 deviates from expected normal operation of system 800, system 800 determines to perform a diagnostic on system 800. System 800 can perform the diagnostic on a part of the system 800 that system 800 determines, based at least in part on sensor data (e.g., the current sensor data), is deviating from normal operation or that is within a threshold range or percentage of being in deviation from normal operation. In the case of the measurement of pressure attained by end effector 805*a* and/or end effector 805*b* described above, system 800 can determine the particular end effector(s) for which a diagnostic process is to be performed. In some embodiments, in response to performing the diagnostic process and determining a result of the diagnostic process indicates that system 800 (or a component thereof) is deviating from normal operation or is otherwise within the threshold range or percentage of being in deviation from normal operation, system 800 implements one or more active measures. Examples of the active measures include replacing the component (e.g., switching an end effector), determining to operate the system 800 in a manner that does not use the component in deviation of normal operation or that does not place a strain on the component in excess of a predefined strain threshold, and/or invoking human intervention (e.g., notifying human operator 820 of the deviation). Various other active measures can be implemented.

Continuing with the example described above in connection with FIG. 8A, system 800 determines to perform a diagnostic process at least partly in response to system 800 determining that system 800 is deviating from normal operation or that the diagnostic process is to be performed in connection with assessing whether a remedial active measure is to be implemented. In response to determining that the pressure attained by end effector 805*a* and/or end effector 805*b* while the robotic arm has picked up item 806 deviates from an expected normal operation of end effector 805*a* and/or end effector 805*b*, system 800 determines to perform a diagnostic with respect to operation of the end effector(s) of end effector 805*a* and/or end effector 805*b* that are determined to deviate from normal operation. According to various embodiments, the diagnostic process for performing a diagnostic with respect to an end effector includes operating robotic arm 803 to move to a predetermined location and engage the end effector with a predetermined surface such as, in this example, surface 815. Surface 815 may be located within workspace 810. In some embodiments, surface 815 is a part of chute 811 or is operatively connected to chute 811 or conveyance structure 813. When the end effector is engaged to the predetermined surface, system 800 controls the end effector to grasp the predetermined surface. In response to controlling the end effector to grasp the predetermined surface, system 800 obtains sensor data pertaining to a measurement of a grasp strength with which the end effector grasps the predetermined surface. For example, in response to engaging the end effector with surface 815, system 800 controls the end effector to apply a suction to surface 815. System 800 obtains sensor data including one or more values of the pressure attained between the end effector and surface 815. System 800 then determines whether the pressure attained by the end effector in grasping surface 815 deviates from an expected normal operation of grasping surface 815. In some embodiments, system 800 compares the sensor data including one or more values of the pressure attained between the end effector and surface 815 with one or more predetermined ranges or threshold values mapped to a normal operation of the end effector. If the pressure attained between the end effector and surface 815 is inconsistent with normal operation of the end effector (e.g., if one or more values of the pressure attained between the end effector and surface 815 falls outside one or more predetermined ranges or threshold values mapped to a normal operation of the end effector), system 800 determines that the end effector is not working properly (e.g., the end effector is deviating from normal operation).

According to various embodiments, in response to system 800 determining that the end effector is not working properly, system 800 updates the plan to implement one or more active measures based at least in part on such determination that the end effector is not working properly. Such an active measure includes alerting human operator 820 that the end effector is not working. For example, system 800 sends a notification to the human operator 820 of the deviation from normal operation. In some embodiments, system 800 provides human operator 820 with one or more recommended active measures. In response to receiving the notification of the deviation from normal operation, the human operator 820 can implement a human intervention to replace or repair the applicable end effector. In some embodiments, human operator 820 controls system 800 using on demand teleoperation device 819 to implement an active measure such as controlling the robotic arm 803 to replace the applicable end effector. In some embodiments, human operator 820 can select at least one of the one or more recommended active measures, and in response to such selection, system 800 controls robotic arm 803 to implement the selected active measure (e.g., without additional human intervention).

Figure 8B:
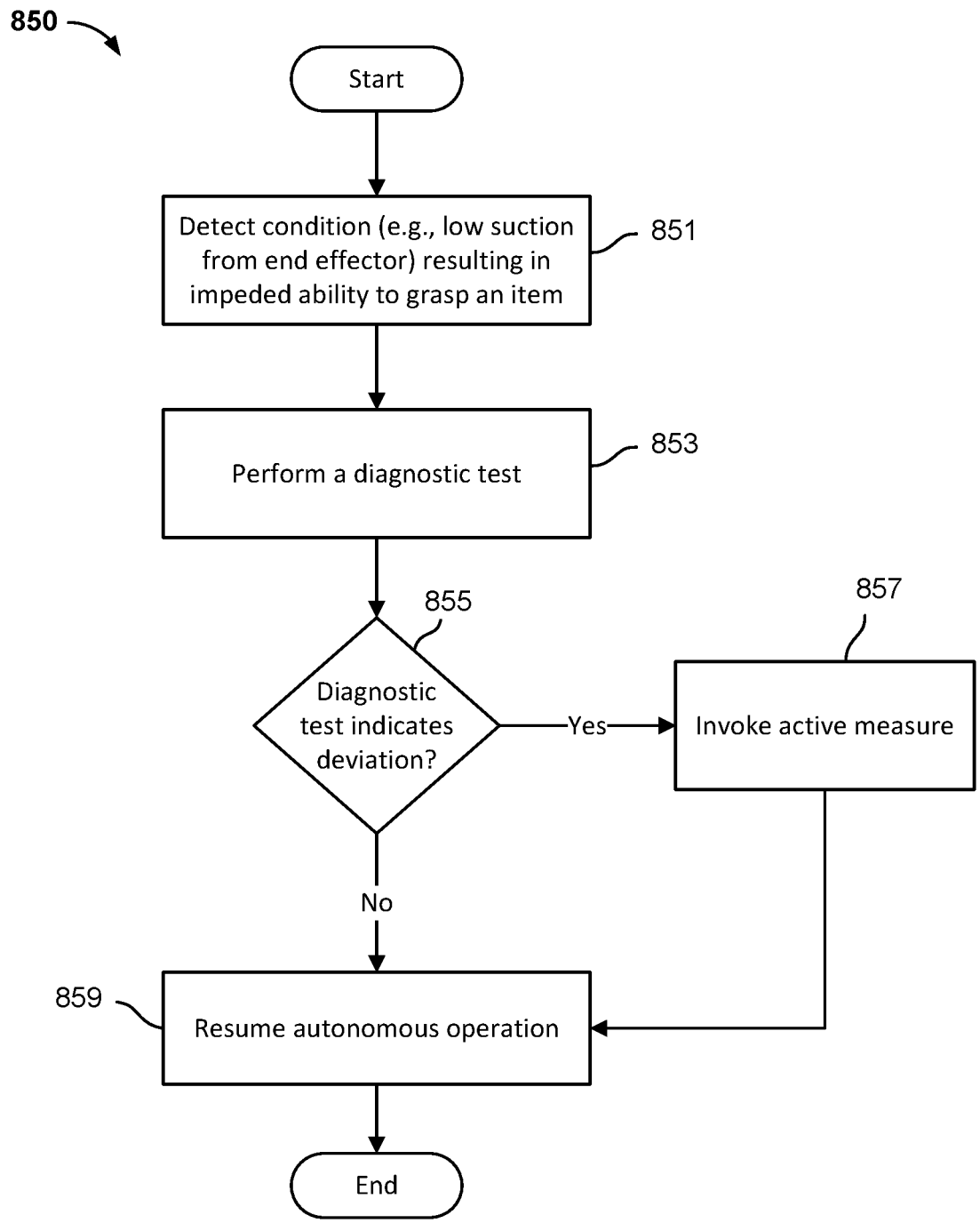
FIG. 8B is a diagram of a process to perform a diagnostic to detect a deviation from normal operation of a robotic singulation system according to various embodiments.

FIG. 8B is a diagram of a process to perform a diagnostic to detect a deviation from normal operation of a robotic singulation system according to various embodiments. Process 850 of FIG. 8B can be performed by system 800 of FIG. 8A. In some embodiments, process 850 is implemented by a robot system operating to singulate one or more items within a workspace such as workspace 810 of system 800 of FIG. 8A. System 800 includes one or more processors that operate to cause robot arm 803 to pick and place items for sorting.

At 851, a condition resulting in an impeded ability to grasp an item is detected. In some embodiments, the condition corresponding to the impeded ability to grasp an item is a value indicating that an end effector has low suction.

At 853, a diagnostic test is performed. In some embodiments, the robotic arm is operated to move to a predetermined location and a diagnostic test is performed. In some embodiments, the diagnostic test corresponds to a suction test in which a value indicates the suction attained by an end effector (e.g., when engaged with a surface such as a predetermined surface). The value indicating the suction attained by the end effector can be determined based at least in part on an output from one or more pressure sensors. In some embodiments, in the case of a pinch-based end effector, the diagnostic test is a grip test (e.g., a test that measures a grip strength). Various other diagnostic tests can be performed based on the various types of end effectors implemented.

At 855, results from the diagnostic test are analyzed to determine whether the diagnostic test indicates that the robotic system is deviating from normal operation. In some embodiments, the robotic system determines whether the diagnostic test indicates that the robotic system is deviating from normal operation based on a comparison of one or more values corresponding to the results from the diagnostic test with one or more values or ranges corresponding to normal operation. The robotic system determines that the diagnostic test indicates that the robotic system is deviating from normal operation if the results of the diagnostic test are outside of, or inconsistent with, the one or more values or ranges corresponding to normal operation.

Returning to the example discussed above in connection with FIG. 8B, system 800 determines whether the end effector 805*a* or 805*b* is operating normally based at least in part on the diagnostic test performed with respect to surface 815. If the pressure attained by end effector 805*a* and/or end effector 805*b* is less than a threshold pressure value (or outside a predetermined pressure range) corresponding to normal operation, system 800 determines that the end effector is deviating from normal operation. System 800 can deem the end effector as broken or in need of repair (e.g., by human intervention by human operator 820). In contrast, if the pressure attained by end effector 805*a* and/or end effector 805*b* is consistent with a threshold pressure value (or within a predetermined pressure range) corresponding to normal operation, system 800 determines that the end effector is operating normally.

In response to determining that the diagnostic test indicates that the end effector operates normally (or within a range corresponding to normal operation), process 850 proceeds to operation 859 at which autonomous operation is resumed. In some embodiments, in response to determining that the end effector operates normally, the robotic system operates the robotic structure (e.g., robotic arm 803) to implement a plan or strategy to singulate one or more items.

In contrast, in response to determining that the diagnostic test indicates that the end effector does not operate normally (e.g., operates outside a range corresponding to normal operation), process 850 invokes an active measure at 857. As an example, an active measure can be a measure to remediate the abnormal operation (e.g., to replace the end effector that is not operating normally). As another example, an active measure uses other end effectors and avoids grasping items with the end effector(s) that are determined to not be working in accordance with normal operation (e.g., to use some end effectors to grasp an item, and to avoid using the inoperative end effector). As another example, an active measure requests assistance or invokes human intervention such as by sending an alert to a human operator to remediate the end effector that deviates from normal operation (e.g., human operator 820 can manually remove and replace the inoperative end effector, or human operator 820 can use the on demand teleoperation device 819 to control robotic arm 803 to replace the inoperative end effector).

Figure 9:
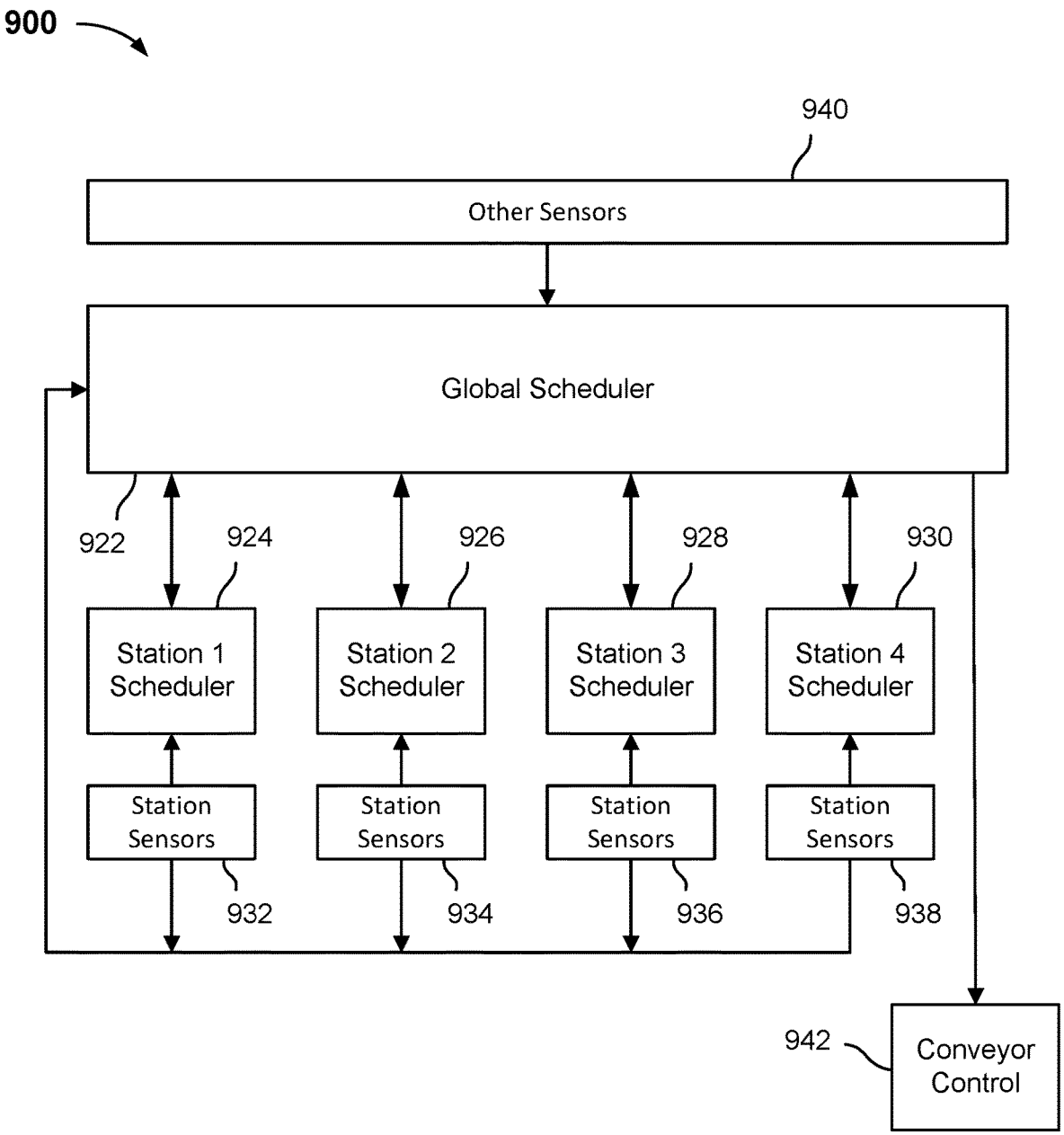
FIG. 9 is a diagram of a hierarchical scheduling system according to various embodiments of a robotic singulation system.

FIG. 9 is a diagram of a hierarchical scheduling system according to various embodiments of a robotic singulation system. In various embodiments, the hierarchical scheduling system 900 of FIG. 9 is implemented at least in part on a computer, such as control computer 212 of FIGS. 2A and 2B, control computer 599 of FIG. 5B, control computer 715 of FIG. 7A, and control computer 817 of FIG. 8A. In the example shown, hierarchical scheduling system 900 includes a global scheduler 922 configured to optimize throughput by coordinating the operation of a plurality of robotic singulation stations and a segmented conveyor (or similar structure) on which the robotic singulation stations are configured to place items. According to various embodiments, the global scheduler 922 is configured to coordinate operation of a plurality of robotic arms within a single workspace to ensure a desired throughput is attained while ensuring that the plurality of robots do not collide. Global scheduler 922 can be configured to implement an active measure in response to determining that a plurality of robotic arms (e.g., operating within a single workspace) have collided or are expected to collide (e.g., if the plurality of robots were to continue implementing their respective plans or strategies for singulating an item). Global scheduler 922 may be implemented as a processing module or other software entity running on a computer. The global scheduler supervises and coordinates work among the robotic singulation stations at least in part by monitoring and as needed controlling and/or otherwise providing input to a plurality of robotic singulation station schedulers 924, 926, 928, and 930.

In some embodiments, a robotic singulation station includes a single robotic arm that is controlled to singulate an item within a workspace, and a workspace can include a plurality of robotic singulation stations. In some embodiments, a robotic singulation station includes a plurality of robotic arms that are coordinated to singulate a plurality of items within a workspace. In some cases, if the robotic singulation station includes a plurality of robotic arms, a particular workspace can include a single robotic singulation station.

Each of the robotic singulation station schedulers 924, 926, 928, and 930 is associated with a corresponding robotic singulation station and each controls and coordinates the operation of one or more robotic arms and associated end effectors to pick items from a corresponding chute or other item receptacle and place them singly on a segmented conveyor or similar structure. Each of the robotic singulation station schedulers 924, 926, 928, and 930 is associated with a corresponding set of one or more station sensors 932, 934, 936, and 938, respectively, and each uses the sensor data generated by its station's sensors to perform automated singulation at its robotic singulation station. In some embodiments, each implements and performs processes 300, 320, and 330 of FIGS. 3A-3C, process 400 of FIG. 4, processes 500 and 550*a*-550*d* of FIGS. 5A and 5C-5F, process 650 of FIG. 6B, process 750 of FIG. 7B, process 850 of FIG. 8B, and processes 1050 and 1075 of FIGS. 10B and 10C.

In various embodiments, each of the robotic singulation station schedulers 924, 926, 928, and 930 reports to global scheduler 922 one or more of image and/or other station sensor data; object identification, grasp strategy, and success probability data; pick/place plan information; and expected item singulation throughput information. Global scheduler 922 is configured to use information received from the robotic singulation station schedulers 924, 926, 928, and 930—along with sensor data received from other sensors 940, such as cameras pointed at the segmented conveyor and/or other parts of the workspace not covered or covered well or completely by the station sensors—to coordinate work by the respective robotic singulation stations, each under the control of its station-specific scheduler 924, 926, 928, and 930, and to control the operation (e.g., speed) of the segmented conveyor via conveyor controller 942, so as to optimize (e.g., maximize) the collective singulation throughput of the system.

In various embodiments, the global scheduler 922 employs one or more techniques to implement collision avoidance between a plurality of robots comprising the robotic singulation system while using the plurality of robots to perform singulation, e.g., to maximize overall throughput or to attain a desired overall throughput level. For example, a particular workspace can include a plurality of robots operating to singulate items within the particular workspace (e.g., the plurality of robots pick items from a same source pile/flow in a chute and singly place the respective items in corresponding slots of the conveyance structure). Because the workspace includes a plurality of robotic arms to singulate items therein, the robotic arms can have respective ranges of motion that overlap with each other. In some embodiments, the global scheduler 922 detects an expected collision event based at least in part on information received from the robotic singulation station schedulers 924, 926,

928, and 930—along with sensor data received from other sensors 940, such as cameras pointed at the segmented conveyor and/or other parts of the workspace not covered or covered well or completely by the station sensors—to coordinate work by the respective robotic singulation stations. The global scheduler 922 can use the information received from the respective robotic singulation station schedulers 924, 926, 928, and 930 to determine locations of the plurality of robots and determine a probability that two of the plurality of robots will collide with each other or that a robot will collide with another object within the workspace at which the robot operates. For example, the global scheduler detects an expected collision event based at least in part on a location of at least one robot and a path or strategy (for singulating an item) for at least one robot. In some embodiments, the expected collision event is detected based on a determination that a location or path of a first robot (or item grasped by the first robot) is planned to intersect with a location or path of a second robot (or item grasped by the second robot) at a particular time.

In some embodiments, each robot operating in a workspace in which a plurality of robots pick items from a common source, such as the same chute, operates mostly independently to identify and grasp items to be picked by that robot from the source. Conflicts may be minimized or avoided by configuring each robot to pick from potentially overlapping assigned regions of the chute or other source. For example, each robot may pick (primarily) from the side of the chute nearest to that robot. Or, in some embodiments, one robot may be configured to pick (primarily) from the back of the chute (farthest from destination conveyor) and another from the front of the chute (nearest destination conveyor). In some embodiments, in the event of a detected (risk of) collision, each robot implements a random wait interval and resumes operation. If the different/random waits result in no risk of collision, both resume and continue operation. In some embodiments, a heuristic or logic may be applied to resolve/avoid collisions, such as by allowing the robot targeting an item further back in the chute to reach and grasp first, followed by the robot targeting an item nearer the front (i.e., nearer the destination conveyor). In some embodiments, the robot that picked from nearer to the end of the chute may move first to place its item, followed by the robot that grasped an item from farther back.

In some embodiments, the plurality of robots operating at a single workspace operate to implement respective processes to singulate items in parallel, and each of the plurality of robots contemporaneously operates to implement a particular step or set of steps in a sequence of steps of the respective processes to singulate items before either of the plurality of robots moves to the next step or set of steps in the sequence of steps. For example, each of the plurality of robots operate to pick an item from a source pile/flow and each of the plurality of robots wait until the other robot(s) correspondingly pick an item before progressing to the next step or sequence of steps in the process to singulate items from the workspace. As another example, each of the robots operate to move the items from the chute area from which an item was grasped to a particular location at the conveyance structure at which the item is to be placed, and each of the plurality of robots wait until the other robot(s) correspondingly move the items in their grasp to corresponding locations at the conveyance structure before progressing to the next step or sequence of steps in the process to singulate items (e.g., to place the items on the conveyance structure). In the foregoing manner, a plurality of robots operate independently to determine plans and strategies for singulating items within a workspace, however, the plurality of robots are coordinated in progressing through the singulation process. According to various embodiments, a collision event is detected based on a determination that a location or path of a first robot (or item grasped by the first robot) is planned to intersect with a location or path of a second robot (or item grasped by the second robot) at a particular step in a singulation sequence. In this manner, a location or path of a second robot is only used by a single robot during a particular step or set of steps in the singulation process.

According to various embodiments, the robotic singulation station schedulers 924, 926, 928, and 930 register with global scheduler 922 plans or strategies for operating corresponding robots to singulate items, or otherwise store such plans or strategies in a storage location that is accessible to global scheduler 922. The robotic singulation station schedulers 924, 926, 928, and 930 can independently determine the plans or strategies for operating corresponding robots to singulate items. In some embodiments, although the robotic singulation station schedulers 924, 926, 928, and 930 operate independently to determine their respective plans or strategies, the robotic singulation station schedulers 924, 926, 928, and 930 determine their respective plans or strategies at different times (e.g., so that a same item is not selected for singulation by two robots, etc.). In some embodiments, the robotic singulation station schedulers 924, 926, 928, and 930 operate independently to determine their respective plans or strategies, and the robotic singulation station schedulers 924, 926, 928, and 930 register with their respective plans or strategies global scheduler 922 at different times, and global scheduler 922 can send a fault to a robotic singulation station scheduler if during registration of its plan or strategy global scheduler 922 that such plan or strategy conflicts with an existing registered plan or strategy. Examples of instances in which plans or strategies are deemed to conflict include a plurality of plans or strategies pertaining to singulation of a same item from the workspace, a plurality of plans or strategies using a same path or trajectory, a plurality of plans or strategies using intersecting paths or trajectories, a plurality of plans or strategies including moving a part of the robotic arm or item to a same location, a plurality of plans or strategies selecting a same slot at the conveyance structure in which corresponding items are to be placed, etc. Various other conflicts between plans or strategies are possible.

Although the robotic singulation station schedulers 924, 926, 928, and 930 operate independently to determine plans or strategies for operating corresponding robots to singulate items, global scheduler 922 can provide oversight over the entire robotic system to detect an expected collision event and to implement an active measure to prevent the expected collision event. In some embodiments, implementing the active measure includes sending a fault to a robotic singulation station scheduler (e.g., corresponding to at least one of the robots identified to be associated with the expected collision event). For example, in response to sending the fault to the robotic singulation station scheduler, global scheduler 922 can require the robotic singulation station scheduler to update its current plan or strategy (e.g., in a manner that avoids the expected collision event). The fault sent to the robotic singulation station scheduler can include an indication of the reason for the fault (e.g., an indication of the expected collision event, and/or information pertaining to the expected collision event such as an indication of the manner by which the plan or strategy of the robotic singulation station scheduler conflicts with the plan or strategy of another robotic singulation station scheduler).

In various embodiments, the global scheduler 922 employs one or more techniques to optimize the use of a plurality of robots comprising the robotic singulation system to perform singulation, e.g., to maximize overall throughput or to attain a desired overall throughput level. For example, if there are four robots in sequence, the lead (or other upstream) robot may be controlled to place packages in a manner that leaves open slots so that a downstream robot is not waiting for an empty slot. This approach has impacts because downstream robots wait for some unknown/random amount of time because of package flow etc. As a result, a naive strategy (say lead robot places into every 4th empty slot) may not optimize collective throughput. Sometimes it might be better for the lead robot to put 2-3 packages into successive slots in sequence if its packages aren't flowing, but overall the system makes such decisions with awareness of state and flow at each station. In some embodiments, the optimal strategy for leaving open slots for downstream robots is based on an anticipated request for an open slot by the downstream robot (as a function of their package flow, for example). In some embodiments, information from the local station scheduler is used to anticipate the maximum throughput of each station and to control conveyor speeds and how many slots are left empty by upstream robots to ensure downstream robots have access to empty slots in proportion to the speed at which they are (currently) able to pick/place. In some embodiments, when the segmented conveyor is full due to some bottlenecks in the downstream sortation process, a robotic singulation system as disclosed herein may pre-singulate one or more packages, for example, inside its corresponding chute or in a nearby staging area, while keeping track of the poses of each pre-singulated package. Once some empty spaces are available from the segmented conveyor, the system/station moves the pre-singulated packages onto the segmented conveyor, singly and in rapid succession, without additional vision processing time.

In some embodiments, the presence of humans working alongside robots has an impact on the placement and multi-robot coordination strategy since the robots or associated computer vision or other sensor system must now also watch what humans do and adapt the robot's placements in real-time. For example, if a human took over a conveyor belt slot that was scheduled to be used by a robot, the system must adjust its global and local schedules/plans accordingly. In another example, if a human disrupts a robot's picked package and causes it to register as not picked the system adapts to correct the error. Or, if a human corrects a robot's errors in picking (robot was commanded to put a package into slot A but accidentally placed it straddling across slot A and adjacent slot B; and human places it into slot B though the system memory says the package is in slot A), the system must observe the human's action and adjust downstream robot actions.

In various embodiments, the global scheduler 922 may cause a station to operate more slowly than its maximum possible throughput at a given time. For example, the global scheduler 922 may explicitly instruct the local station scheduler (e.g., 924, 926, 928, and 930) to slow down and/or may make fewer slots available to the local station, e.g., explicitly by assigning fewer slots to the station or indirectly, such as by allowing upstream stations to fill more slots.

In various embodiments, the global scheduler 922 can communicate faults to one or more local station schedulers (e.g., 924, 926, 928, and 930) in response to detecting a state or condition associated with one or more items in the workspace. The fault can be communicated in connection with causing one or more of the local station schedulers to perform an active measure to change or adapt to the detected state or condition. For example, if the global scheduler 922 determines that a robot places two items into a single slot of the conveyor (e.g., based on sensor data pertaining to the conveyor, or in response to receiving an indication from the robotic structure corresponding to the robot), global scheduler 922 sends a fault to one or more local station schedulers downstream from the robot that placed two items into the single slot or downstream from the slot comprising two items. In response to receiving the fault, a local station scheduler can determine a plan or strategy to implement an active measure to pick one of the two items from the slot and to singly place the item in another slot on the conveyor (and to update the distributed data structure with an association between the item(s) and the slot(s)).

In some embodiments, the global scheduler 922 communicates a fault to one or more local station schedulers (e.g., 924, 926, 928, and 930) in response to a determination that an item placed on the conveyor straddles two different slots. The global scheduler 922 communicates the fault to cause the local station scheduler downstream from the item to determine a plan and strategy to reposition the item into a single slot on the conveyor, and to cause a corresponding robot to implement the plan or strategy to reposition the item. The distributed data structure can be correspondingly updated with an association between the item and the slot in which the item occupies after repositioning.

Figure 10A:
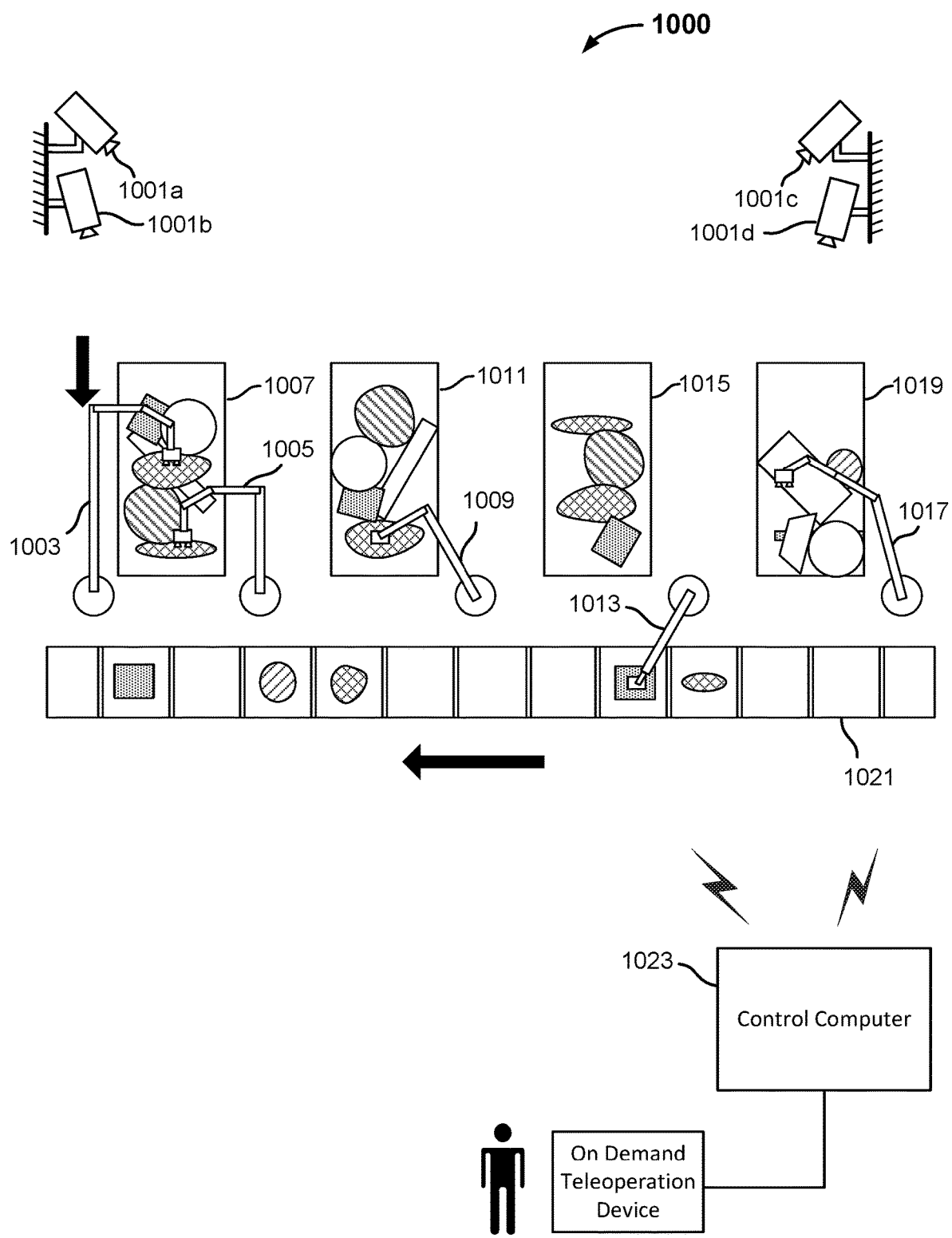
FIG. 10A is a diagram illustrating a robotic singulation system that includes a plurality of robotic arms operating within the same workspace to singulate items within the workspace according to various embodiments.

FIG. 10A is a diagram illustrating a robotic singulation system that includes a plurality of robotic arms operating within the same workspace to singulate items within the workspace according to various embodiments.

As illustrated in FIG. 10A, system 1000 includes three additional stations: robotic arms 1003, 1005, 1009, 1013, and 1017 positioned and configured to pick/place items from chutes 1007, 1011, 1015, and 1019. According to various embodiments, one or more robotic arms can operate to singulate items from a same chute. For example, robotic arms 1003 and 1005 operate to pick/place items from chute 1007. System 1000 includes one or more sensors that provide information from which sensor data pertaining to a workspace is determined. System 1000 includes cameras 1001a, 1001b, 1001c, and 1001d, which can be configured or arranged to provide a 3D view of the full scene, including each of the four stations/chutes 1007, 1011, 1015, 1019, as well as conveyor 1021.

In various embodiments, control computer 1023 coordinates operation of the robotic arms 1003, 1005, 1009, 1013, and 1017, and associated end effectors, along with conveyor 1021, to pick/place items from the chutes 1007, 1011, 1015, 1019 to conveyor 1021 in a manner that achieves a desired collective throughput of the system (e.g., a collective throughput that satisfies a throughput threshold, etc.). In various embodiments, control computer 1023 implements global scheduler 922 and robotic singulation station schedulers 924, 926, 928, and 930 of hierarchical scheduling system 900 of FIG. 9 to coordinate operation of robotic arms 1003, 1005, 1009, 1013, and 1017 in a manner that ensures that collisions events are avoided during operation of robotic arms 1003, 1005, 1009, 1013, and 1017 to singulate items from chutes 1007, 1011, 1015, and 1019 to conveyor 1021.

In various embodiments two or more robots may be deployed at a station, operated under control of an associated control computer, such as control computer 1023 in the example shown in FIG. 10A, in a manner that avoids the robots interfering with each other's operation and movement and which maximizes their collective throughput, including by avoiding and/or managing contention to pick and place the same item. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms. For example, control computer 1023 can coordinate operation of the plurality of robots to enable the plurality of robots to operate independently while ensuring that the plurality of robots and/or the items grasped by the plurality of robots do not collide with one another during singulation. In some embodiments, control computer 1023 implements/enforces "force fields" between two or more robots in order to prevent collisions between the two or more robots. As an example, the robots (or control computer 1023) access information from which their respective positions and the positions of one or more other robots are determined, and the robots are controlled to avoid an intersection between their respective positions or paths and the positions or paths of the one or more other robots at a certain time or at a certain stage of singulation. In some embodiments, a first robot reserves an airspace (e.g., a certain position) that is to be used by the first robot during singulation of an item. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot.

In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subset of the plurality of robots that picks after a first robot will select an item to singulate that is different from the item selected or picked by the first robot.

In various embodiments, a robotic system as disclosed herein coordinates operation of multiple robots to one by one pick items from a source bin or chute and place the items on an assigned location on a conveyor or other device to move items to the next stage of machine identification and/or sorting.

In some embodiments, multiple robots may pick from a same chute or other source receptacle. In the example shown in FIG. 10A, for example, robotic arm 1005 may be configured to pick from either chute 1007 or chute 1011. Likewise, robotic arm 1013 may pick from chute 1015 or chute 1019, etc. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 10A, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

Figure 10B:
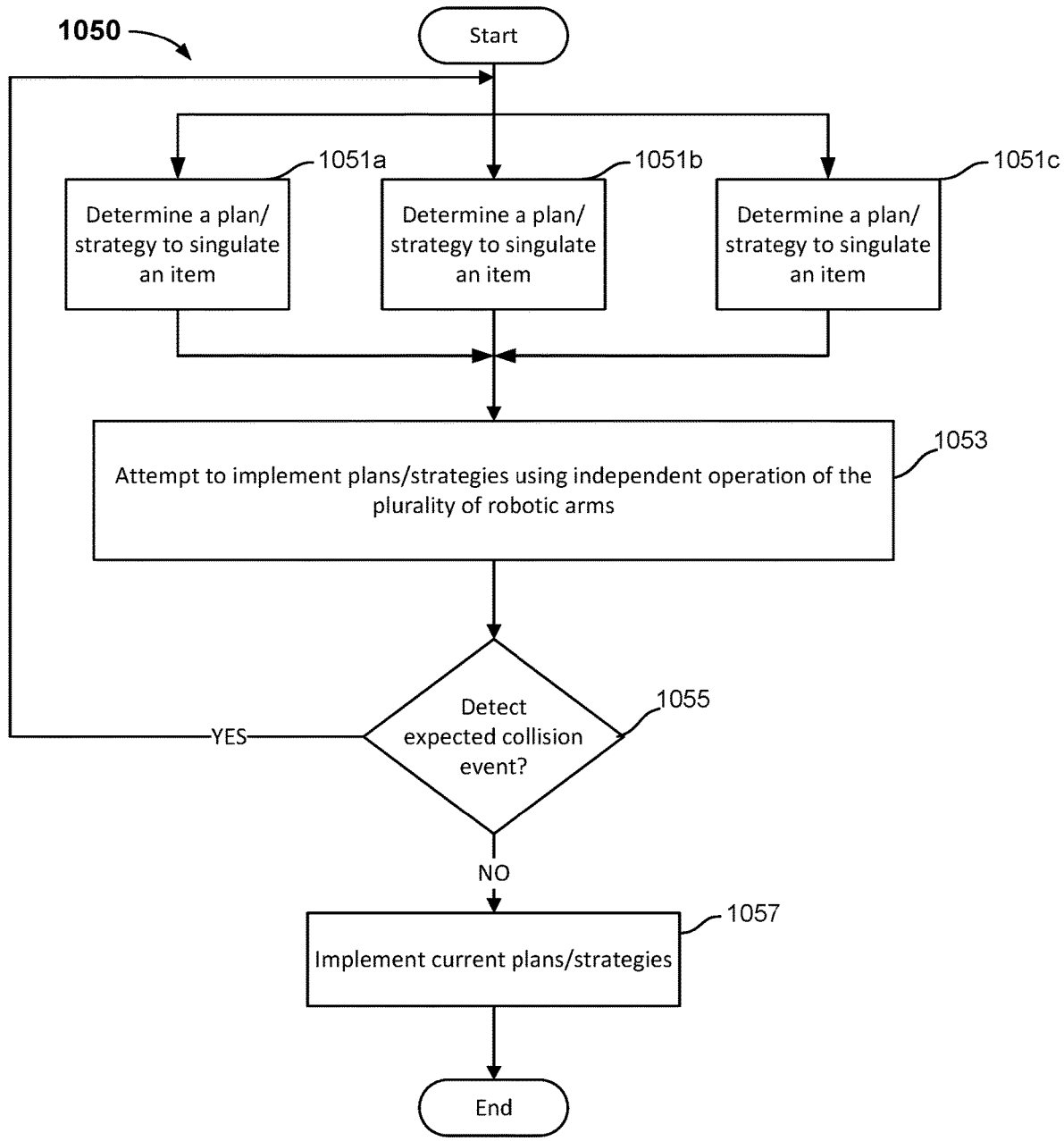
FIG. 10B is a diagram of a process to singulate a plurality of items in a workspace using a robotic singulation system that includes a plurality of robotic arms operating within the same workspace according to various embodiments.

FIG. 10B is a diagram of a process to singulate a plurality of items in a workspace using a robotic singulation system that includes a plurality of robotic arms operating within the same workspace according to various embodiments. Process 1050 of FIG. 10B can be performed by system 1000 of FIG. 10A. In some embodiments, process 1050 is implemented by a robot system operating to singulate one or more items within one or more workspaces such as workspaces corresponding to chutes 1007, 1011, 1015, and/or 1019 of system 1000 of FIG. 10A. System 1000 includes one or more processors that operate to cause robot arms 1003, 1005, 1009, 1013, and/or 1017 to pick and place items for sorting.

At 1051a, 1051b, and 1051c, plans or strategies for singulating items are determined. According to various embodiments, the plans or strategies for singulating the items are determined independent of one another. For example, each of 1051a, 1051b, and 1051c can be at least partially implemented by different schedulers such as robotic singulation station schedulers 924, 926, 928, and 930 of hierarchical scheduling system 900 of FIG. 9. The plans or strategies determined at 1051a, 1051b, and 1051c are associated with operation of different robots within a robotic system.

At 1053, implementation of the plans or strategies for singulating the items using independent operation of the corresponding plurality of robots is attempted. The plurality of robots are controlled to implement the plans or strategies by corresponding robotic singulation station schedulers.

In some embodiments, the implementation of the plans or strategies for singulating the items comprises providing information pertaining to the plan or strategy to a global scheduler, such as global scheduler 922 of hierarchical scheduling system 900 of FIG. 9. The global scheduler is configured to coordinate the operation of a plurality of robotic singulation stations (e.g., the plurality of robots) and a segmented conveyor (or similar structure) on which the robotic singulation stations are configured to place items.

At 1055, a determination is made of whether an expected collision event is detected. In some embodiments, system 1000 determines whether an expected collision event is detected based at least in part on sensor data pertaining to the workspaces (e.g., each of the robots, chutes, etc.) and/or the plans or strategies for singulation of the items. In response to the attempt to implement the plans or strategies using independent operation of the plurality of robots, system 1000 determines whether an expected collision event is detected.

According to various embodiments, the general scheduler determines whether an expected collision event is detected.

For example, the general scheduler determines whether an expected collision event is detected in response to the robotic singulation station schedulers providing the general scheduler with information associated with the respective plans or strategies for singulation of items by the corresponding robots. The robotic singulation station schedulers can register the determined plans or strategies with the general scheduler.

In response to determining that an expected collision event is detected at 1055, process 1050 returns to 1051a, 1051b, and 1051c and one or more of the robotic singulation station schedulers determine a new plan or strategy for singulating the item. In response to detecting an expected collision event, the general scheduler sends a fault to one or more of the robotic singulation station schedulers to cause the robotic singulation station schedulers to implement a new plan or strategy for singulating the item.

In contrast, in response to determining that an expected collision event is not detected at 1055, process 1050 proceeds to 1057 at which the current plans or strategies are implemented (e.g., the corresponding robots are operated to singulate the items).

Figure 10C:
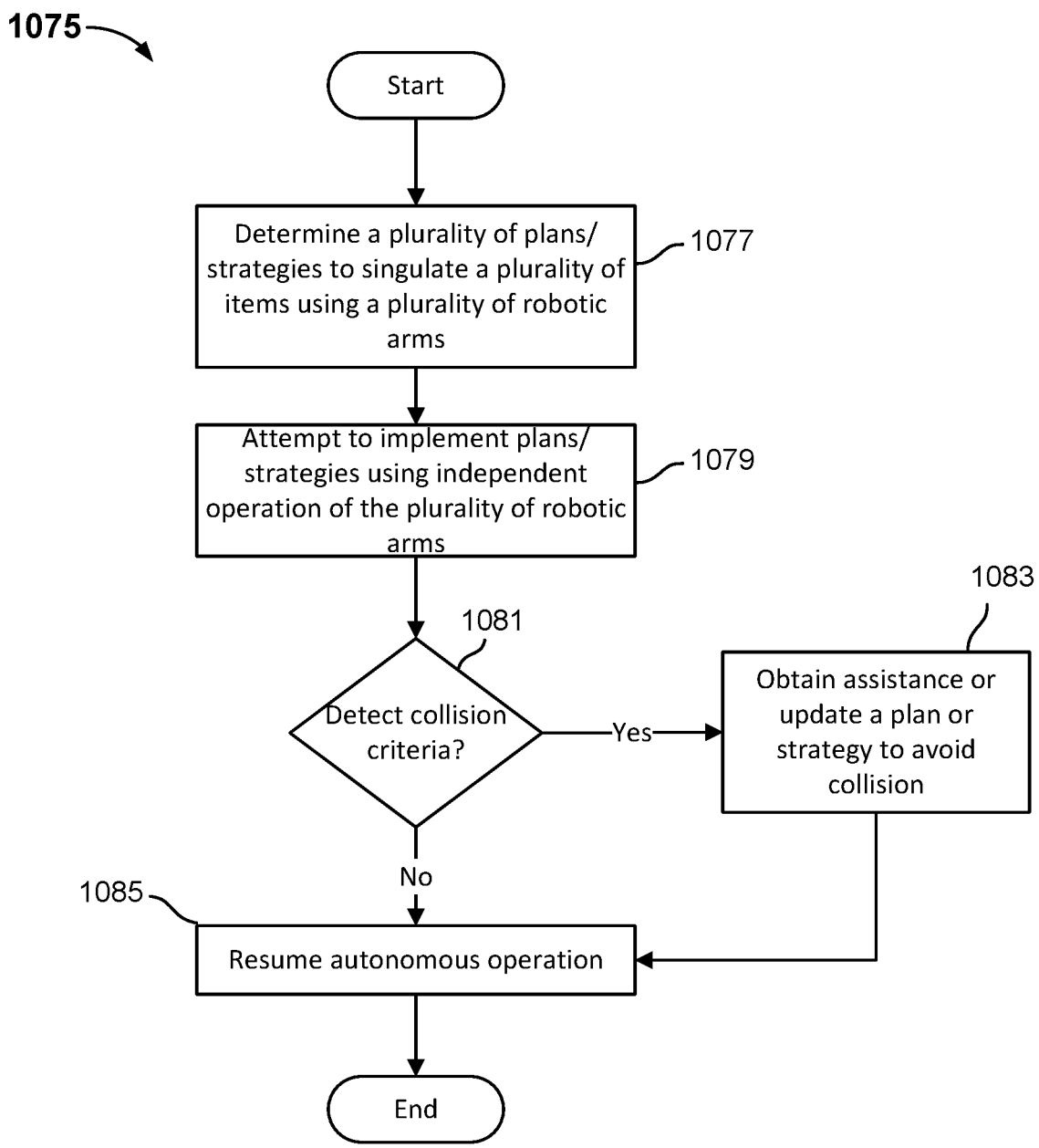
FIG. 10C is a diagram of a process to singulate a plurality of items in a workspace using a robotic singulation system that includes a plurality of robotic arms operating within the same workspace according to various embodiments.

FIG. 10C is a diagram of a process to singulate a plurality of items in a workspace using a robotic singulation system that includes a plurality of robotic arms operating within the same workspace according to various embodiments. Process 1075 of FIG. 10C can be performed by system 1000 of FIG. 10A. In some embodiments, process 1075 is implemented by a robot system operating to singulate one or more items within one or more workspaces such as workspaces corresponding to chutes 1007, 1011, 1015, and/or 1019 of system 1000 of FIG. 10A. System 1000 includes one or more processors that operate to cause robot arms 1003, 1005, 1009, 1013, and/or 1017 to pick and place items for sorting.

At 1077, a plurality of plans or strategies to singulate a plurality of items using a plurality of robotic arms is determined. According to various embodiments, the plans or strategies for singulating the items are determined independent of one another. For example, each of 1051a, 1051b, and 1051c of FIG. 10B can be at least partially implemented by different schedulers such as robotic singulation station schedulers 924, 926, 928, and 930 of hierarchical scheduling system 900 of FIG. 9. The plans or strategies determined at 1051a, 1051b, and 1051c are associated with operation of different robots within a robotic system.

At 1079, implementation of the plurality of plans or strategies to singulate a plurality of items is attempted. The plurality of robots are controlled to implement the plans or strategies by corresponding robotic singulation station schedulers.

At 1081, a determination is made of whether a collision criteria is detected. In some embodiments, system 1000 determines whether one or more collision criteria are detected based at least in part on sensor data pertaining to the workspaces (e.g., each of the robots, chutes, etc.) and/or the plans or strategies for singulation of the items. According to various embodiments, the collision criteria corresponds to criteria that, if satisfied, indicate that a collision between two objects (e.g., two robots, two items, a robot and an item, a robot and a part of the workspace such as the chute, etc.) is expected to occur (or is deemed to occur). The collision criteria can include an intersection between two projected paths of the objects, an intersection of the location of two objects during singulation, two objects that will be within a threshold proximity of each other during singulation (if singulation is performed in accordance with the corresponding plan or strategy), etc. Various other criteria for determining whether a collision event is expected can be implemented.

In response to the attempt to implement the plans or strategies using independent operation of the plurality of robots, system 1000 determines whether collision criteria (or satisfaction of such) is detected. According to various embodiments, the general scheduler determines whether collision criteria is detected. For example, the general scheduler determines whether collision criteria is detected in response to the robotic singulation station schedulers providing the general scheduler with information associated with the respective plans or strategies for singulation of items by the corresponding robots. The robotic singulation station schedulers can register the determined plans or strategies with the general scheduler.

In response to the collision criteria being detected at 1081, process 1075 proceeds to 1083 at which assistance is obtained or a plan or strategy is updated to avoid collision. For example, in response to the collision criteria being detected, the general scheduler can cause an active measure to be implemented to change or adapt singulation of the items to the probability that a collision will occur (e.g., that an expected collision event is detected). In some embodiments, the general scheduler causes one or more of the robotic singulation station schedulers to determine a new plan or strategy for singulating the item or for avoiding the collision. For example, in response to detecting the collision criteria, the general scheduler sends a fault to one or more of the robotic singulation station schedulers to cause the robotic singulation station schedulers to implement a new plan or strategy for singulating the item (e.g., in a manner that such singulation will avoid the expected collision).

In response to determining that collision criteria is not detected at 1081, process 1075 proceeds to 1085 at which autonomous operation of the plurality of robots to singulate the plurality of items is resumed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface;
   a first robotic arm comprising a suction-based end effector; and
   a processor coupled to the communication interface and configured to:
      receive sensor data via the communication interface, the sensor data including image data associated with a plurality of items present in a workspace; and
      use the sensor data to determine and implement a plan to autonomously operate the first robotic arm to pick one or more items from the workspace and place each item singly in a corresponding location in a singulation conveyance structure, the plan including picking up a first item and placing the first item at a first destination location, and performing an active measure to change or adapt to a detected state or condition associated with the one or more items in the workspace,
   wherein implementing the plan comprises:
      detecting, based at least in part on the sensor data, that the first robotic arm has picked up a number of items that is greater than an expected number of items, including determining that the first robotic arm picked a first item and a second item based at least in part on a difference in pressure across the suction-based end effector;

determining a plan to singly place the first item and the second item, including determining the first destination location for the first item and a second destination location for the second item;

placing the first item at the first destination location; and placing the second item at the second destination location, wherein placement of the first item and the second item is staggered;

wherein:
the first destination location and the second destination locations are different slots or containers on the singulation conveyance structure;
the performing the active measure comprises:
in response to determining that the first robotic arm has picked up more items than expected according to the plan, reserving a slot or container in which the second item is to be placed, including updating a distributed data structure to associate the slot or container with the second item; and
the distributed data structure is used to manage reservations for items placed on the conveyance structure by a plurality of robotic arms.

2. The system of claim 1, wherein:
the processor is configured to:
detect the detected state or condition, including by using the sensor data to detect that an observed flow of items through the workspace has deviated from a predicted flow predicted based on a model of item flow through the workspace;
determine that the detected state or condition impedes implementation of a current plan to autonomously operate the first robotic arm to pick the one or more items from the workspace and place each item singly in a corresponding location in the singulation conveyance structure; and
in response to the determination, operate to implement the active measure to improve the flow of the items through the workspace.

3. The system of claim 2, wherein the sensor data includes data associated with an infrared beam break detector and the detected state or condition is detected based at least in part on a determination that an infrared beam of the infrared beam break detector has not been broken at an expected time.

4. The system of claim 2, wherein the first robotic arm is used to nudge or pull at least one item in the workspace.

5. The system of claim 2, wherein the first robotic arm comprises a robotically controlled air blower, and the active measure includes using the air blower to clear a logjam by blowing air on the one or more items in the workspace.

6. The system of claim 2, wherein the active measure includes using the first robotic arm to clear a logjam of items impeding the flow of items through the workspace.

7. The system of claim 6, wherein to clear the logjam of items impeding the flow of items through the workspace includes clearing the logjam of items in a chute conveyor positioned to mechanically move items in the workspace.

8. The system of claim 2, wherein the active measure includes:
operating the first robotic arm to clear debris impeding flow through the workspace.

9. The system of claim 1, wherein the active measure includes operating a robotically controlled structure other than the first robotic arm used to pick the one or more items from the workspace and place each item singly in a corresponding location in the singulation conveyance structure.

10. The system of claim 9, wherein the robotically controlled structure other than the first robotic arm used to pick the one or more items from the workspace and place each item singly in a corresponding location in the singulation conveyance structure comprises an air blower positioned to direct a blast of air at the one or more items in the workspace.

11. The system of claim 9, wherein the robotically controlled structure other than the first robotic arm used to pick the one or more items from the workspace and place each item singly in a corresponding location in the singulation conveyance structure comprises a chute conveyor positioned to mechanically move items in the workspace.

12. The system of claim 11, wherein the active measure includes operating the chute conveyor in a jitter mode in which the conveyor operates in short bursts alternating between a forward direction and a reverse direction.

13. The system of claim 1, wherein the detected state or condition includes a determination that an item exceeds a prescribed threshold weight and the active measure includes determining to pull, drag, or push the item through at least a portion of the workspace to the corresponding location in the singulation conveyance structure.

14. The system of claim 13, wherein the item is pulled, dragged, or pushed into an exception handling area.

15. The system of claim 1, wherein determining the active measure includes dragging an item along a top surface of other items present in the workspace.

16. The system of claim 1, wherein the processor is configured to determine and implement the plan at least in part by:
determining to change one or both of a position and an orientation of at least one of the one or more items based at least in part on three dimensional image data associated with the workspace; and
operating the first robotic arm according to the plan.

17. The system of claim 16, wherein:
the first robotic arm comprises an end effector;
the end effector comprises one or more suction cups; and
the active measure comprises changing one or both of the position and the orientation of the at least one of the one or more items by blowing air out of at least one of the one or more suction cups.

18. The system of claim 1, wherein:
the suction-based end effector comprises a plurality of suction cups;
the detected state or condition is detected based at least in part by sensor data from a force or other tactile sensor indicating an orientation of the end effector does not conform to an orientation of a grasp surface of an item to be grasped; and
the active measure includes rotating the orientation of the end effector to match the orientation of the grasp surface.

19. The system of claim 1, wherein:
the suction-based end effector comprises one or more suction cups; and
the processor is configured to perform a diagnostic test, including by:
operating the first robotic arm to move the end effector to a predetermined surface;

causing the first robotic arm to grasp the predetermined surface;

measuring a pressure affected by the one or more suction cups when engaging the predetermined surface; and comparing the pressure affected by the one or more suction cups when engaging the predetermined surface with a preset threshold pressure value.

20. The system of claim 1, wherein the determination that the first robotic arm has picked up the number of items greater than the expected number of items is further based on one or more of image sensor data, weight data, and tactile sensor data.

21. The system of claim 1, wherein the suction-based end effector comprises a plurality of independently actuated sets of suction cups, each set comprising one or more suctions cups, and the active measure includes operating the respective independently actuated sets of suction cups in a staggered manner to release each item in the grasp singly in a corresponding location in the singulation conveyance structure.

22. The system of claim 1, wherein:

the first robotic arm comprises a wrist disposed on a distal end of the first robotic arm, and an end effector operatively connected to the wrist;

the detected state or condition includes information pertaining to a manner by which at least one item of the plurality of items is grasped by the-first robotic arm; and the active measure includes reconfiguring the wrist or the end effector to improve the grasp of the at least one item.

23. The system of claim 1, wherein:

the system includes a second robotic arm and where the first robotic arm and the second robotic arm are operated autonomously and independently from one another, each to pick and place items from the workspace and place them singly each in a corresponding single location in the singulation conveyance structure in a manner that achieves combined throughput while avoiding collisions or other interference between the first robotic arm and the second robotic arm.

24. The system of claim 23, wherein the detected condition or state comprises a potential collision between the first robotic arm and the second robotic arm and the active measure includes delaying a next operation of the first robotic arm until after a movement of the second robotic arm.

25. The system of claim 24, wherein the active measure is based at least in part on a determination that a next operation of the second robotic arm is to grasp a first item that is further away from the singulation conveyance structure than a second item to be grasped next by the first robotic arm.

26. The system of claim 23, wherein the active measure is based at least in part on a determination that a next operation of the second robotic arm is to move a first item to the singulation conveyance structure from a location that is nearer to the singulation conveyance structure than a second item to be moved to the singulation conveyance structure by the first robotic arm.

27. The system of claim 1, wherein the active measure includes displaying to a human user, via a user interface, a set of one or more actions available to be selected by the human user, via the user interface, to respond to the detected state or condition.

28. A method, comprising:

receiving, by one or more processors, sensor data, the sensor data including image data associated with a plurality of items present in a workspace; and using the sensor data to determine and implement a plan to autonomously operate a first robotic arm to pick one or more items from the workspace and place each item singly in a corresponding location in a singulation conveyance structure, the plan including picking up a first item and placing the first item at a first destination location, and performing an active measure to change or adapt to a detected state or condition associated with the one or more items in the workspace, wherein implementing the plan comprises:

detecting, based at least in part on the sensor data, that the first robotic arm has picked up a number of items that is greater than an expected number of items, including determining that the first robotic arm picked a first item and a second item based at least in part on a difference in pressure across the suction-based end effector;

determining a plan to singly place the first item and the second item, including determining the first destination location for the first item and a second destination location for the second item; and placing the first item at the first destination location; and placing the second item at the second destination location, wherein placement of the first item and the second item is staggered;

wherein:

the first destination location and the second destination locations are different slots or containers on the singulation conveyance structure;

the performing the active measure comprises:

in response to determining that the first robotic arm has picked up more items than expected according to the plan, reserving a slot or container in which the second item is to be placed, including updating a distributed data structure to associate the slot or container with the second item; and the distributed data structure is used to manage reservations for items placed on the conveyance structure by a plurality of robotic arms.

* * * * *